US006498625B1

(12) United States Patent
Yamamoto et al.

(10) Patent No.: US 6,498,625 B1
(45) Date of Patent: *Dec. 24, 2002

(54) DYNAMIC IMAGE TRANSMISSION METHOD AND APPARATUS FOR ENHANCING SPATIAL RESOLUTION OF IMAGE DATA

(75) Inventors: Mitsuro Yamamoto, Yokohama (JP); Takayuki Kikuchi, Tokyo (JP); Hiroshi Mashimo, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/462,273

(22) Filed: Jun. 5, 1995

Related U.S. Application Data

(62) Division of application No. 08/352,211, filed on Dec. 2, 1994, now Pat. No. 5,541,657, which is a continuation of application No. 07/924,629, filed on Aug. 4, 1992, now abandoned.

(30) Foreign Application Priority Data

| Aug. 13, 1991 | (JP) | ............................................. 3-202691 |
| Aug. 14, 1991 | (JP) | ............................................. 3-204129 |
| Nov. 15, 1991 | (JP) | ............................................. 3-300035 |
| Nov. 15, 1991 | (JP) | ............................................. 3-300037 |
| Dec. 3, 1991 | (JP) | ............................................. 3-318831 |
| Jun. 22, 1992 | (JP) | ............................................. 4-162539 |

(51) Int. Cl.$^7$ ................................................. H04N 7/16

(52) U.S. Cl. .................. 348/384.1; 348/441; 348/14.12

(58) Field of Search ............................. 348/12, 13, 14, 348/15, 16, 7, 580, 384.1, 409.1, 14.12, 441; 725/110, 118, 120

(56) References Cited

U.S. PATENT DOCUMENTS

| 3,752,911 | A | | 8/1973 | Morchand et al. ............ 178/6.8 |
| 4,650,929 | A | * | 3/1987 | Boeger et al. .................. 348/15 |
| 4,935,953 | A | | 6/1990 | Appel et al. ................... 379/53 |
| 4,984,081 | A | * | 1/1991 | Miyoshi et al. .............. 358/180 |
| 5,027,400 | A | * | 6/1991 | Baji et al. ....................... 380/20 |
| 5,047,858 | A | | 9/1991 | Aimonoya ................... 358/183 |
| 5,061,991 | A | | 10/1991 | Guichard et al. .............. 358/12 |
| 5,115,309 | A | | 5/1992 | Hang .......................... 358/133 |
| 5,128,776 | A | * | 7/1992 | Scorse et al. ................. 358/426 |
| 5,138,447 | A | | 8/1992 | Shen et al. ................... 358/133 |
| 5,172,413 | A | | 12/1992 | Bradley et al. ................ 380/20 |
| 5,235,420 | A | | 8/1993 | Gharavi |
| 5,239,389 | A | * | 8/1993 | Kochis et al. ............... 358/451 |
| 5,426,513 | A | * | 6/1995 | Scorse et al. ................ 358/433 |
| 5,686,961 | A | * | 11/1997 | Gasktonyi et al. .......... 348/390 |
| 5,832,114 | A | * | 11/1998 | Kaneko et al. .............. 382/191 |

FOREIGN PATENT DOCUMENTS

| EP | 0354370 | 2/1990 |
| FR | 2563403 | 10/1985 |
| GB | 2219464 | 6/1989 |
| JP | 48-26419 | 8/1971 |
| JP | 49-46317 | 9/1972 |
| JP | 49-64317 | 10/1972 |

(List continued on next page.)

Primary Examiner—Victor R. Kostak
(74) Attorney, Agent, or Firm—Fitzpatrick, Cella, Harper & Scinto

(57) ABSTRACT

When dynamic image signals from a plurality of dynamic image signal sources are simultaneously received by a plurality of receivers, a dynamic image signal to be transmitted is transmitted while being divided into one or a plurality of partial dynamic image signals. In each of the plurality of dynamic image output devices, a desired number of received partial dynamic image signals are displayed in a desired size, thereby preventing a decrease in transmission efficiency caused by transmission of a large amount of dynamic image information exceeding the capacity of a transmission path.

8 Claims, 37 Drawing Sheets

FOREIGN PATENT DOCUMENTS

| | | |
|---|---|---|
| JP | 54-077512 | 6/1979 |
| JP | 57-143990 | 9/1982 |
| JP | 59-006688 | 1/1984 |
| JP | 61-103382 | 5/1986 |
| JP | 61-194931 | 8/1986 |
| JP | 62-108686 | 5/1987 |
| JP | 62-183242 | 8/1987 |
| JP | 62-183288 | 8/1987 |
| JP | 62-290291 | 12/1987 |
| JP | 62-298288 | 12/1987 |
| JP | 63-001185 | 1/1988 |
| JP | 63-015559 | 1/1988 |
| JP | 63-090953 | 4/1988 |
| JP | 63-181583 A | 7/1988 |
| JP | 63-181584 | 7/1988 |
| JP | 63-206040 | 8/1988 |
| JP | 64-500237 | 1/1989 |
| JP | 64-061187 A | 3/1989 |
| JP | 1-144792 | 6/1989 |
| JP | 01-165281 | 6/1989 |
| JP | 1-218191 | 8/1989 |
| JP | 01-2181891 | 8/1989 |
| JP | 01-220591 | 9/1989 |
| JP | 01-286590 | 11/1989 |
| JP | 02-007686 | 1/1990 |
| JP | 02-007687 | 1/1990 |
| JP | 02-014693 | 1/1990 |
| JP | 2-67891 | 3/1990 |
| JP | 02/101884 | 4/1990 |
| JP | 02-113748 | 4/1990 |
| JP | 2-238788 | 9/1990 |
| JP | 02-295392 A | 12/1990 |
| JP | 3-4654 | 1/1991 |
| JP | 03-080670 | 4/1991 |
| JP | 03-270430 | 12/1991 |
| JP | 03-270488 | 12/1991 |
| JP | 04-032347 | 2/1992 |
| JP | 4-054089 | 2/1992 |
| JP | 04-177993 | 6/1992 |
| JP | 62-183288 | 8/1997 |

\* cited by examiner

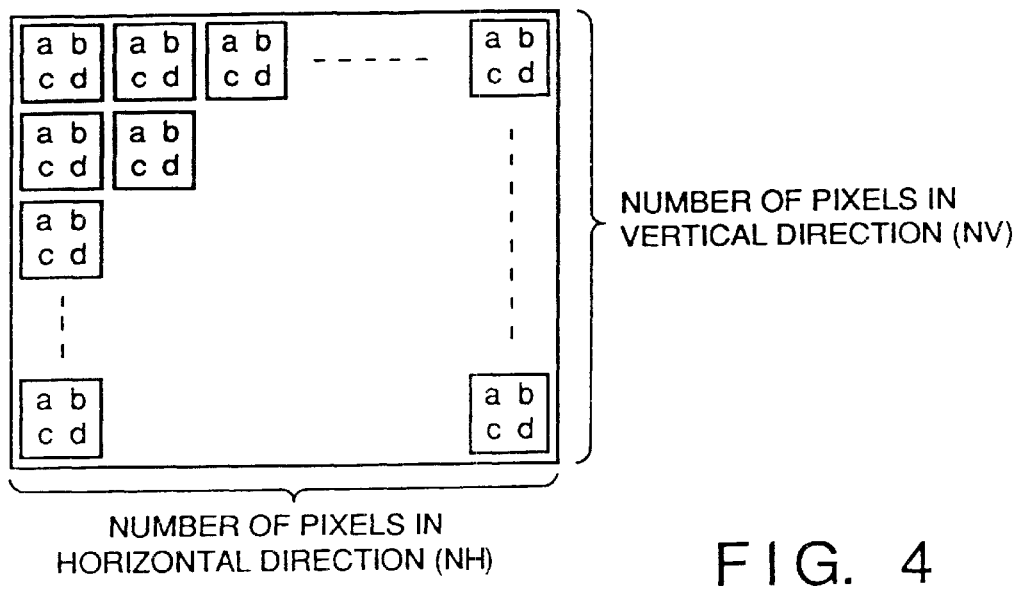
FIG. 4
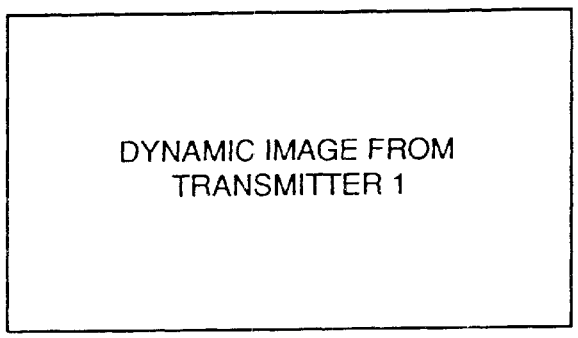
FIG. 5A
| DYNAMIC IMAGE FROM TRANSMITTER 1 | DYNAMIC IMAGE FROM TRANSMITTER 2 |
|---|---|
| DYNAMIC IMAGE FROM TRANSMITTER 3 | DYNAMIC IMAGE FROM TRANSMITTER 4 |
FIG. 5B

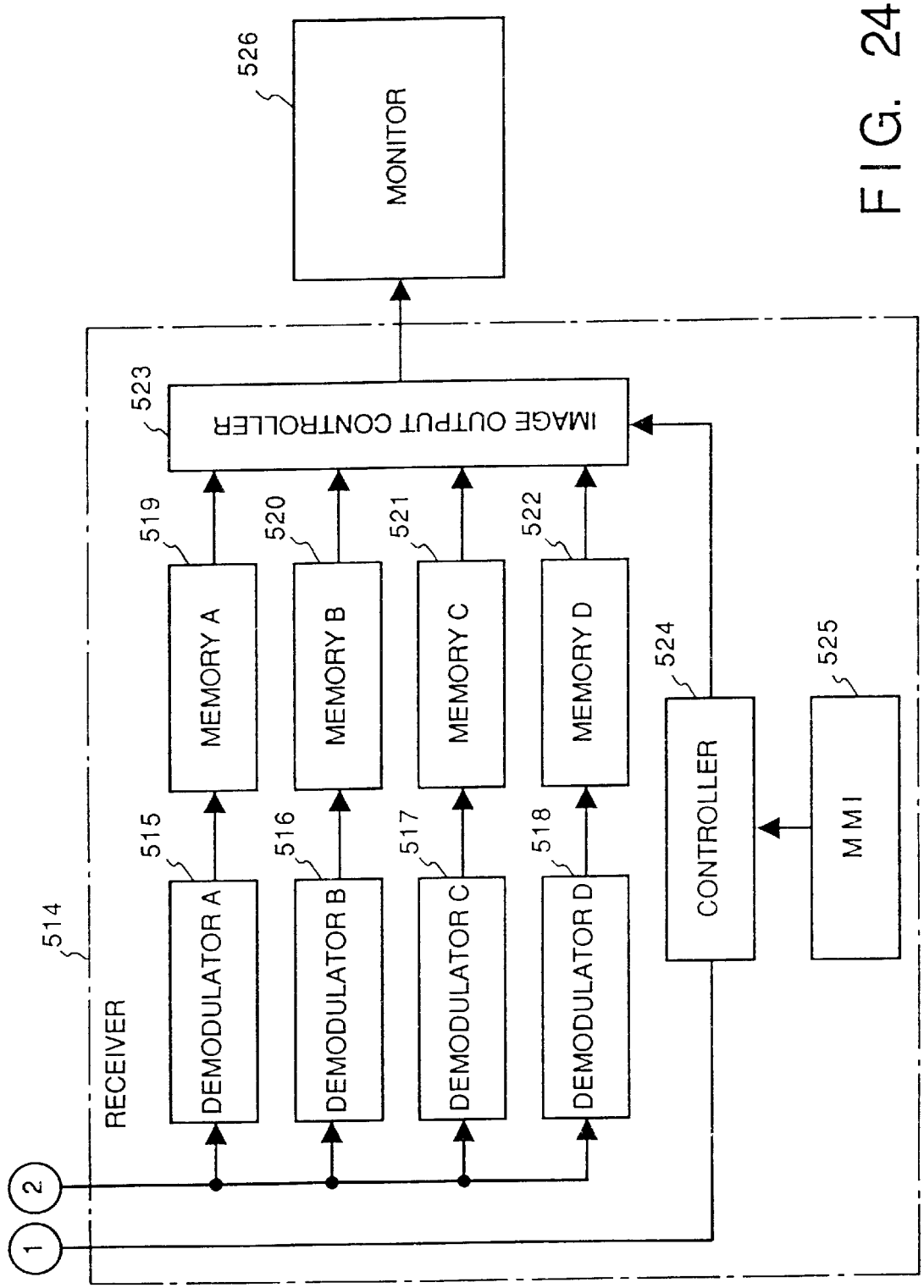
F I G. 24

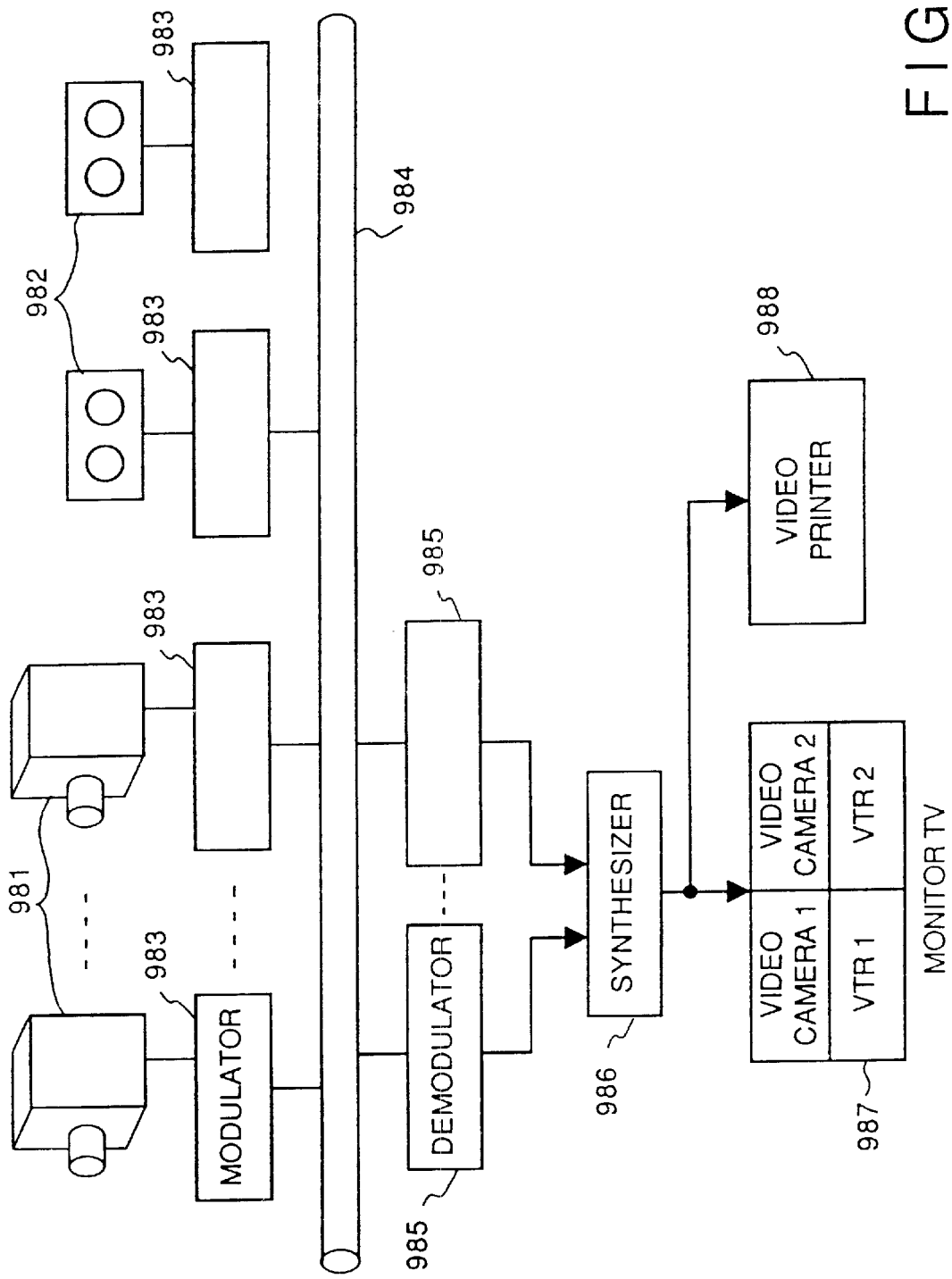

DYNAMIC IMAGE TRANSMISSION METHOD AND APPARATUS FOR ENHANCING SPATIAL RESOLUTION OF IMAGE DATA

This application is a division of application Ser. No. 08/352,211 filed Dec. 2, 1994, now U.S. Pat. No. 5,541,657 which is a continuation of application Ser. No. 07/924,629 filed Aug. 4, 1992, abandoned.

BACKGROUND OF THE INVENTION

The present invention relates to a dynamic image transmission apparatus capable of transmitting dynamic image signals from a plurality of dynamic image signal sources to a plurality of dynamic image output apparatuses and, for example, to a dynamic image transmission apparatus that can be used in a dynamic image network for a TV meeting.

The present invention also relates to an image transmission apparatus for transmitting a plurality of dynamic image information signals through a multi-channel transmission path.

Furthermore, the present invention relates to an image transmission apparatus for encoding one-dimensional data such as voice data or two-dimensional data such as image data, and outputting decoded data.

A dynamic image transmission apparatus of this type is arranged as shown in, e.g., FIG. 34.

In FIG. 34, reference numerals 101a and 101b denote video cameras as dynamic image signal sources; and 102a to 102d, modulators each having a function of modulating a dynamic image signal output from the video camera 101a (101b) or a video tape recorder (VTR) 103a (103b) at a desired frequency, and outputting the modulated signal onto a coaxial cable 110. Reference numerals 103a and 103b denote VTRs; and 105a to 105c, demodulators each having a function of selectively demodulating a desired one of a plurality of dynamic image signals modulated by the modulators 102a to 102d, and output onto the coaxial cable 110. The modulators 102a to 102d, the coaxial cable 110, and the demodulators 105a to 105c form a dynamic image signal transmission channel. In this case, a multi-channel transmission path is constituted since a plurality of modulators and demodulators are used.

Reference numerals 106a to 106c denote output devices such as displays, video printers, and the like. The output devices 106a to 106c output dynamic image signals demodulated by the demodulators 105a to 105c.

The modulation frequencies used in the modulators 102a to 102d are controlled to utilize frequencies which are not used for transmission on the coaxial cable 110 at the beginning of transmission of dynamic image signals from the dynamic image signal sources.

As a second prior art, a dynamic image transmission apparatus comprises an arrangement shown in, e.g., FIG. 35 so as to synthesize dynamic images of a plurality of attendants, and to display synthesized dynamic images on each terminal.

More specifically, in FIG. 35, reference numerals 151a to 151c denote terminals A to C as motion picture signal sources; 155a and 155b, terminals D and E as dynamic image output devices; and 160, a coaxial cable as a transmission path.

In the terminals A to C (151a to 151c), reference numerals 152a to 152c denote image input devices A to C; and 153a to 153c, size converters A to C each having a function of converting a dynamic image of, e.g., the face of an attendant input at a corresponding one of the image input devices A to C (152a to 152c) into a desired size, and a function of modulating the input dynamic image signal at a desired frequency, and outputting the modulated signal onto the coaxial cable 160. The dynamic image signals which are converted into a desired size, and modulated by the size converters A to C (153a to 153c) are output onto the coaxial cable 160.

In the terminals D and E (155a and 155b), reference numerals 156a and 156b denote image synthesizers D and E for demodulating the modulated dynamic image signals from the coaxial cable 160, and synthesizing the three demodulated dynamic images from the terminals A to C (151a to 151c); and 157a and 157b, image output devices D and E such as displays.

FIG. 36 shows an example of dynamic images synthesized by the image synthesizers D and E (156a and 156b). More specifically, the image output devices D and E (157a and 157b) display the synthesized dynamic images, as shown in FIG. 36.

As a third prior art, an apparatus comprising an arrangement shown in, e.g., FIG. 37, is known.

In FIG. 37, reference numerals 171a to 171c denote image input devices F to H each having a function of receiving a dynamic image signal of, e.g., the face of an attendant, modulating the dynamic image signal at a desired frequency, and outputting the modulated signal onto a coaxial cable 180; and 172a and 172b, terminals F and G. The terminals F and G (172a and 172b) respectively comprise size converters F and G (173a and 173b) for demodulating the modulated dynamic image signals from the coaxial cable 180, and converting the demodulated dynamic image signals into a desired size, synthesizers F and G (174a and 174b) for synthesizing the dynamic image signals received from the image input devices and output from the size converters F and G (173a and 173b), as shown in, e.g., FIG. 36, and image output devices F and G (175a and 175b) for outputting the dynamic images synthesized by the synthesizers F and G (174a and 174b)

However, in the above-mentioned prior art arrangements and methods, since one channel having a predetermined transmission capacity is assigned to the transmission of one dynamic image, when an image having a small amount of information such a frame having a small number of high-frequency components of a dynamic image to be transmitted is transmitted, the transmission capacity of the transmission channel is partially wasted, resulting in poor utilization efficiency of the transmission path of the entire network.

In particular, in the second prior art apparatus, for example, when it is attempted at the terminal D 155a to display only an image A from the terminal A 151a in a large scale, the operation of the size converter A 153a of the terminal 151a must be switched. However, since the terminals D 155a and E 155b share the received dynamic image signals, the image A is also displayed in a large scale on the terminal E 155b. In this manner, in the second prior art, it is impossible to change the output image size according to a request from a reception-side terminal without influencing an output image on another reception terminal.

In the third prior art apparatus, since the size converters F and G (173a and 173b) are arranged on the reception-side terminals F and G (172a and 172b), each terminal can output an image in a desired scale without influencing an output image on another reception terminal. However, since a transmission-side terminal cannot detect the size of a dynamic image signal requested by the reception-side terminal, even when the reception-side terminal requests only a reduced image signal, the transmission-side terminal must output an image onto the transmission path without reducing the image, i.e., without compressing the transmission band. For this reason, the frequency band of the transmission path is wastefully used.

As a conventional transmission system for transmitting dynamic image information in multi-channels, for example, the following system is known. In this system, a multi-channel transmission path is constituted by using a coaxial cable, and a plurality of modulators and demodulators, and a plurality of dynamic image information signals are transmitted.

However, in a transmission system of this type, when all the transmission channels of the multi-channel transmission path are busy, a transmission request of newly generated dynamic image information must wait until one of the transmission channels is ready, resulting in poor response to a transmission request.

As a method of solving this problem, the rights of use of transmission channels are sequentially changed in a predetermined time unit, thereby realizing transmission of dynamic image information signals numbering more than the number of transmission channels of the multi-channel transmission path. In this case, every time the right of use of the transmission channel is lost, dynamic image information is undesirably disconnected.

Furthermore, in the conventional transmission system, the transmission capacity per transmission channel is uniformly and permanently assigned. For this reason, when dynamic image information having a small amount of information to be transmitted is transmitted, e.g., when a reception-side terminal requests to display an image in a reduced scale, the transmission capacity is not fully utilized, and is partially wasted, resulting in poor utilization efficiency of the transmission path of the entire network.

As still another image transmission apparatus, for example, an apparatus, which encodes an image by a differential encoding transmission method, and transmits the encoded image, as shown in FIG. 38, is known. In FIG. 38, an input dynamic image signal 871 to be transmitted is input to an A/D converter 872 for converting the dynamic image signal into a digital signal, and a system clock generator 873 for extracting a sync signal from the input dynamic image signal, and generating various system clocks to be used in the system. A delay device 874 delays the A/D-converted image signal by one system clock period ($T_0$).

A subtracter 875 calculates the difference between image signals of adjacent pixels sampled at an interval of one system clock period. A modulator 876 modulates the output from the subtracter 875 in correspondence with the format of the transmission path, and outputs the modulated data.

In still another conventional image transmission apparatus, as shown in FIG. 39, an input dynamic image signal 881 is transmitted through a plurality of transmission channels and a plurality of differential encoders 1 to n (883 to 885) using a plurality of interleaved system clocks from a system clock generator 882, thereby prolonging the system clock period.

However, in the conventional image transmission apparatus shown in FIG. 38, the period of system clocks obtained from the system clock generator is equal to the sampling period of adjacent pixels to be sampled, and is normally as fast as 100 nsec or less. For this reason, the A/D converter, the delay device, the subtracter, and the modulator, which operate based on the system clocks, are required to perform high-speed operations. As a result, it is difficult to manufacture and adjust the apparatus, resulting in an increase in cost.

In the prior art apparatus shown in FIG. 39, an image signal transmitted through each differential encoder has a low image redundancy (self correlation) since it is constituted by non-adjacent pixels of an input dynamic image signal. For this reason, the number of bits upon quantization must be increased, thus deteriorating encoding efficiency.

In still another conventional dynamic image transmission apparatus, for example, as shown in FIG. 40, video signals output from a plurality of video cameras 981 and VTRs 982 are modulated at desired frequencies by modulators 983, and the modulated signals are sent onto a coaxial cable 984. The video signals from the coaxial cable 984 are received by demodulators 985. The video signals modulated by the modulators 983 are demodulated by the demodulators 985.

A plurality of demodulated input video signals are input to and synthesized by a synthesizer 986, and the synthesized video signals are displayed on a monitor television (TV) 987. The video signals output from the synthesizer 986 can be recorded by a video printer 988.

However, in this conventional dynamic image transmission apparatus, when a plurality of video signals from the video cameras 981 and VTRs 982 as dynamic image sources are synthesized, and are displayed on the monitor TV 987, since the modulators 983 individually assign modulation frequency bands corresponding to transmission channels to the plurality of video signals, the number of transmission channels is inevitably increased as compared to a case wherein a video signal from a single dynamic image source is displayed on the monitor TV 987.

When a plurality of display requests for displaying a plurality of video signals on the monitor TV 987 connected to the apparatus are simultaneously issued, it is often impossible to meet such display requests due to the limitation on the transmission capacity of the coaxial cable 984.

Conventionally, most apparatuses of this type convert input data into data in a frequency region using an orthogonal transform method such as a DCT (Discrete Cosine Transform) method, and compress the data amount by using control of, e.g., quantization characteristics of a quantizer such as nonlinear quantization, assignment of the number of quantization bits, and the like in correspondence with the statistical nature of input data, a run length method for totalizing converted zero data, and the like.

However, in the orthogonal; transform method using the DCT method, $N^2$ multiplications using a cosine function as a coefficient must be performed for N input data, as shown in the following equation:

$$F(u) = \sum_{X=0}^{N-1} C(u) f(x) \cos \frac{(2x+1)}{2N} \pi u$$

where u=0, 1, . . . , N−1 transmitting the divided dynamic image signals to the dynamic image output devices through a plurality of transmission channels, selection means for selecting a desired number of divided dynamic image signals from the dynamic image signals transmitted by the transmission control means, means for controlling to vary an output size of a dynamic image to be output from the dynamic image output devices according to the number of divided dynamic image signals selected by the selection means, and means for reconstructing a dynamic image signal corresponding to the output size in accordance with the output size.

It is another object of the present invention to provide an image transmission apparatus, which can improve utilization efficiency of a multi-channel transmission path.

In order to achieve the above object, according to the present invention, there is provided an image transmission apparatus comprising means for dividing an image to be transmitted into pixel units each including a predetermined number of pixels, encoding means for dividing pixels constituting the pixel unit into predetermined pixel sets, and encoding an image on the basis of average values of image, signals of pixels constituting the pixel sets, and transmission means $$C(u) = \begin{cases} 1 & (u = 0) \\ \sqrt{2} & (u \neq 0) \end{cases}$$

Since the orthogonal transform precision depends on the bit length of the coefficient of the cosine function, the bit length of the coefficient of the cosine function is set to be large. For this reason, it takes much time for a multiplication between the coefficient of the cosine function and input data, and the scale of a processing circuit is also increased. Therefore, an encoding/decoding device using such a DCT method has a low processing speed, and cannot be rendered compact.

SUMMARY OF THE INVENTION

It is an object of the present invention to provide an image transmission apparatus, which can prevent a change in output image in each reception terminal from influencing an output image on another reception terminal, and can improve utilization efficiency of transmission frequency bands on a transmission path.

In order to achieve the above object, according to the present invention, there is provided an image transmission apparatus for transmitting dynamic image signals from a plurality of dynamic image signal sources to a plurality of dynamic image output devices, comprising signal dividing means for dividing a dynamic image signal to be transmitted into one or a plurality of dynamic image signals, transmission control means for having channels, numbering more than the predetermined number, for transmitting the encoded image.

It is still another object of the present invention to provide an image transmission apparatus, which can perform data encoding/decoding processing at high speed.

In order to achieve the above object, according to the present invention, there is provided an image transmission apparatus for encoding input data, decoding the encoded data, and outputting the decoded data, comprising first calculation means for calculating an average value of a data series constituted by a plurality of data, second calculation means for successively dividing the data series by 1/2 until the number of data constituting each data series becomes 1 so as to form a plurality of partial data sets, and calculating average values of data belonging to the partial data sets after the divisions, means for obtaining a plurality of encoding conversion formulas using the plurality of average values obtained by calculations of the first and second calculation means, and third calculation means for obtaining a data value constituting the data series according to the plurality of encoding conversion formulas.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view showing a case wherein a dynamic image is divided into pixel units each including four pixels a, b, c, and d;

FIGS. 5A and 5B respectively show an example of a transmission image at a transmitter, and a reception image at a receiver in this embodiment;

FIGS. 23 and 24 are block diagrams showing an arrangement of a dynamic image transmission apparatus according to the fifth embodiment of the present invention;

FIGS. 34 to 40 are views for explaining prior arts.

DETAILED DESCRIPTION OF THE PREFERRED EMBODIMENTS

[First Embodiment]

Figure 1:
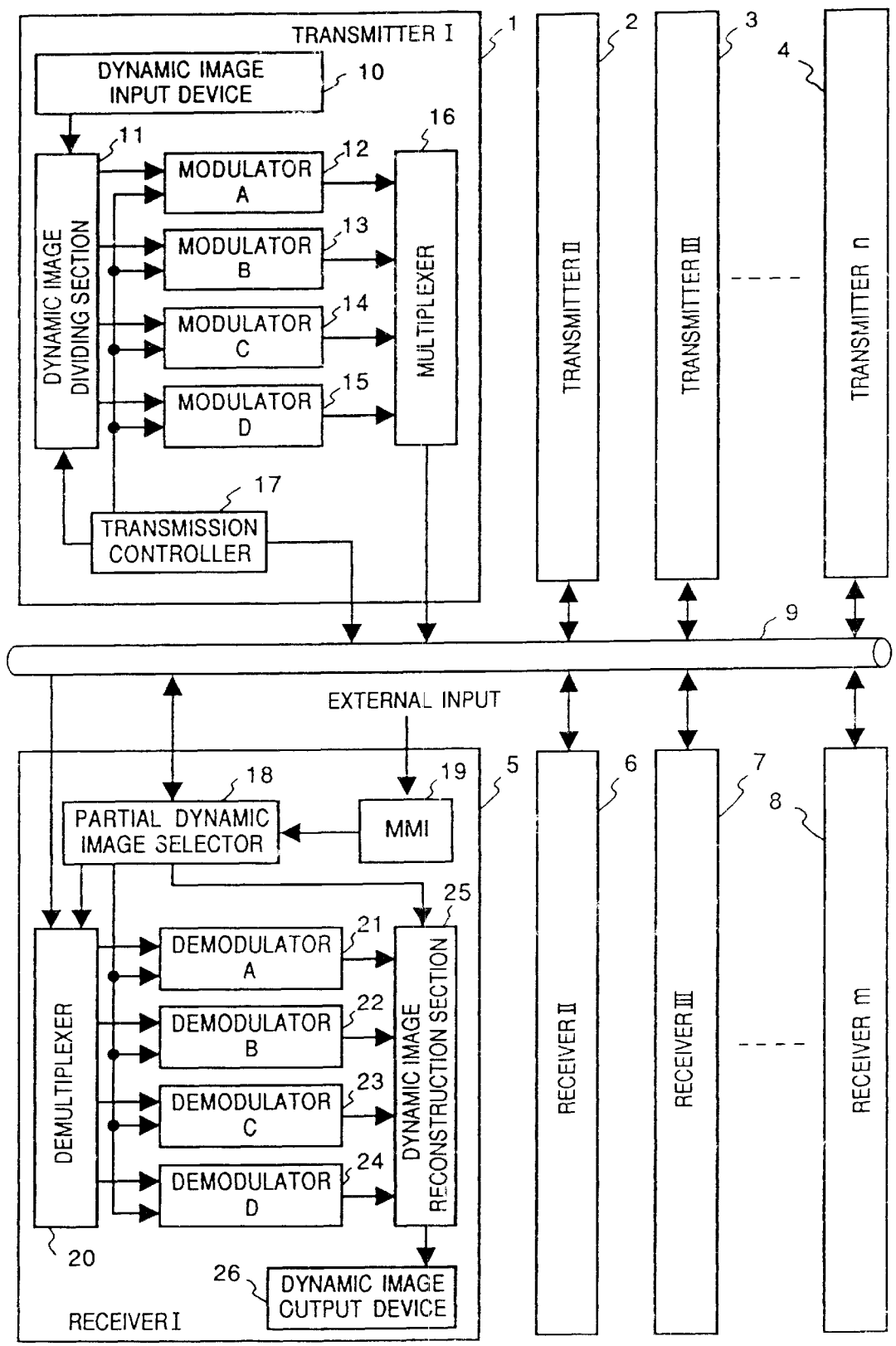
FIG. 1 is a block diagram showing a dynamic image transmission apparatus according to the first embodiment of the present invention.

FIG. 1 is a block diagram showing an arrangement according to the first embodiment of the present invention. An apparatus of this embodiment comprises a plurality of (e.g., n) transmitters I, II, III, . . . , n (indicated by reference numerals 1 to 4), a plurality of (e.g., m) receivers I, II, III, . . . , m (indicated by reference numerals 5 to 8) for receiving dynamic image signals, and a coaxial cable 9 as a transmission path for connecting between the transmitters and receivers.

Since the transmitters 1 to 4 have the same arrangement, the arrangement of only the transmitter I (1) will be described in detail below, and a detailed description of other transmitters will be omitted. Since the receivers 5 to 8 have the same arrangement, the arrangement of only the receiver I (5) will be described in detail below, and a detailed description of other receivers will be omitted.

When the transmission path length of the coaxial cable 9 becomes large, amplifier means for relay-amplifying signals are inserted midway along the coaxial cable, and two coaxial cables exclusively used for upstream and downstream signals respectively are used. In FIG. 1, relay amplifier means are not shown. Also, FIG. 1 illustrates the coaxial cable as if only one cable were used.

In the transmitter I (1), reference numeral 10 denotes a dynamic image input device comprising, e.g., a video camera for picking up an image of, e.g., the face of an attendant in, e.g., a TV meeting; and 11, a dynamic image dividing section for dividing a dynamic image signal input from the dynamic image input device 10 into one or a plurality of partial dynamic image signals. In this embodiment, a case will be exemplified wherein the dynamic image signal is divided into a maximum of four partial dynamic image signals. However, the number of partial dynamic image signals is not limited to that of this embodiment, but may be determined arbitrarily. The divided partial dynamic image signals are output to modulators (e.g., modulators A 12, B 13, C 14, and D 15) arranged in correspondence with the maximum number of partial dynamic image signals.

The modulators A to D modulate partial dynamic image signals output from the dynamic image dividing section 11 at desired frequencies fi (i=1 to k) of k modulation frequencies. Reference numeral 16 denotes a multiplexer for multiplexing output signals from the modulators A to D (12 to 15), and outputting the multiplexed signal onto the coaxial cable 9. Reference numeral 17 denotes a transmission controller for receiving a control baseband signal output from the receivers I, II, III, . . . , m, and controlling the dynamic image dividing section 11, the modulators A to D (12 to 15), and the like.

In the receiver I (5), reference numeral 18 denotes a partial dynamic image selector for controlling to selectively receive a desired partial dynamic image signal from a plurality of partial dynamic image signals transmitted along the transmission path according to an instruction from an MMI section. When a desire partial dynamic image signal is not transmitted, the partial dynamic image selector 18 transmits a transmission request signal using a baseband signal to the transmitters. Reference numeral 19 denotes an MMI section for transmitting an external input from an operator to the partial dynamic image selector.

Reference numeral 20 denotes a demultiplexer for selectively receiving a partial dynamic image signal instructed by the partial dynamic image selector 18 from the modulated partial dynamic image signals input from the coaxial cable 9, and outputting the received signal to a predetermined demodulator. Reference numerals 21 to 24 denote demodulators A to D for demodulating desired partial dynamic image signals according to an instruction from the partial dynamic image selector 18, and outputting the demodulated signals to a dynamic image reconstruction/synthesizing section 25.

Reference numeral 25 denotes a dynamic image reconstruction/synthesizing section for reconstructing and synthesizing a dynamic image signal using the partial dynamic image signals input from the demodulators A to D (21 to 24) according to an instruction from the partial dynamic image selector 18. Reference numeral 26 denotes a dynamic image output device, comprising, e.g., a display, a printer, or the like, for outputting the dynamic image signal output from the dynamic image reconstruction/synthesizing section 25.

Figure 2:
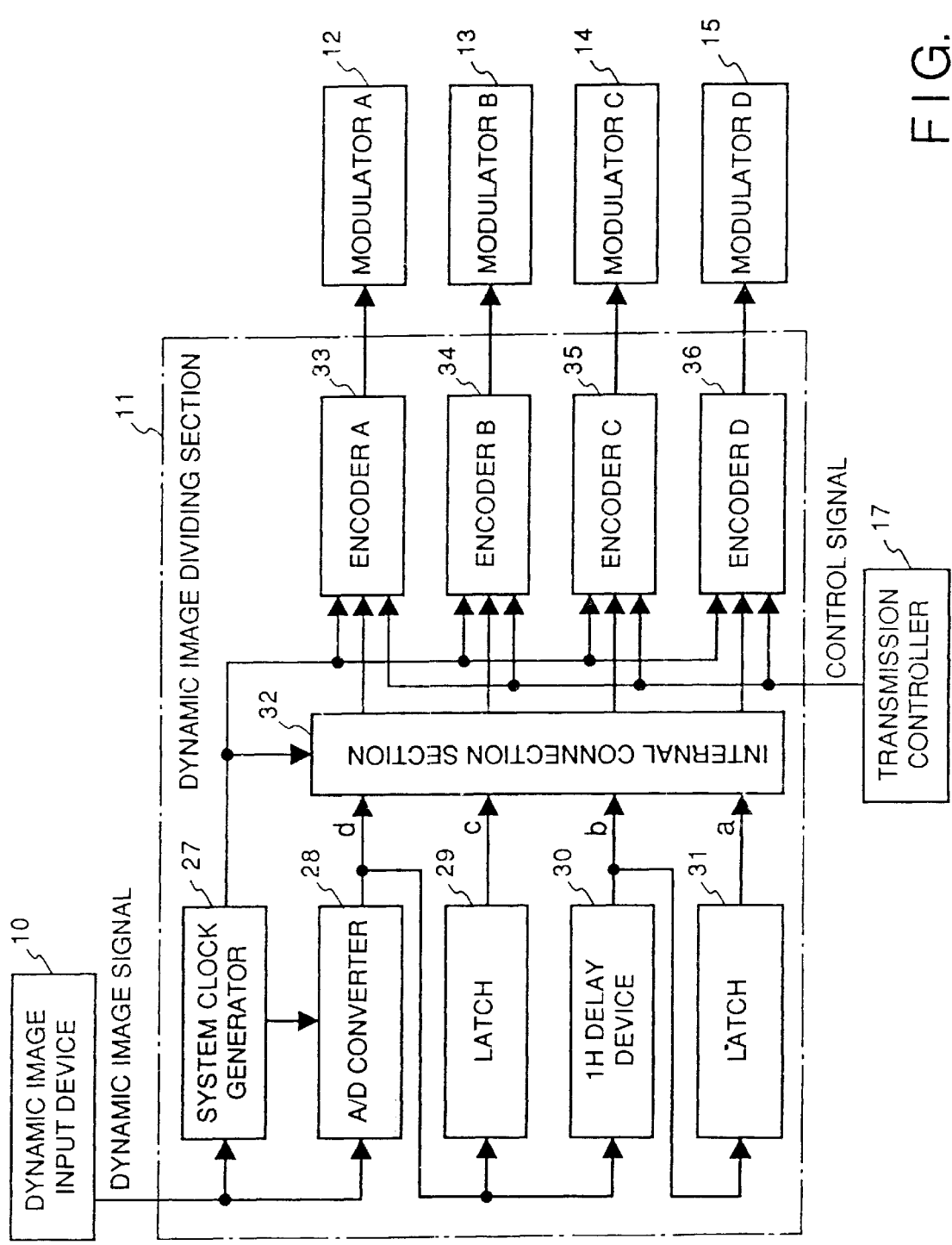
FIG. 2 is a block diagram showing details of a dynamic image dividing section shown in FIG. 1.
Figure 3:
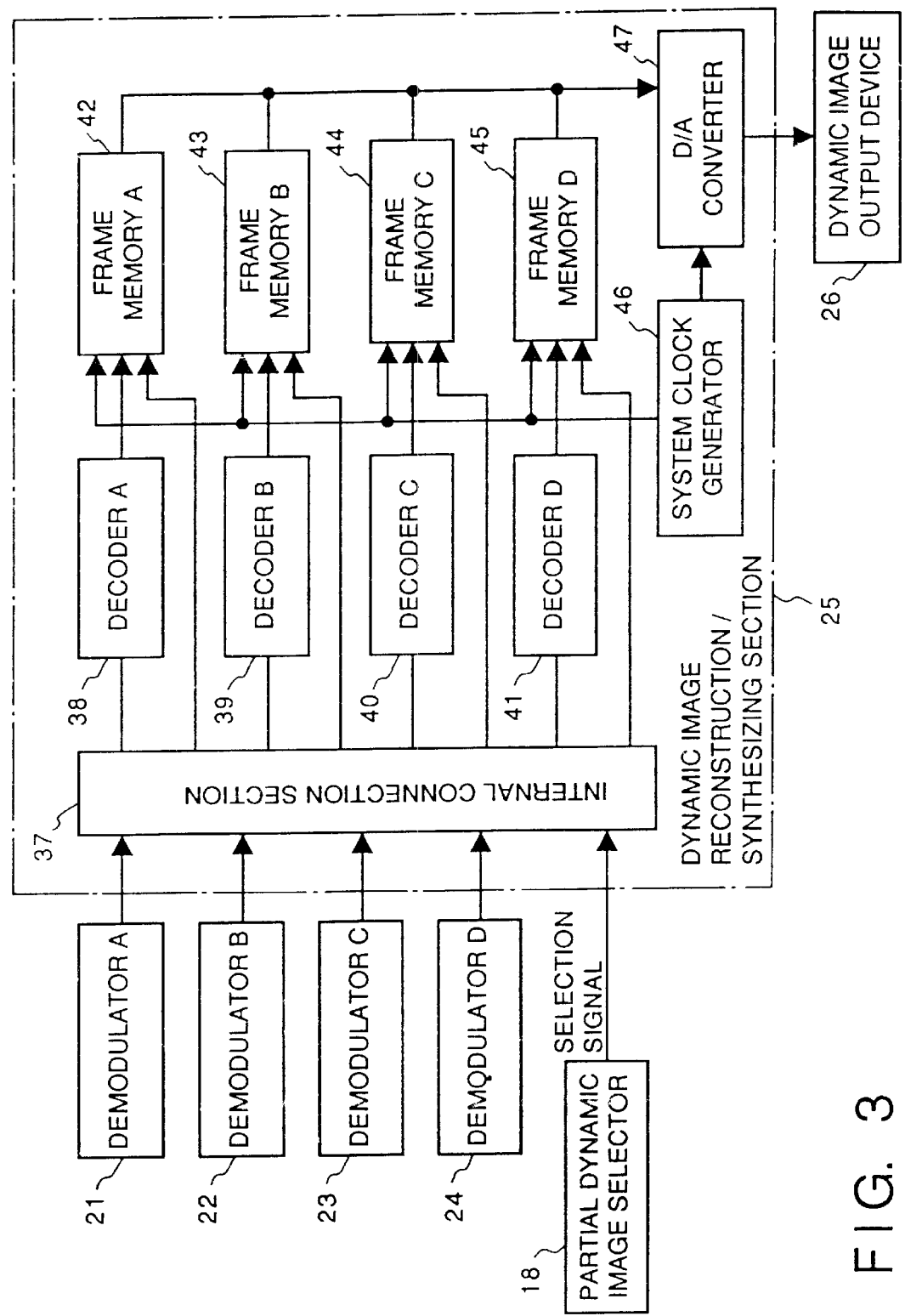
FIG. 3 is a block diagram showing details of a dynamic image reconstruction/synthesizing section shown in FIG. 1.

FIGS. 2 and 3 are block diagrams, respectively, showing the details of the dynamic image dividing section 11 and the dynamic image reconstruction/synthesizing section 25 of this embodiment shown in FIG. 1. In this embodiment, as shown in FIG. 4, a dynamic image is divided into pixel units each including four pixels a, b, c, and d. However, the number of divisions is not limited to that in this embodiment. For example, the dynamic image may be divided into more pixel units, and modulators and demodulators corresponding in number to divisions may be arranged.

The details of the dynamic image dividing section 11 will be described below with reference to FIG. 2.

In FIG. 2, reference numeral 27 denotes a system clock generator for extracting a sync signal from a dynamic image signal output from the dynamic image input device 10, and generating various timing signals used in the system. Reference numeral 28 denotes an A/D converter for converting an analog dynamic image signal into a digital signal on the basis of a sampling signal from the system clock generator 27. Reference numerals 29 and 31 denote latches each for delaying the digital dynamic image signal converted by the A/D converter 28 by one clock timing. Reference numeral 30 denotes a 1H delay device for delaying the digital dynamic image signal by one horizontal scan period.

Reference numeral 32 denotes an internal connection section for connecting the outputs from this A/D converter 28, the latch 29, the 1H delay device 30, and the latch 31 to inputs of encoders A, B, C, and D (33 to 36). Of the inputs of the internal connection section 32, an input signal from the A/D converter 28 corresponds to d in FIG. 4; an input signal from the latch 29, c in FIG. 4; an input signal from the 1H delay device 30, b in FIG. 4; and an input signal from the latch 31, a in FIG. 4.

Reference numerals 33 to 36 denote encoders A, B, C, and D for encoding image signals corresponding to pixels a, b, c, and d output from the internal connection section 32 on the basis of the following encoding formulas:

For the encoder A 33:

$$k_{01} = (1/4)\{a+b+c+d\} \quad (1)$$

For the encoder B 34:

$$k_{11} = (1/2)\{a+b\} - (1/4)\{a+b+c+d\} \quad (2)$$

For the encoder C 35:

$$k_{21} = a - (1/2)\{a+b\} \quad (3)$$

For the encoder D 36:

$$k_{22} = C - (1/2)\{c+d\} \quad (4)$$

The details of the dynamic image reconstruction/synthesizing section 25 will be described below with reference to FIG. 3.

In FIG. 3, reference numeral 37 denotes an internal connection section for outputting demodulated signals from demodulators A, B, C, and D (21 to 24) to decoders A, B, C, and D (38 to 41) and frame memories A, B, C, and D (42 to 45). The decoded picture image signals are output to the frame memories A, B, C, and D (42 to 45). The decoders A, B, C, and D decode the input demodulated signals on the basis of the following formulas:

For the decoder A:

$$a = k_{01} + k_{11} + k_{21} \quad (5)$$

For the decoder B:

$$b = k_{01} + k_{11} = k_{21} \quad (6)$$

For the decoder C:

$$c = k_{01} - k_{11} + k_{22} \quad (7)$$

For the decoder D:

$$d = k_{01} - k_{11} - k_{22} \quad (8)$$

Reference numerals 42 to 45 denote frame memories A, B, C, and D. Dynamic image signals decoded by the decoders A, B, C, and D (38 to 41) or non-decoded signals as outputs from the demodulators A, B, C, and D output through the internal connection section 37 are written in the frame memories A, B, C, and D according to a timing signal from a system clock generator 46, and are read out therefrom according to the timing signal from the system clock generator 46.

Reference numeral 46 denotes a system clock generator for generating various timing signals used in the respective components. Reference numeral 47 denotes a D/A converter for converting digital dynamic image signals output from the frame memories A, B, C, and D (42 to 45) into corresponding analog signals, and outputting the analog signals to the dynamic image output device 26.

The operation of the image transmission apparatus of this embodiment with the above-mentioned arrangement will be described below. In the following description, a case will be explained first wherein dynamic images transmitted from the four transmitters 1 to 4 are received by a plurality of receivers, and a case will be explained next wherein one of the receivers changes the image size of the transmitter I 1.

When four dynamic images transmitted from the transmitters I, II, III, and IV onto the coaxial cable 9 are to be synthesized and displayed in the receivers 5 to 8, as shown in FIG. 5B, each transmitter operates only one modulator. For example, each transmitter transmits a partial dynamic image signal given by formula (1) corresponding to the code $k_{01}$.

In the transmitter I 1, when a dynamic image signal is input from the dynamic image input device 10, the system clock generator 27 of the dynamic image dividing section 11 separates horizontal and vertical sync signals from the input signal, and generates sampling clocks to be used in the A/D converter 28.

The A/D converter 28 samples the dynamic image signal input from the dynamic image input device 10 using the sampling clocks from the system clock generator 27, and performs A/D conversion. A digital dynamic image signal A/D-converted by the A/D converter 28 is output to the latch 29, the 1H delay device 30, and the internal connection section 32. The output from the 1H delay device 30 is output to the internal connection section 32 and the latch 31. As a result, the internal connection section 32 receives four digital dynamic image signals corresponding to pixels a, b, c, and d.

The outputs from the internal connection section 32 are input to the encoder A 33, and the encoder calculates an average of the four input signals, as shown in formula (1). The average is output to the modulator A 12. The encoder A 33 outputs encoded data $k_{01}$ as a partial dynamic image signal every time outputs from the internal connection section 32 form data of one pixel unit, i.e., during only one horizontal scan period in two horizontal scan periods at a period twice that of the sampling clocks. The output from the encoder A 33 is supplied to the modulator A 12, and is modulated at, e.g., a modulation frequency $f_1$. The modulated data is output onto the coaxial cable 9 through the multiplexer 16.

Similarly, in the transmitters II, III, and IV, dynamic image signals output from the corresponding dynamic image input devices are encoded to encoded data $k_{01}$ as partial dynamic image signals by the corresponding encoders A, and these data are respectively modulated by the corresponding modulators at modulation frequencies $f_2$, $f_3$, and $f_4$. The modulated data are then output onto the coaxial cable 9.

A plurality of receivers I, II, III, ..., m for receiving the modulated signals from the coaxial cable 9 perform basically the same operation. For this reason, the operation of the receiver I 5 will be exemplified below.

The four modulated partial dynamic image signals input through the coaxial cable 9 are demultiplexed by the demultiplexer 20, and thereafter, the demodulators A, B, C, and D (21 to 24) respectively demodulate the modulated signals modulated at the modulation frequencies $f_1$, $f_2$, $f_3$, and $f_4$. The demodulated signals are output to the dynamic image reconstruction/synthesizing section 25 whose details are shown in FIG. 3.

In the dynamic image reconstruction/synthesizing section 25, the outputs from the demodulators A, B, C, and D (21 to 24), i.e., the partial dynamic image signals $k_{01}$ transmitted from the transmitters I, II, III, and IV are written in the frame memories A, B, C, and D (42 to 45) according to write clocks from the system clock generator 46. In this case, since each partial dynamic image signal $k_{01}$ is the average of the pixels a, b, c, and d, it represents a reduced image obtained by reducing an original image to a (1/2) scale in both the vertical and horizontal directions.

Figure 6:
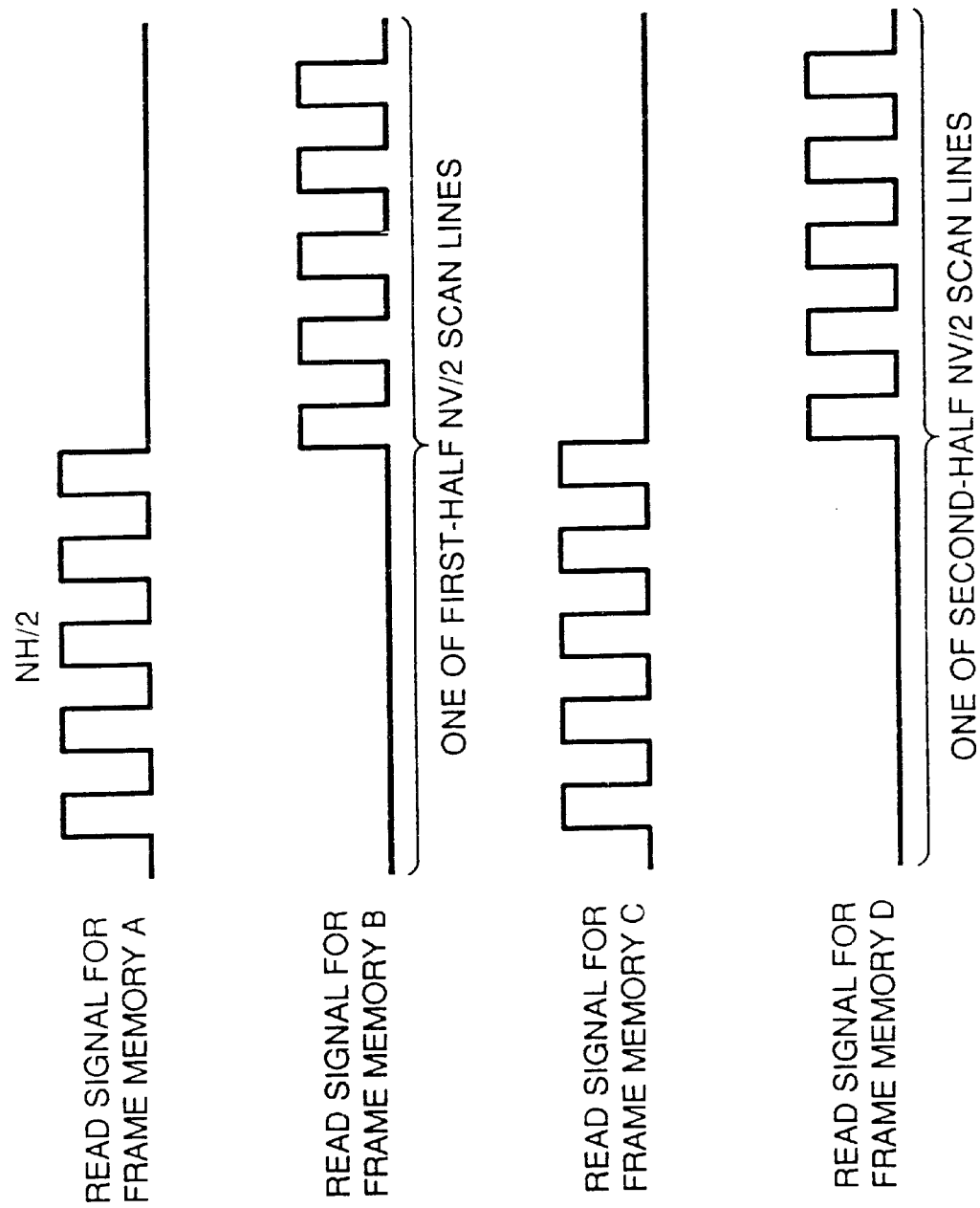
FIGS. 6 and 7 are timing charts showing read timings of a frame memory shown in FIG. 3.

The four reduced images written in the frame memories A, B, C, and D (42 to 45) are read out in response to read clocks from the system clock generator 46, which clocks have the timings shown in FIG. 6. More specifically, of all the scan lines for one frame, in the former half period of each scan in the former half NV/2 scan lines, NH/2 read signals are supplied to the memory A, and in the latter half period, another NH/2 read signals are supplied to the memory B. In the former half period of each scan in the latter half NV/2 scan lines of all the scan lines for one frame, NH/2 read signals are supplied to the memory C, and in the latter half period, another NH/2 read signals are supplied to the memory D. The readout reduced images are converted into corresponding analog signals by the D/A converter 47, and the analog image signals are displayed on the image output device in the arrangement, as shown in FIG. 5B.

Operations executed when an operator of the receiver I issues a request for displaying a dynamic image signal from the transmitter I 1 in an enlarged scale in a state wherein the four reduced images from the four transmitters are displayed on the image output devices of the plurality of terminals in this manner will be described below.

When the request from the operator is input as an external input at the receiver I 5 through the MMI section 19, the partial dynamic image selector 18 requests, using the baseband signal, the transmitter I to modulate partial dynamic image signals corresponding to $k_{11}$, $k_{21}$, and $k_{22}$ at frequencies $f_5$, $f_6$, and $f_7$, and to transmit the modulated signals. At the same time, the partial dynamic image selector 18 sets the demodulation frequencies of the demodulators B, C, and D (22 to 24) to be $f_5$, $f_6$, and $f_7$, respectively. Furthermore, the partial dynamic image selector 18 instructs the dynamic image reconstruction/synthesizing section 25 to change the display mode.

Upon reception of the request from the receiver I 5, the transmission controller 17 of the transmitter I 1 enables the encoders B, C, and D (34 to 36). The encoders B, C, and D (34 to 36) encode the partial dynamic image signals $k_{11}$, $k_{21}$, and $k_{22}$ on the basis of formulas (2), (3), and (4), respectively. The partial dynamic image signals $k_{11}$, $k_{21}$, and $k_{22}$ are respectively modulated at the frequencies $f_5$, $f_6$, and $f_7$ by the modulators B, C, and D (13 to 15), and the modulated signals are sent onto the coaxial cable 9 through the multiplexer 16.

In the receiver I 5, the demodulators A, B, C, and D (21 to 24) demodulate the received partial dynamic image signals $k_{01}$, $k_{11}$, $k_{21}$, and $k_{22}$, and the demodulated signals are output to the dynamic image reconstruction/synthesizing section 25. In the dynamic image reconstruction/synthesizing section 25, the connection state of the internal connection section 37 is switched according to a selection signal from the partial dynamic image selector 18, and the outputs from the demodulators A to D (21 to 24) are input to the decoders A, B, C, and D (38 to 41).

The decoders A to D (38 to 41) respectively decode dynamic image signals corresponding to pixels a, b, c, and d on the basis of formulas (5), (6), (7), and (8). The decoded signals are written in the frame memories A to D (42 to 45) according to write timing signals from the system clock generator 46. The dynamic image signals written in the frame memories A to D (42 to 45) are sequentially read out according to read clock signals (FIG. 7) from the system clock generator 46. More specifically, on the odd-numbered scan lines, NH/2 read signals are alternately supplied to the memories A and B, thereby alternately reading out the dynamic image signals written in the memories A and B. On the even-numbered scan lines, NH/2 read signals are alternately supplied to the memories C and D, thereby alternately reading out the dynamic image signals written in the memories C and D. The readout signals are converted into analog signals by the D/A converter, and the analog signals are displayed as a full-size dynamic image, as shown in FIG. 5A.

In this manner, the dynamic image signals from the transmitter I are displayed in a full size on the dynamic image output device of the receiver I, as shown in FIG. 5A. However, since the partial dynamic image signal $k_{01}$ of the transmitter I 1 is transmitted at the frequency $f_1$, other receivers can synthesize and display four reduced images from the transmitters I, II, III, and IV, as shown in FIG. 5B, without changing their reception operations.

As described above, when dynamic image signals from the plurality of dynamic image signal sources are simultaneously received by the plurality of receivers, one receiver can select a transmission image size without influencing other receivers, can receive signals in a transmission image size in correspondence with the output device, and can easily change the output size on the output device. In addition, a decrease in use efficiency of the transmission path caused by an unnecessary information amount of dynamic images transmitted on the transmission path can be prevented.

[Second Embodiment]

Figure 8:
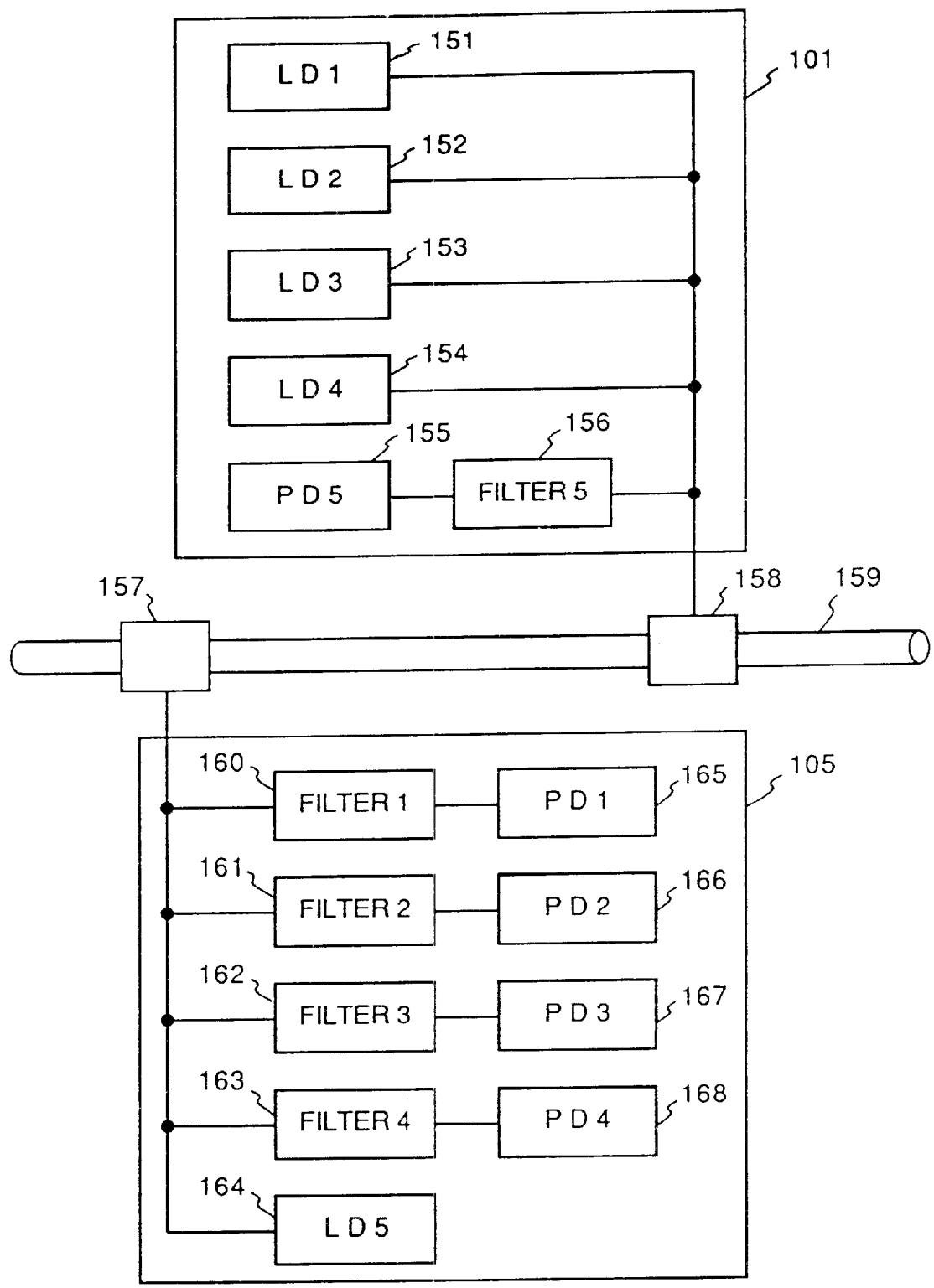
FIG. 8 is a block diagram of a dynamic image transmission apparatus according to the second embodiment of the present invention.

FIG. 8 is a block diagram showing a dynamic image transmission apparatus according to the second embodiment of the present invention. This embodiment exemplifies a case wherein a multi-channel transmission path having a plurality of channels for transmitting partial dynamic image signals employs an optical transmission system.

In FIG. 8, reference numerals 151 to 154 and 164 denote DFB (Distributed Feedback) type semiconductor laser diodes, which oscillate at a desired wavelength between 1.50 μm and 1.56 μm by controlling current amounts to be injected to corresponding electrodes, convert electrical signals from, e.g., encoders (not shown) into optical signals, and transmit the optical signals. Reference numeral 159 denotes an optical fiber cable for transmitting the optical signals emitted from the semiconductor laser diodes 151 to 154 and 164.

Reference numerals 157 and 158 denote demultiplexers for extracting the optical signals transmitted through the optical fiber cable, and guiding the extracted signals to corresponding receivers and transmitters. Reference numerals 156 and 160 to 163 denote multi-electrode DFB semiconductor optical filters which have the same principle as that of the above-mentioned DFB type laser diodes, and selectively transmit the optical signals at a desired wavelength between 1.50 μm and 1.56 μm by controlling current amounts to be injected to corresponding electrodes.

Reference numerals 155 and 165 to 168 denote PIN photodiodes for converting input optical signals into electrical signals.

In FIG. 8, the laser diodes 151 to 154 serve as the modulators like those in the first embodiment, and the optical filters 160 to 163 and the PIN photodiodes 165 to 168 serve as the demodulators like those in the first embodiment.

The laser diode 164, the photodiode 155, and the filter 156 are associated with a transmission controller and a reception controller for exchanging baseband signals used in transmission/reception control.

Other portions (not shown) may have the same arrangement as that in the first embodiment.

When the optical transmission system is employed in this manner, the transmission signal band can be widened, and dynamic images can be transmitted with higher quality.

[Third Embodiment]

Figure 9:
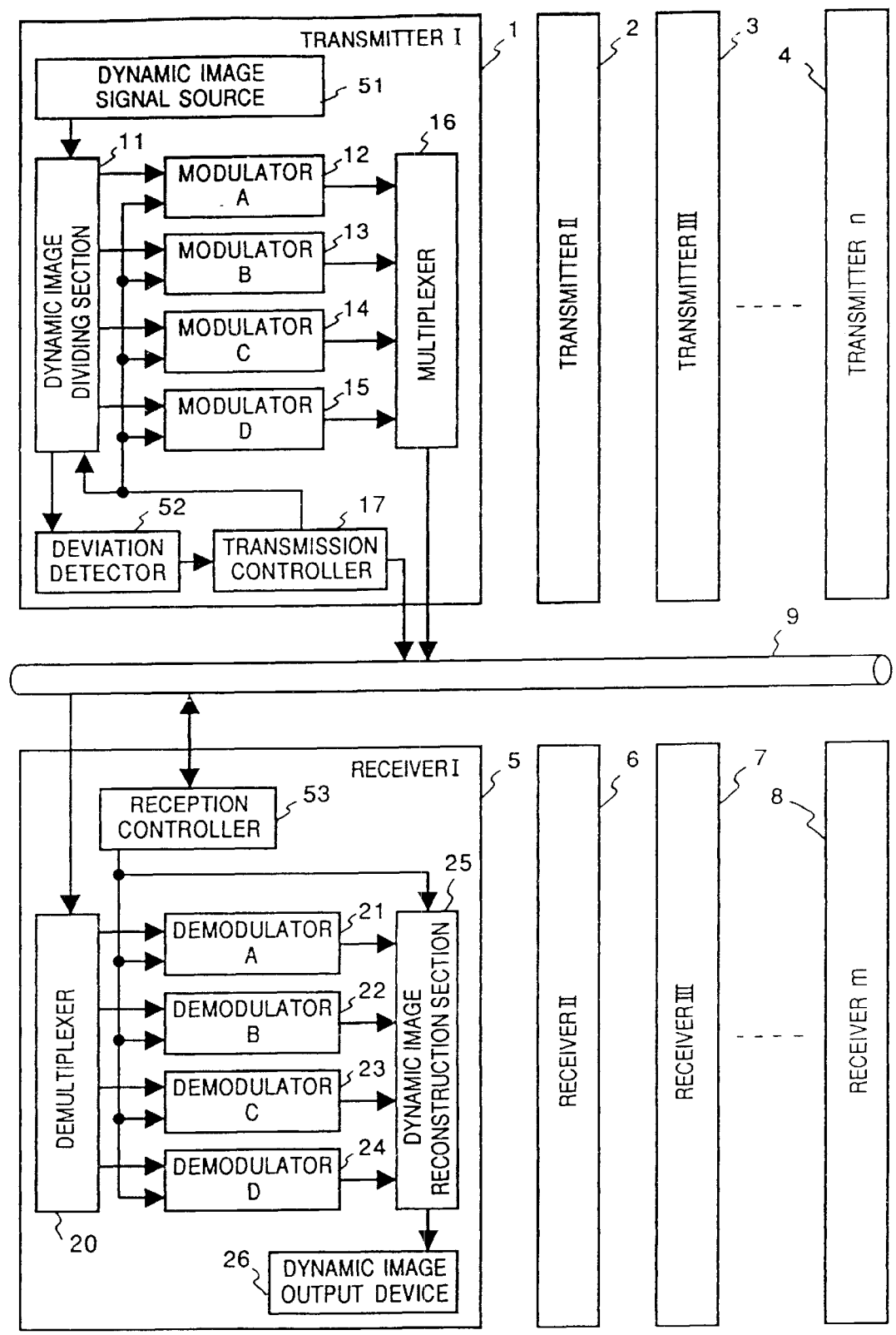
FIG. 9 is a block diagram of a dynamic image transmission apparatus according to the third embodiment of the present invention.

FIG. 9 shows a dynamic image transmission apparatus according to the third embodiment of the present invention. The same reference numerals in FIG. 9 denote the same parts as in the arrangement of the first embodiment shown in FIG. 1, and a detailed description thereof will be omitted.

In the third embodiment shown in FIG. 9, differences from the first embodiment shown in FIG. 1 are that a deviation detector 52 is arranged in addition to the transmission controller, and a reception controller 53 is arranged in place of the partial dynamic image selector 18 and the MMI section 19.

The deviation detector 52 compares a deviation between encoders C and D (to be described later) in a dynamic image dividing section 11 with a predetermined value, and counts the number of pixel units whose deviations are larger than the predetermined value. A transmission controller 17 determines modulation frequencies to be used upon transmission of partial dynamic image signals on the basis of the deviation detection result from the deviation detector 52, and modulation frequency use permission signals and modulation frequency use request signals transmitted from other terminals using broadband signals. In addition, the controller 17 controls the dynamic image dividing section 11. Furthermore, the controller 17 informs the frequencies to be used upon transmission to the reception controller 53. The reception controller 53 controls the operations of demodulators A to D (21 to 24) according to information associated with the frequencies to be used upon transmission transmitted from the transmission controller 17 of, e.g., a transmitter I 1.

Figure 10:
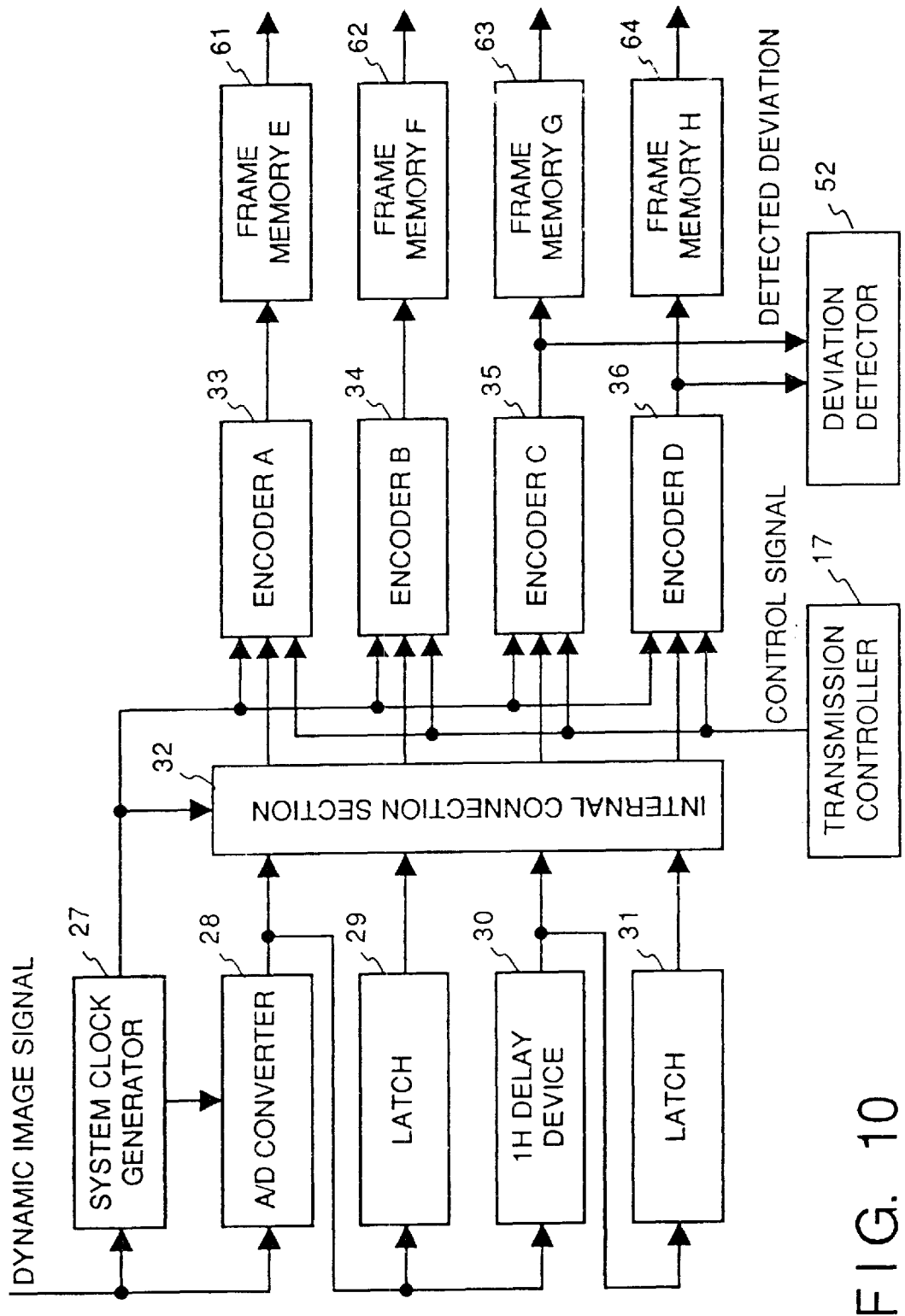
FIG. 10 is a block diagram showing details of a dynamic image dividing section shown in FIG. 9.

FIG. 10 shows the details of the dynamic image dividing section 11 of the third embodiment. In the dynamic image dividing section shown in FIG. 10, signals encoded by encoders A to D (33 to 36) are not directly supplied to modulators A to D (12 to 15) unlike in the arrangement of the first embodiment shown in FIG. 2, but are written in frame memories E to H (61 to 64).

The encoders A to D (33 to 36) encode partial dynamic image signals $k_{01}$, $k_{11}$, $k_{21}$, and $k_{22}$ on the basis of formulas (1) to (4) like in the first embodiment described above, and write the encoded signals in the corresponding frame memories E to H (61 to 64).

At this time, the outputs from the encoders C 35 and D 36 are output to the deviation detector 52. The deviation detector 52 compares the absolute value of the difference between the outputs from the encoders C 35 and D 36 with a predetermined value in units of pixel units. The detector 52 counts the number of pixel units corresponding to the absolute values of the differences which are equal to or larger than 1/4 a full-scale value of image A/D conversion. When the number of counted pixel units is larger than 1/4 the total number of pixel units, the detector 52 determines a deviation detection result when encoded signals for one frame are respectively written in the frame memories E to H (61 to 64), and supplies a signal indicating the presence of deviation (deviation detection signal) to the transmission controller 17. When the number of counted pixel units is smaller than 1/4 the total number of pixel units, the detector 52 supplies a signal indicating the absence of deviation to the transmission controller 17.

When the output from the deviation detector 52 indicates the presence of deviation, the transmission controller 17 enables the modulators A to D (12 to 15) (shown in FIG. 9), and informs to the reception controller 53 of the receiver I (5) that the next one frame to be transmitted is a frame "with a deviation".

When the output from the deviation detector 52 indicates the absence of deviation, the transmission controller 17 enables only the modulators A, B, and C (12, 13, and 14), and disables the modulator D 15. At the same time, the controller 17 informs to the reception controller 53 of the receiver I 5 that the next one frame to be transmitted is a frame "without a deviation".

The operation of the transmission controller 17 is started simultaneously with the beginning of a horizontal blanking period, and is performed in units of frames.

The partial dynamic image signals $k_{01}$, $k_{11}$, $k_{21}$, and $k_{22}$ written in the frame memories E to H (61 to 64) are read out immediately after the horizontal blanking period is ended. When the frame memories E to H (61 to 64) have dual-port arrangements, read and write accesses to the frame memories can be simultaneously performed. The partial dynamic image signals read out from the frame memories E to H (61 to 64) are respectively modulated at frequencies $f_2$, $f_3$, and $f_4$ by the modulators B, C, and D (13, 14, and 15), and the modulated signals are sent onto a coaxial cable 9 through a multiplexer 16. At this time, the operation of the modulator D 15 is controlled depending on the signal indicating the presence/absence of deviation from the deviation detector 52.

Prior to transmission of the partial dynamic image signals in units of frames, the transmitter I (1) transmits the signal indicating the presence/absence of deviation to the reception controller 53 of the receiver I (5). The reception controller 53 controls the operation of the demodulator D 24 on the basis of the signal indicating the presence/absence of deviation.

More specifically, upon reception of the signal indicating the presence of deviation, the reception controller 53 enables the demodulator D 24 upon reception of the next one frame. Upon reception of the signal indicating the absence of deviation, the controller 53 disables the operation of the demodulator D 24 upon reception of the next one frame.

Subsequently, upon reception of a predetermined number of partial dynamic image signals transmitted from the transmitter I (1), the receiver I (5) supplies the received modulated signals to a demultiplexer 20, and the signals demultiplexed by the demultiplexer 20 are supplied to the demodulators A to D (21 to 24). The demodulators A to D (21 to 24) demodulate the partial dynamic image signals $k_{01}$, $k_{11}$, $k_{21}$, and $k_{22}$, and output the demodulated signals to a dynamic image construction section 25 (in this case, the operation of the demodulator D 24 is controlled by the reception controller, as described above).

Figure 11:
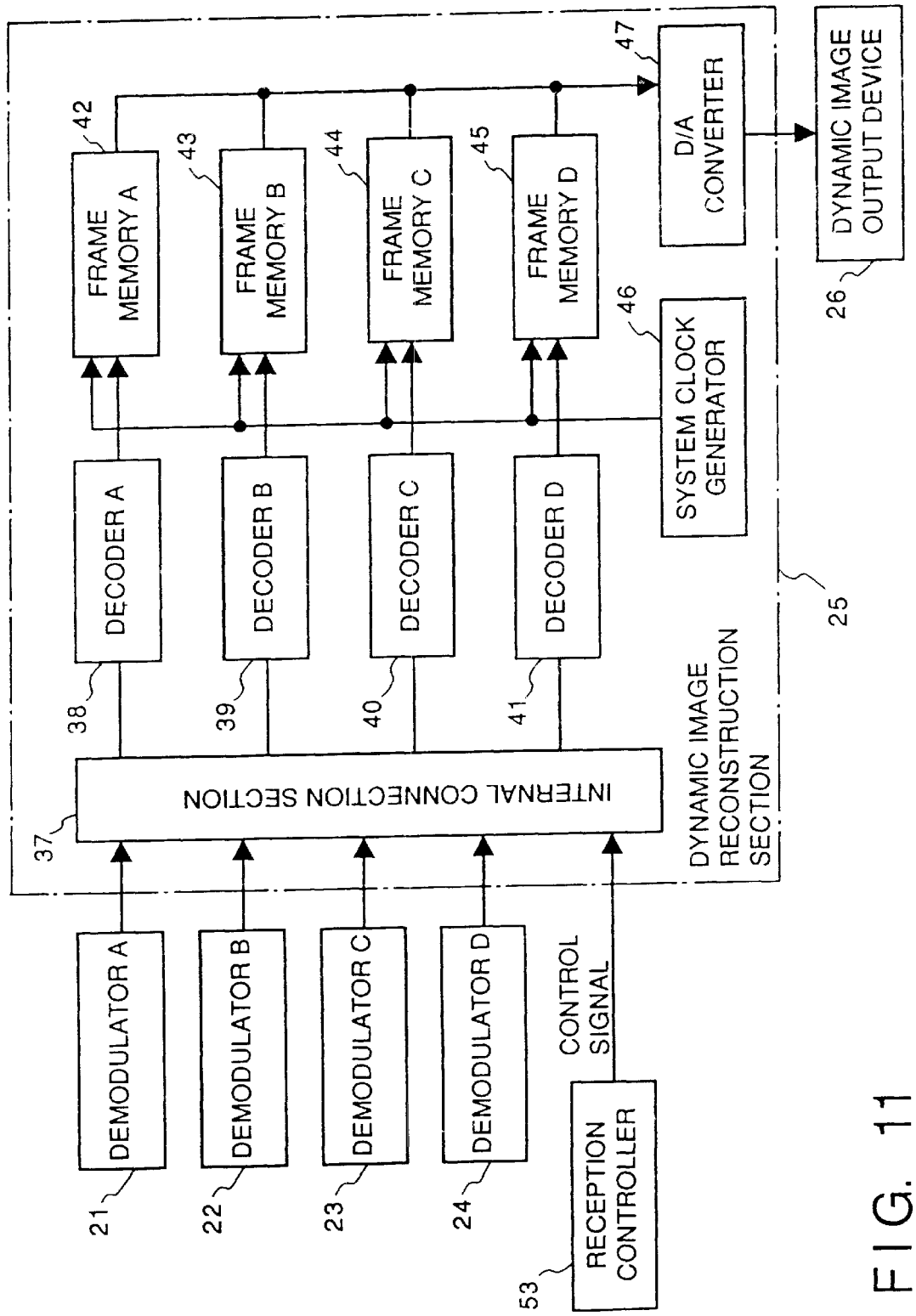
FIG. 11 is a block diagram showing details of a dynamic image reconstruction/synthesizing section shown in FIG. 9.

FIG. 11 shows the details of the dynamic image reconstruction section 25. The same reference numerals in FIG. 11 denote the same parts as in the arrangement of the first embodiment shown in FIG. 3, and a detailed description thereof will be omitted.

The difference between this embodiment and the third embodiment will be mainly described below.

In the third embodiment, the signal indicating the presence/absence of deviation from the reception controller 53 is connected as a control signal to an internal connection section 37.

In the dynamic image reconstruction section 25, the demodulated signals from the demodulators A to D (21 to 24) are input to decoders A to D (38 to 41) through the internal connection section 37.

When the control signal from the reception controller 53 is a "signal indicating the absence of deviation", the internal connection section is set such that the output from the demodulator C 23, i.e., the partial dynamic image signal $k_{21}$, is input to the input terminals of the encoders, which are to receive the output from the demodulator D 24, i.e., the partial dynamic image signal $k_{22}$, in place of the output from the demodulator D 24.

The decoders A and B (38 and 39) decode dynamic image signals corresponding to pixels a and b on the basis of formulas (5) and (6) described above regardless of the control signal, and the decoded signals are written in frame memories A and B (42 and 43) according to write timing signals from a system clock generator 46.

When the control signal from the reception controller 53 is a "signal indicating the presence of deviation", the decoders C and D (40 and 41). respectively decode dynamic image signals corresponding to pixels c and d on the basis of formulas (7) and (8). When the control signal is a "signal indicating the absence of deviation", the dynamic image signal $k_{22}$ is substituted with $k_{21}$, and pixels c' and d' are estimated as follows:

$$c' = k_{01} - k_{11} + k_{21} \quad (9)$$

$$d' = k_{01} - k_{11} - k_{21} \quad (10)$$

The outputs from the decoders C and D (40 and 41) are written in frame memories C and D (44 and 45) according to write timing signals from the system clock generator 46.

The dynamic image signals written in the frame memories A to D (42 to 45) are sequentially read out according to read signals (FIG. 7) from the system clock generator, and are supplied to a D/A converter 47. The readout signals are converted into corresponding analog signals by the D/A converter 47, and the analog signals are output to an image output device 26.

In this manner, dynamic images are output onto the dynamic image output device 26 of the receiver I (5). The number of partial dynamic images used upon transmission of dynamic images at this time is controlled by the deviation detection result from the deviation detector at the transmission side.

As described above, in the dynamic image transmission apparatus of the third embodiment, a dynamic image signal from a dynamic image signal source is divided into a plurality of (N) partial dynamic image signals, and deviation information is extracted from each partial dynamic image signal. Some or all of the plurality of partial dynamic image signals are transmitted through one or a plurality of transmission channels according to the extraction results. In the third embodiment, the transmission capacity per transmission channel is as small as a value obtained by dividing the transmission capacity per channel in the conventional method with the number N of divisions of a dynamic image.

[Fourth Embodiment]

The fourth embodiment of the present invention will be described below. Note that the overall arrangement of a dynamic image transmission apparatus according to this embodiment is the same as that of the apparatus (FIG. 9) according to the third embodiment, and an illustration and description thereof will be omitted.

In a receiver I (5) constituting the apparatus according to this embodiment, a reception controller 53 performs channel assignment control. More specifically, in response to an instruction from an MMI section (not shown), the reception controller 53 determines modulation frequencies to be used upon transmission of partial dynamic image signals according to use conditions of the modulation frequencies on the transmission path, and informs the determined frequencies to a source transmitter of partial dynamic image signals and other receivers using baseband signals. For this purpose, the reception controller 53 has a necessary channel use management table and a use level management table. At the same time, the reception controller 53 controls a demultiplexer 20, demodulators A to D (21 to 24), and a dynamic image reconstruction section 25 so as to reconstruct an original dynamic image signal based on the partial dynamic image signals transmitted at a predetermined modulation frequency.

The demultiplexer 20 selectively receives a signal, instructed by the reception controller 53, of the modulated partial dynamic image signals from a coaxial cable 9, and outputs the received signal to a predetermined demodulator. The demodulators A to D (21 to 24) demodulate desired partial dynamic image signals according to an instruction from the reception controller 53, and output the demodulated signals to the dynamic image reconstruction section 25. The dynamic image reconstruction section 25 reconstructs a dynamic image signal using the partial dynamic image signals from the demodulators according to an instruction from the reception controller 53.

When some of partial dynamic image signals divided by the transmitter of the dynamic image signal are not transmitted, the reconstruction section 25 compensates for the non-transmitted signals according to an instruction from the reception controller 53. The dynamic image signal output from the dynamic image reconstruction section 25 is output from a dynamic image output device 26 such as a display, a printer, or the like.

Figure 12:
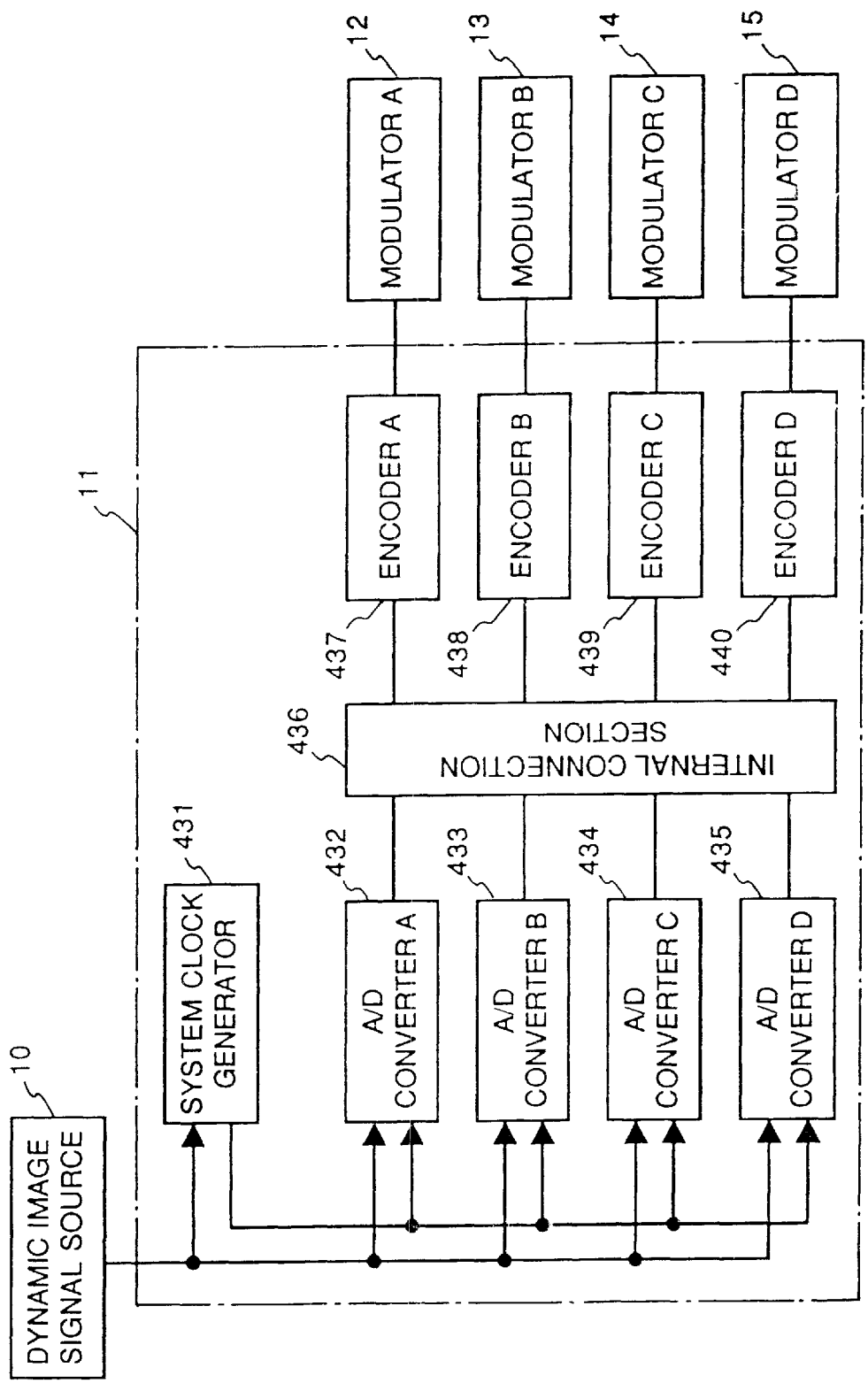
FIG. 12 is a block diagram showing details of a dynamic image dividing section according to the fourth embodiment of the present invention.

FIG. 12 is a block diagram showing the details of a dynamic image dividing section 11 according to this embodiment. In FIG. 12, a system clock generator 431 extracts a sync signal from a dynamic image signal from a dynamic image signal source 10, and generates various timing signals to be used in the dynamic image transmission apparatus of this embodiment. A/D converters A to D (432, 433, 434, and 435) A/D-convert the input dynamic image signal on the basis of sampling signals from the system clock generator 431. An internal connection section 436 inputs the outputs from the A/D converters A to D to encoders A to D (437, 438, 439, and 440). Note that the encoders A to D encode the outputs from the A/D converters A to D to four partial dynamic images on the basis of the above-mentioned predetermined formulas (1) to (4).

Figure 13:
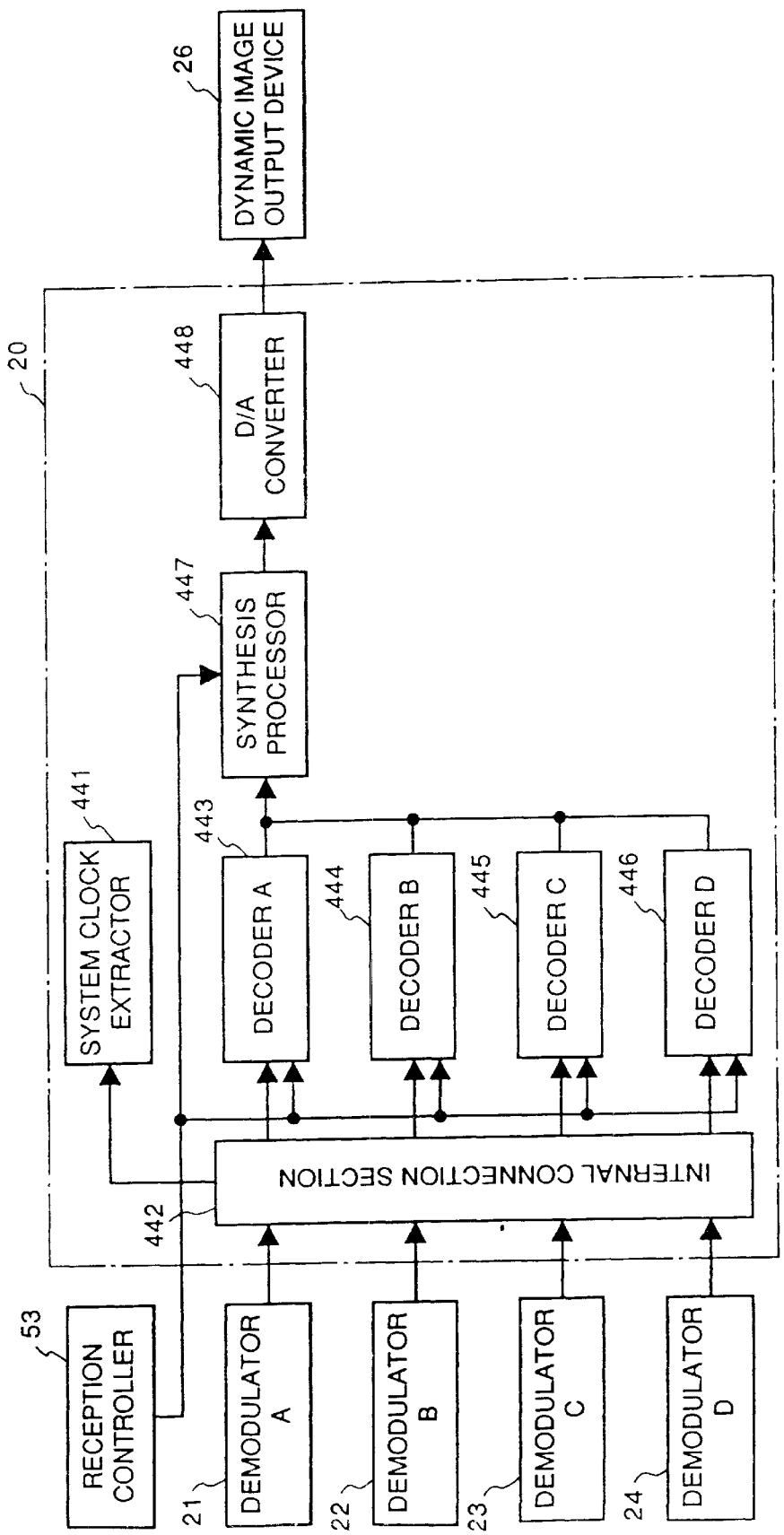
FIG. 13 is a block diagram showing details of a dynamic image reconstruction section according to the fourth embodiment of the present invention.

FIG. 13 is a block diagram showing the details of the dynamic image reconstruction section. In FIG. 13, a system clock extractor 441 extracts clocks necessary in the receiver from the transmitted dynamic image signals. Decoders A to D (443, 444, 445, and 446) decode the dynamic image signals encoded by the transmitter. An internal connection section 442 inputs the outputs from the demodulators A to D to the decoders A to D.

A synthesis processor 447 synthesizes the outputs from the decoders A to D, and outputs the synthesized data to a D/A converter 448. The D/A converter 448 converts the input digital signal into an analog signal, and outputs the converted analog signal to the dynamic image output device 26.

Figure 14:
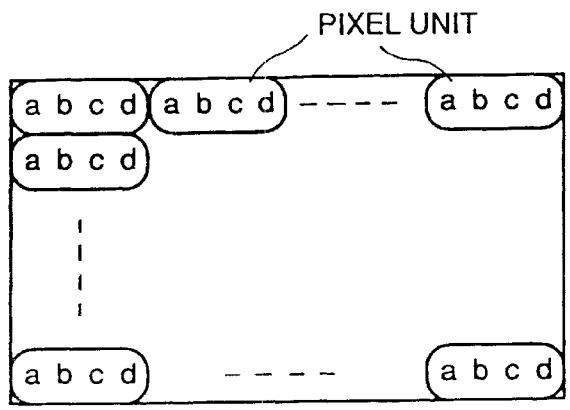
FIG. 14 is a view showing pixel units of a dynamic image signal transmitted by a dynamic image transmission apparatus according to the fourth embodiment of the present invention.

FIG. 14 shows the format of a pixel unit of a dynamic image signal to be transmitted by the dynamic image transmission apparatus according to this embodiment. As shown in FIG. 14, in this embodiment, a dynamic image signal is divided into pixel units each including four pixels a, b, c, and d which are adjacent in the scan line direction, and these pixel units are transmitted. Encoding conversion formulas used for dividing a dynamic image signal into partial dynamic image signals use the above-mentioned formulas (1) to (4), and those for decoding use the above-mentioned formulas (5) to (8).

[Description of System Operation]

The operation of the dynamic image transmission apparatus according to this embodiment will be described below.

In the receiver I (5), when, e.g., an operator inputs a transmission request for a dynamic image signal source 51 of a transmitter I (1) through an MMI section (not shown), the reception controller 53 searches empty channels from the channel use management table, and operates as follows according to the number of empty channels.

<When the Number of Empty Channels is 4 or More>

The reception controller 53 selects desired four channels from the empty channels, and records a use terminal number (although not shown, terminals having transmitters and receivers shown in FIG. 9 will be respectively referred to as a transmission terminal and a reception terminal), and encoding levels (A, B, C, and D) used in the corresponding channels in the corresponding channel columns of the channel use management table. Subsequently, the reception controller 53 informs the start of use of the corresponding channels, the encoding levels, and the transmission terminal number to reception and transmission controllers of all the transmission and reception terminals connected to the coaxial cable 9. The transmission and reception terminals correct their channel use management tables upon reception of this information.

Figure 15:
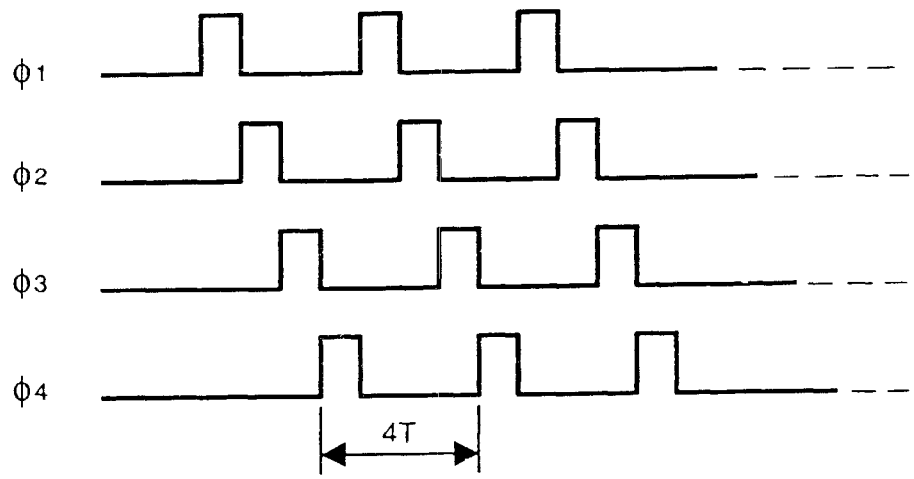
FIG. 15 is a waveform chart showing system clock waveforms according to this embodiment.

On the other hand, upon reception of this information, the transmitter I (1) transmits a dynamic image signal from the dynamic image signal source 51 as follows. More specifically, when the dynamic image signal from the dynamic image signal source 51 is input, the system clock generator 431 in the dynamic image dividing section 11 separates horizontal and vertical sync signals from the input signal, and generates sampling signals $\phi_1$, $\phi_2$, $\phi_3$, and $\phi_4$ interleaved quadruply, as shown in FIG. 15, which are to be used in the A/D converters A to D (432, 433, 434, and 435).

The A/D converters A to D sample the dynamic image signal from the dynamic image signal source 51 using the above-mentioned sampling signals in units of pixel series a, b, c, and d, thereby performing A/D conversion. The signals from the A/D converters are latched in response to a clock $\phi_0$ so as to be output at the same time, and are then output to the encoders A to D (437, 438, 439, and 440) through the internal connection section 436 serving as an internal bus.

The encoder A 437 averages the outputs from the A/D converters A to D as image signals of the pixel series a, b, c, and d at a period 4T on the basis of the above-mentioned formula (1) to convert them into a serial signal, and outputs the serial signal to a modulator A 12. The encoder B 438 obtains the difference between an average value of the outputs from the A/D converters A and B, and an average value of the outputs from the A/D converters A, B, C, and D at a period 4T on the basis of the above-mentioned formula (2) to convert the outputs into a serial signal, and outputs the serial signal to a modulator B 13.

The encoder C 439 obtains the difference between the output from the A/D converter A and an average value of the outputs from the A/D converters A and B at a period 4T on the basis of the above-mentioned formula (3) to convert the outputs into a serial signal, and outputs the serial signal to a modulator C 14. The encoder D 440 obtains the difference between the output from the A/D converter C and an average value of the outputs from the A/D converters C and D at a period 4T on the basis of the above-mentioned formula (4) to convert the outputs into a serial signal, and outputs the serial signal to a modulator D 15.

The modulators A, B, C, and D respectively modulate the serial signals output from the encoders A, B, C, and D at frequencies $f_A$, $f_B$, $f_C$, and $f_D$ corresponding to the channels and encoding levels informed from the receiver I, and output the modulated signals to a multiplexer 16. The multiplexer 16 multiplexes the modulated signals from the modulators A, B, C, and D, and outputs the multiplexed signal onto the coaxial cable 9.

In the receiver I (5), the modulated signal input through the coaxial cable 9 is demultiplexed by the demultiplexer 20, and thereafter, signals at the frequencies $f_A$, $f_B$, $f_C$, and $f_D$ are respectively demodulated by the demodulators A, B, C, and D. The demodulated signals are output to the decoders A, B, C, and D. At the same time, sync signals are extracted from the output from the demodulator A by the system clock extractor 441, thereby generating system signals $\phi_1$, $\phi_2$, $\phi_3$, and $\phi_4$ which are interleaved quadruply at a period 4T.

The signals from the demodulators A, B, C, and D are output to the decoders A, B, C, and D through the internal connection section 442. Of these decoders, the decoder A decodes a partial dynamic image signal corresponding to the pixel series at a period 4T by adding the output signals from the demodulators A, B, and C on the basis of formula (5) described above, and outputs the decoded signal to the synthesis processor 447 at the timing of the system signal $\phi_1$. The decoder B decodes a partial dynamic image signal corresponding to the pixel series b at a period 4T by subtracting the signal from the demodulator C from the sum of the outputs from the demodulators A and B on the basis of formula (6), and outputs the decoded signal to the synthesis processor 447 at the timing of the system signal $\phi_2$.

Similarly, the decoder C decodes a partial dynamic image signal corresponding to the pixel series c at a period 4T by subtracting the signal from the demodulator B from the sum of the outputs from the demodulators A and D on the basis of formula (7), and outputs the decoded signal to the synthesis processor 447 at the timing of the system signal $\phi_3$. The decoder D decodes a partial dynamic image signal corresponding to the pixel series d at a period 4T by subtracting the outputs from the demodulators B and D from the output from the demodulator A on the basis of formula (8), and outputs the decoded signal to the synthesis processor 447 at the timing of the system signal $\phi_4$. The partial dynamic image signals corresponding to the pixel series a, b, c, and d output from the decoders A, B, C, and D are reconstructed to a single dynamic image signal according to the system signals $\phi_1$, $\phi_2$, $\phi_3$, and $\phi_4$, and the dynamic image signal is sequentially converted into an analog signal by the D/A converter 448. Thereafter, the analog signal is output to the dynamic image output device 26.

<When the Number of Empty Channels is 3>

A case will be described below wherein the number of empty channels is 3.

In this case, the reception controller 53 records a use terminal number and encoding levels (A, B, and C) used in the corresponding channels in the three channel columns of the channel use management table. Furthermore, the controller 53 registers the terminal number at the end of a queue of a queue management table of the level D. Subsequently, the reception controller 53 informs, using baseband signals, the start of use of the corresponding channels, encoding levels, transmission terminal number, and registration at the end of the queue of the queue management table of the level D to the transmission and reception controllers of all the transmission and reception terminals connected to the coaxial cable 9. Upon reception of this information, the transmission and reception terminals correct their channel use management tables and queue management tables.

Upon reception of this information, the transmitter I (1) transmits the outputs from the encoders A, B, and C using the frequencies $f_A$, $f_B$, and $f_C$ on the basis of the informed three channels and encoding levels, except for the encoder D 440 and the modulator D 15. In the receiver I (5), the demodulator D 24 stops its demodulating operation, and outputs a pseudo output so that the value $k_{22}$ in formulas (7) and (8) becomes 0. In this manner, in the receiver I (5), the value $k_{22}$ is replaced with 0, and a dynamic image signal is output.

<When the Number of Empty Channels is 2>

When the number of empty channels is 2, a use terminal number and encoding levels (A and B) used in the corresponding channels are recorded in the two channel columns of the channel use management table in the same manner as in a case wherein the number of empty channels is 3. Furthermore, the terminal number is registered at the ends of queues of queue management tables of the levels D and C. Subsequently, the reception controller 53 informs, using baseband signals, the start of use of the corresponding channels, encoding levels, transmission terminal number, and registration at the ends of the queues of the queue management tables of the levels D and C to the transmission and reception controllers of all the transmission and reception terminals connected to the coaxial cable 9. Upon reception of this information, the transmission and reception terminals correct their channel use management tables and queue management tables.

Upon reception of this information, the transmitter I transmits the outputs from the encoders A and B at the frequencies $f_A$ and $f_B$ on the basis of the informed two channels and the encoding levels, except for the encoders C 439 and D 440, and the modulators C 14 and D 15. In the receiver I, the demodulators C 23 and D 24 stop their demodulating operations, and output pseudo outputs, so that values $k_{21}$ and $k_{22}$ in formulas (5), (6), (7), and (8) become 0. In this manner, in the receiver I, the values $k_{21}$ and $k_{22}$ are replaced with 0, and a dynamic image signal is output.

<When the Number of Empty Channels is 1>

When the number of empty channels is 1, a use terminal number and an encoding level (A) used in the channel are recorded in one channel column of the channel use management table. Furthermore, the terminal number is registered at the ends of queues of queue management tables of the levels B, C, and D. The reception controller 53 informs, using baseband signals, the start of use of the channel, encoding level, transmission terminal number, and registration at the ends of the queues of the queue management tables of the levels B, C, and D to the transmission and reception controllers of all the transmission and reception terminals connected to the coaxial cable 9. Upon reception of this information, the transmission and reception terminals correct their channel use management tables and queue management tables.

Upon reception of this information, the transmitter I transmits the output from the encoder A using the frequency $f_A$ on the basis of the informed one channel and the encoding level, except for the encoders B 438, C 439, and D 440, and the modulators B 13, C 14, and D 15. In the receiver I, the demodulators B 22, C 23, and D 24 stop their demodulating operations, and values $k_{11}$, $k_{21}$, and $k_{22}$ in formulas (5), (6), (7), and (8) are replaced with 0, thus outputting a dynamic image signal.

<When There is No Empty Channel>

When there is no empty channel, the reception controller 53 searches one channel used at the encoding level D from the channel use management table. If there is no corresponding channel, the controller 53 searches one channel used at the levels C and B. If there is no corresponding channel at this time, the controller 53 registers the terminal number at the end of a queue of a queue management table of the level A, and informs, using baseband signals, registration to the queue management table of the level A to the transmission and reception controllers of all the transmission and reception terminals connected to the coaxial cable 9. Upon reception of this information, the transmission and reception terminals correct their queue management tables of the level A.

On the other hand, if there is a corresponding channel, the controller 53 records a use terminal number and the encoding level A used in the channel in the corresponding channel column of the channel use management table. Furthermore, the controller 53 informs, using a baseband signal, stop of use to a terminal which used this channel so far. Upon reception of this information, the corresponding terminal stops the use of the corresponding channel, changes the encoding compression ratio according to the remaining number of use channels, and continues transmission of dynamic image signals, as described above. At the same time, this terminal registers its terminal number at the end of the queue management table corresponding to the encoding level of the channel whose use is stopped.

When the corresponding channel is released in this manner, the reception terminal receives the dynamic image signal using one channel, as described above.

When, e.g., an operator inputs the end of transmission of a dynamic image signal through the MMI section (not shown), the reception controller 53 changes the contents of the columns of the corresponding use channels of the channel use management table to be "unused". At the same time, if the terminal number has already been registered in the queue management tables of the respective levels, the controller 53 deletes the registered terminal number. Subsequently, the controller 53 fetches the terminal numbers corresponding in number to released channels from the beginning of the queue of the queue management table of the encoding level A, and informs permission of use of the corresponding channels to these terminals using broadband signals.

If there is no queue in the queue management table of the level A, the controller 53 sequentially searches the queue management tables of the levels B, C, and D. Furthermore, the controller 53 informs, using baseband signals, the end of use of the corresponding channels, a new terminal number, and the like to the controllers of all the transmission and reception terminals connected to the coaxial cable 9. Upon reception of this information, the transmission and reception terminals correct their channel use management tables and queue management tables. A terminal which acquired the right of use of new channels performs transmission of the dynamic image signal according to the total number of channels combined with the number of channels used so far.

As described above, according to this embodiment, after a dynamic image signal to be transmitted is divided into partial dynamic image signals, the encoding level of the dynamic image signal to be transmitted is determined according to the number of empty channels in the multichannel transmission path, and a signal modulated at a frequency corresponding to the determined encoding level is transmitted, thus improving use efficiency of the multichannel transmission path, and shortening the response time by decreasing the frequency of occurrence of a queue state of transmission requests of dynamic image signals. In addition, disconnection of a dynamic image signal in a dynamic image network system can be eliminated.

Figure 16:
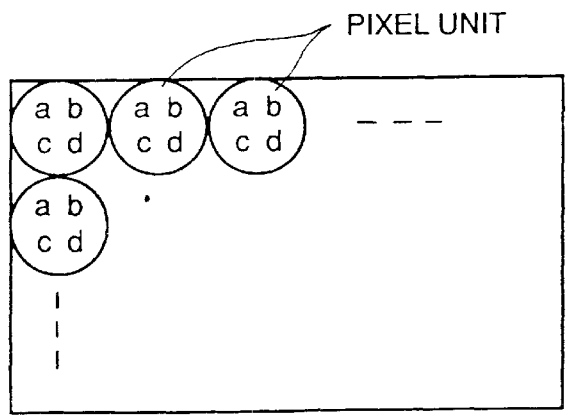
FIG. 16 is a view showing a modification of pixel units of a dynamic image signal transmitted by the dynamic image transmission apparatus according to this fourth embodiment.

The present invention is not limited to the above embodiment, and various modification may be made without departing from the scope of the invention. For example, as a modification of the format of the pixel units of a dynamic image signal to be transmitted, the dynamic image signal may be divided into pixel units, as shown in FIG. 16.

With this format, a value $k_{10}$ formula (1) obtained by dividing a dynamic image signal into partial dynamic image signals is transmitted using a one-channel transmission path, and the synthesis processor 447 in the receiver I performs known 0 interpolation, low-frequency cutoff processing, and re-sampling processing for image reduction, thereby reconstructing a satisfactory reduced dynamic image having a ½×½ size. When the reception terminal does not require a dynamic image output in an original size, the number of channels required for transmission can be decreased.

In this embodiment, all the transmission and reception terminals connected to the coaxial cable 9 have channel use management tables and queue management tables, and manage these tables. When only a specific terminal may manage these channel use management tables and queue management tables, a trouble which is caused when coherency of the management tables among the respective terminals is lost can be prevented.

Furthermore, as a multi-channel transmission path for transmitting partial dynamic image signals, an optical transmission system may be employed. More specifically, the same arrangement as that of the dynamic image transmission apparatus according to the second embodiment shown in FIG. 8 may be employed to widen the transmission signal band.

Modifications of the fourth embodiment will be described in detail below.

[First Modification]

Figure 17:
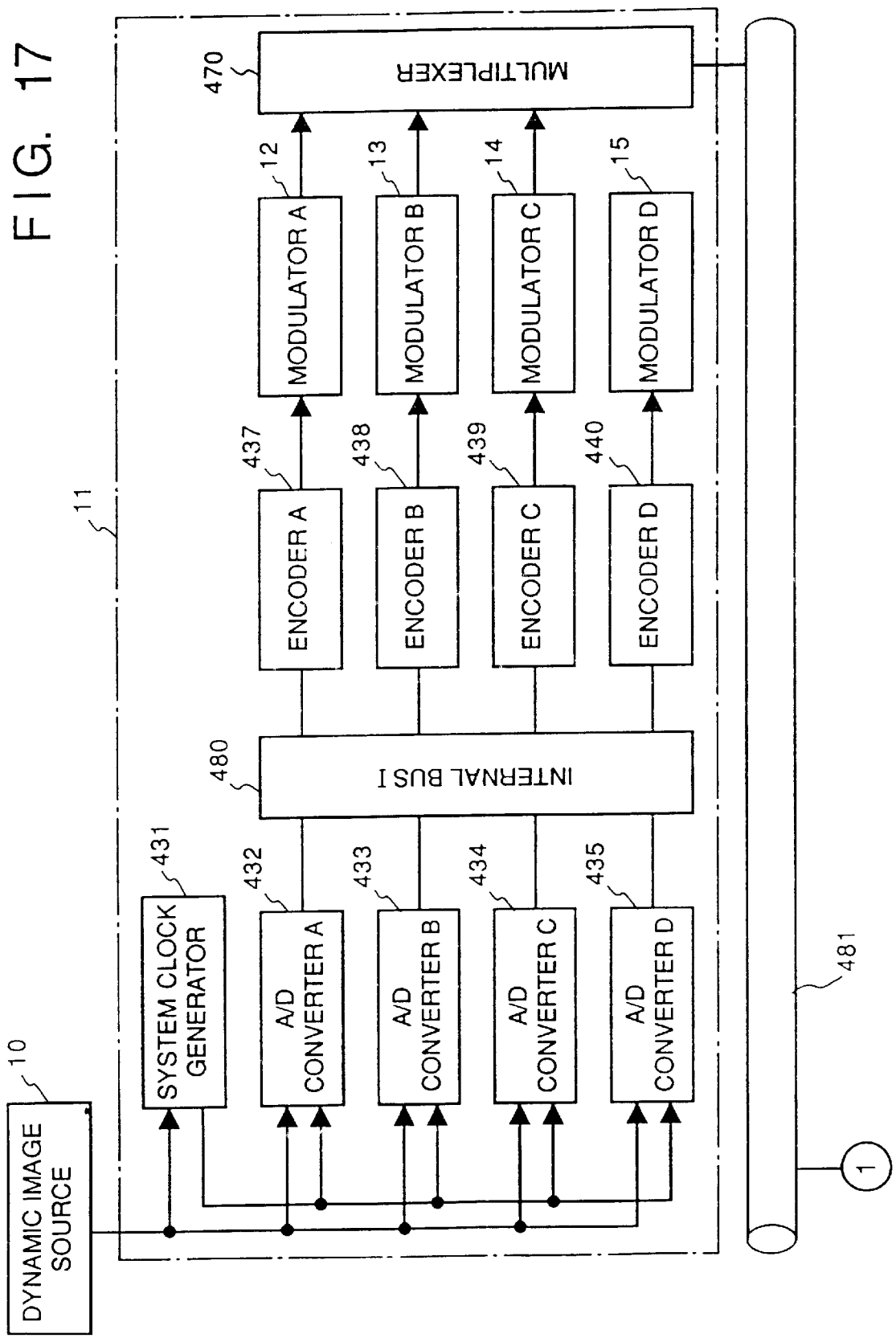
FIGS. 17 and 18 are block diagrams of an image transmission apparatus according to the first modification of the fourth embodiment.

FIG. 17 is a block diagram showing an arrangement of an image transmission apparatus (to be simply referred to as an apparatus hereinafter) according to the first modification. The same reference numerals in FIG. 17 denote the same parts as in the dynamic image dividing section of the fourth embodiment shown in FIG. 12. In FIG. 17, a dynamic image source 10 supplies a dynamic image obtained from, e.g., a VTR, a video camera, or the like as an image source, and a transmitter 11 transmits a dynamic image. A system clock generator 431 extracts sync signals from a dynamic image signal input from the dynamic image source 10, and generates various timing signals used in the system. A/D converters A to D (432 to 435) A/D-convert the input dynamic image signal on the basis of sampling signals from the system clock generator.

An internal bus I 480 corresponds to the internal connection section 436 in FIG. 12, and is a connection bus for inputting the outputs from the A/D converters A to D to encoders A to D (437 to 440). These encoders encode the outputs from the A/D converters on the basis of the above-mentioned predetermined conversion formulas (1) to (4). Modulators 12 to 15 respectively modulate the outputs from the encoders at different modulation frequencies $f_1$, $f_2$, $f_3$, and $f_4$, and consequently provide four transmission channels. The outputs from the modulators 12 to 15 are multiplexed by a multiplexer 470, and the multiplexed signal is output onto a coaxial cable 481.

In a receiver 20, a system clock extractor 441 extracts clocks necessary in the receiver from the transmitted dynamic image signal. Demodulators A to D (21 to 24) selectively receive the modulated dynamic image signals, and respectively demodulate transmission dynamic image signals at the frequencies $f_1$, $f_2$, $f_3$, and $f_4$. The outputs from these demodulators are input to decoders A to D (443 to 446) through an internal bus II 482, and the decoders decode the dynamic image signals encoded by the transmitter. A D/A converter 448 sequentially converts the outputs from the decoders A to D into analog signals, and outputs the analog signals to a monitor 483.

Encoding conversion formulas used in the apparatus according to this modification will be described in detail below.

Assuming that a pixel unit consists of $N_0$ pixels, a pixel set consisting of these $N_0$ pixels is represented by $P_0$, and an average value of image signals of the pixels belonging to the pixel set $P_0$ is represented by $m_{01}$. The pixel set $P_0$ is divided into two pixel sets $P_1$ and $Q_1$, and average values of image signals of the pixels belonging to the sets $P_1$ and $Q_1$ are respectively represented by $m_{11}$ and $n_{11}$.

Furthermore, the pixel set $P_1$ is divided into two pixel sets $P_{21}$ and $Q_{21}$, the pixel set $Q_1$ is divided into two pixel sets $P_{22}$ and $Q_{22}$, average values of image signals of the pixels belonging to the sets $P_{21}$ and $Q_{21}$ are respectively represented by $m_{21}$ and $n_{21}$, and average values of image signals of the pixels belonging to the sets $P_{22}$ and $Q_{22}$ are respectively represented by $m_{22}$ and $n_{22}$.

Subsequently, the pixel set is similarly divided until the number of pixels belonging to each of pixel sets P and Q becomes 1, and an average value of image signals of pixels belonging to each pixel set is obtained, thus obtaining $N_0$ "k"s from $N_0$ average values m and ($N_0$–1) average values n as follows:

$k_{01} = m_{01}$ $k_{11} = m_{11} - m_{01}$ $k_{21} = m_{21} - m_{11}$ $k_{22} = m_{22} - n_{11}$ $k_{31} = m_{31} - m_{21}$ $k_{32} = m_{32} - n_{21}$ $k_{33} = m_{33} - m_{22}$ $k_{34} = m_{34} - n_{22}$

In the apparatus according to this modification, since a dynamic image signal to be transmitted is divided in pixel units each including four pixels a, b, c, and d adjacent in the scan direction, the above-mentioned formulas (1) to (8) are used as the encoding and decoding conversion formulas.

The operation of the apparatus according to this modification will be described below.

In FIG. 17, when a dynamic image signal is input from the dynamic image source 10, the system clock generator 431 separates horizontal and vertical sync signals from the dynamic image signal, and generates sampling signals (FIG. 15) interleaved quadruply at a period 4T four times the pixel period of the input dynamic image signal, which signals are to be used in the A/D converters A to D. The A/D converters A to D sample the dynamic image signal from the dynamic image source 10 in units of pixel series a, b, c, and d using the quadruply interleaved sampling signals $ø_1$, $ø_2$, $ø_3$ and $ø_4$, thus performing A/D conversion. The signals from the A/D converters A to D are latched in response to a clock $ø_0$ so as to be simultaneously output, and thereafter, are output to the encoders 437 to 440 through the internal bus I 480. Note that the operations of the encoders A to D and the modulators A to D are the same as those of the encoders A to D and the modulators A to D according to the fourth embodiment, and a detailed description thereof will be omitted.

Figure 18:
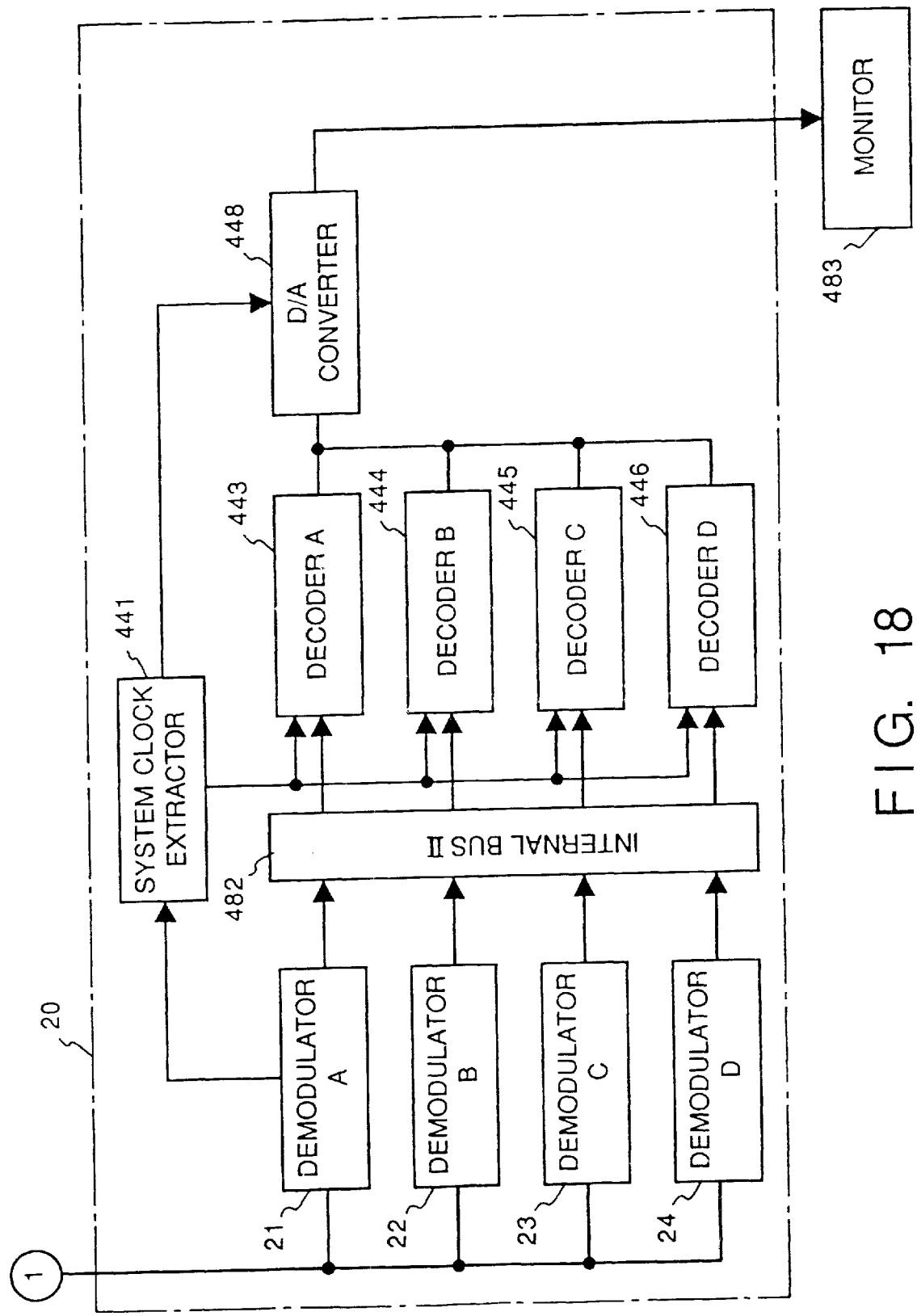

Since the operation of the receiver 20 shown in FIG. 18 is also the same as that of the receiver according to the fourth embodiment, a detailed description thereof will be omitted.

In this manner, according to this modification, pixels constituting each pixel unit are subjected to sampling processing using different sampling clocks, and the processed pixels are parallelly processed and transmitted. For this reason, the period of the system clocks can be prolonged, thus allowing easy manufacture and adjustment of the apparatus.

In each transmission channel, since only the difference between the average values of image signals of a plurality of pixels is transmitted, the number of bits upon quantization can be reduced, thus improving transmission efficiency.

In the image transmission apparatus according to the above modification, an optical transmission system may be used as a means for transmitting images in a plurality of channels. More specifically, in FIG. 19, semiconductor lasers (LDs) 461a to 464a respectively oscillate at wavelengths of 0.78 μm, 0.88 μm, 1.3 μm, and 1.55 μm according to electrical signals from sampling sections (not shown). Optical signals emitted from the semiconductor lasers 461a to 464a are transmitted through an optical fiber cable 465a. A demultiplexer 466a fetches the optical signals transmitted through the optical fiber cable, and guides the extracted signal to a receiver.

The signals from the optical fiber cable are selectively transmitted through optical filters 467a to 470a at the above-mentioned wavelengths of 0.78 μm, 0.88 μm, 1.3 μm, and 1.55 μm, and PIN photodiodes (PDs) 471a to 474a convert input optical signals into electrical signals.

Figure 19:
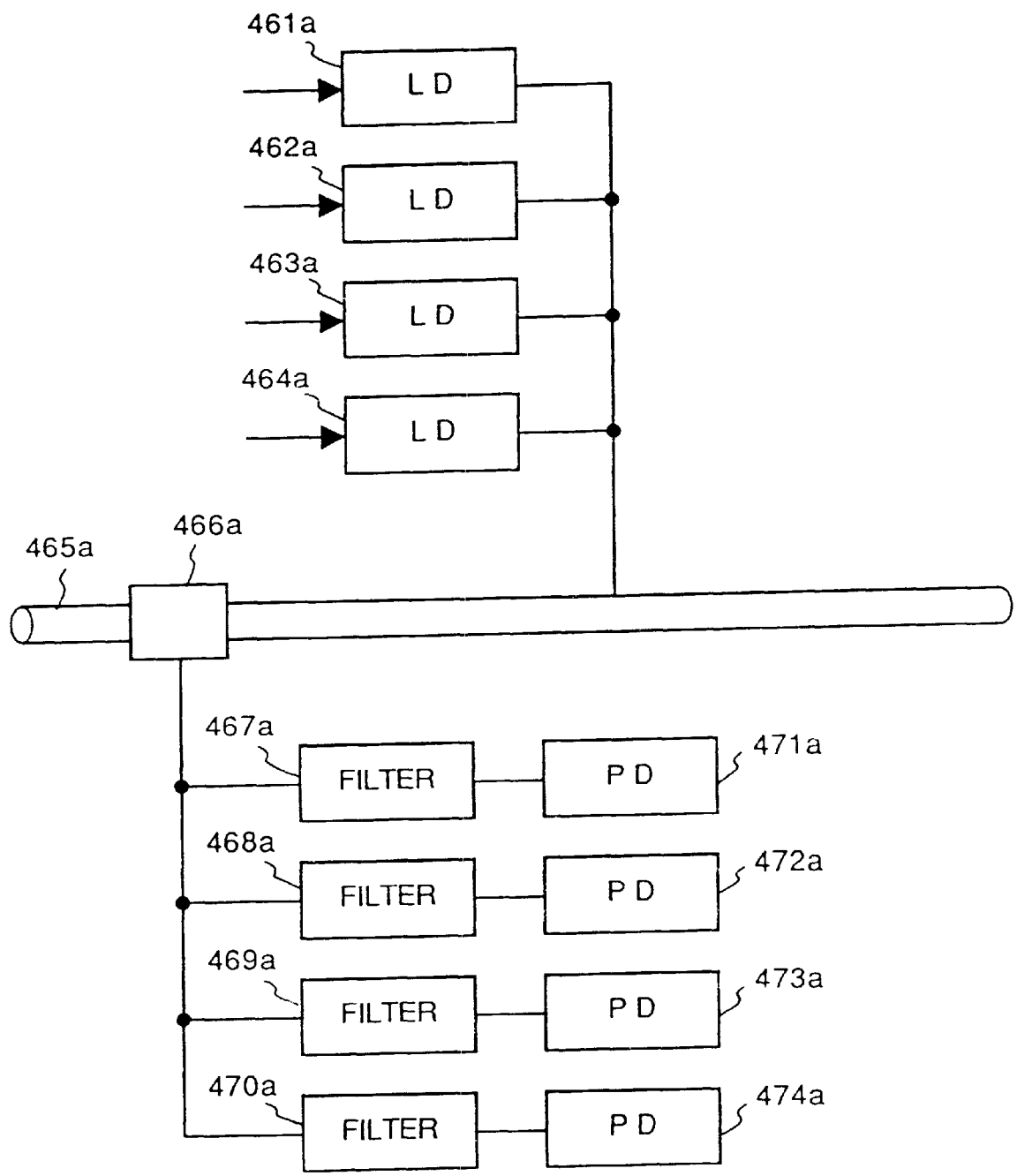
FIG. 19 is a block diagram showing a case wherein an optical transmission system is employed in the image transmission apparatus according to the first modification.

The semiconductor lasers 461a to 464a in FIG. 19 correspond to the modulators in the above modification, and the optical filters 467a to 470a and the PIN photodiodes 471a to 474a correspond to the demodulators. In the image transmission apparatus using such an optical transmission system, other constituting elements (not shown) can be the same as those in the above modification, thus obtaining the same effect as in the above modification.

[Second Modification]

Figure 20:
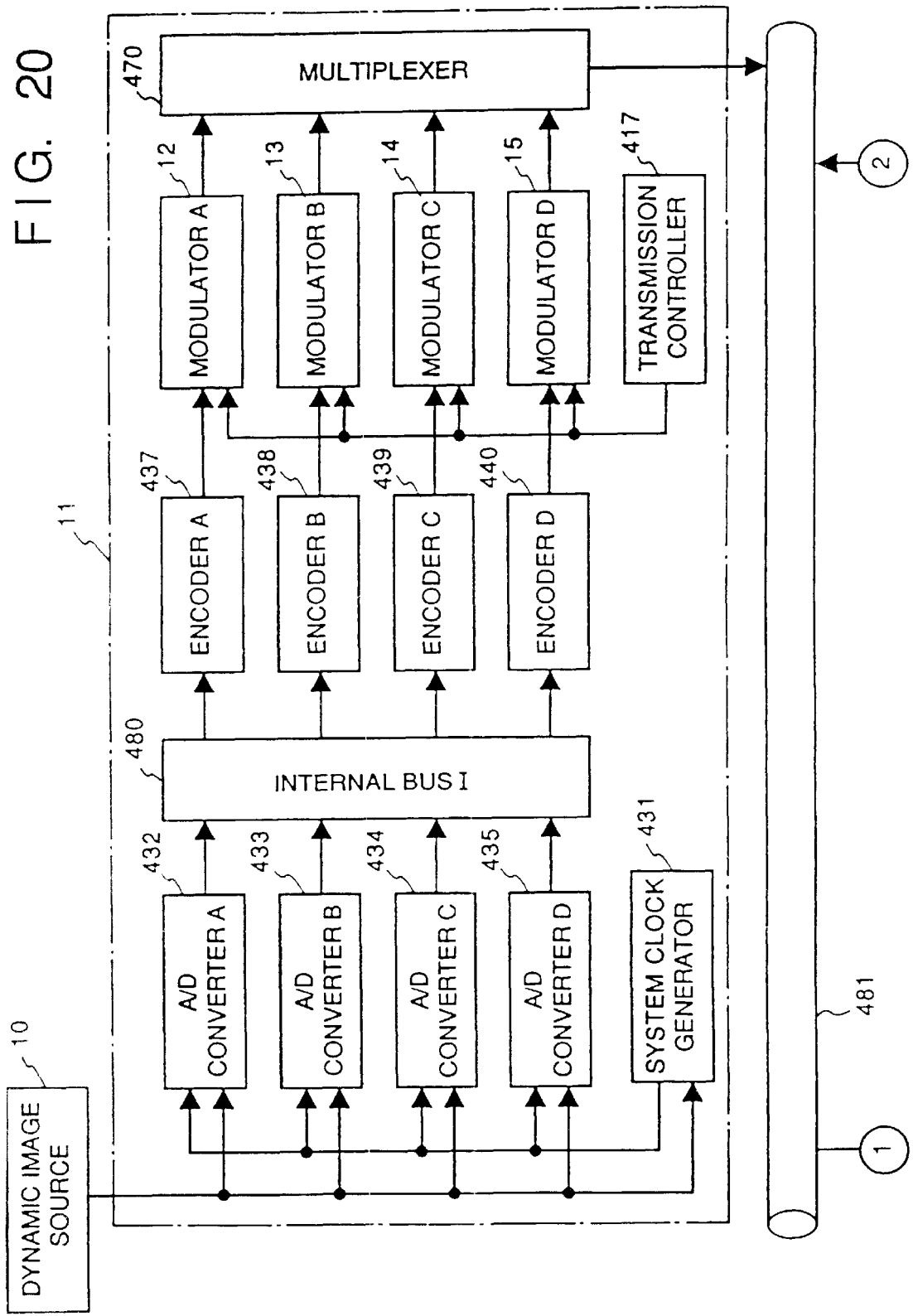
FIGS. 20, 21A and 21B are block diagrams of an image transmission apparatus according to the second modification of the fourth embodiment.

FIG. 20 is a block diagram showing an arrangement of an image transmission apparatus according to the second modification.

The same reference numerals in FIG. 20 denote the same parts as in the dynamic image dividing section according to the fourth embodiment shown in FIG. 12, and a detailed description thereof will be omitted.

Figure 21:
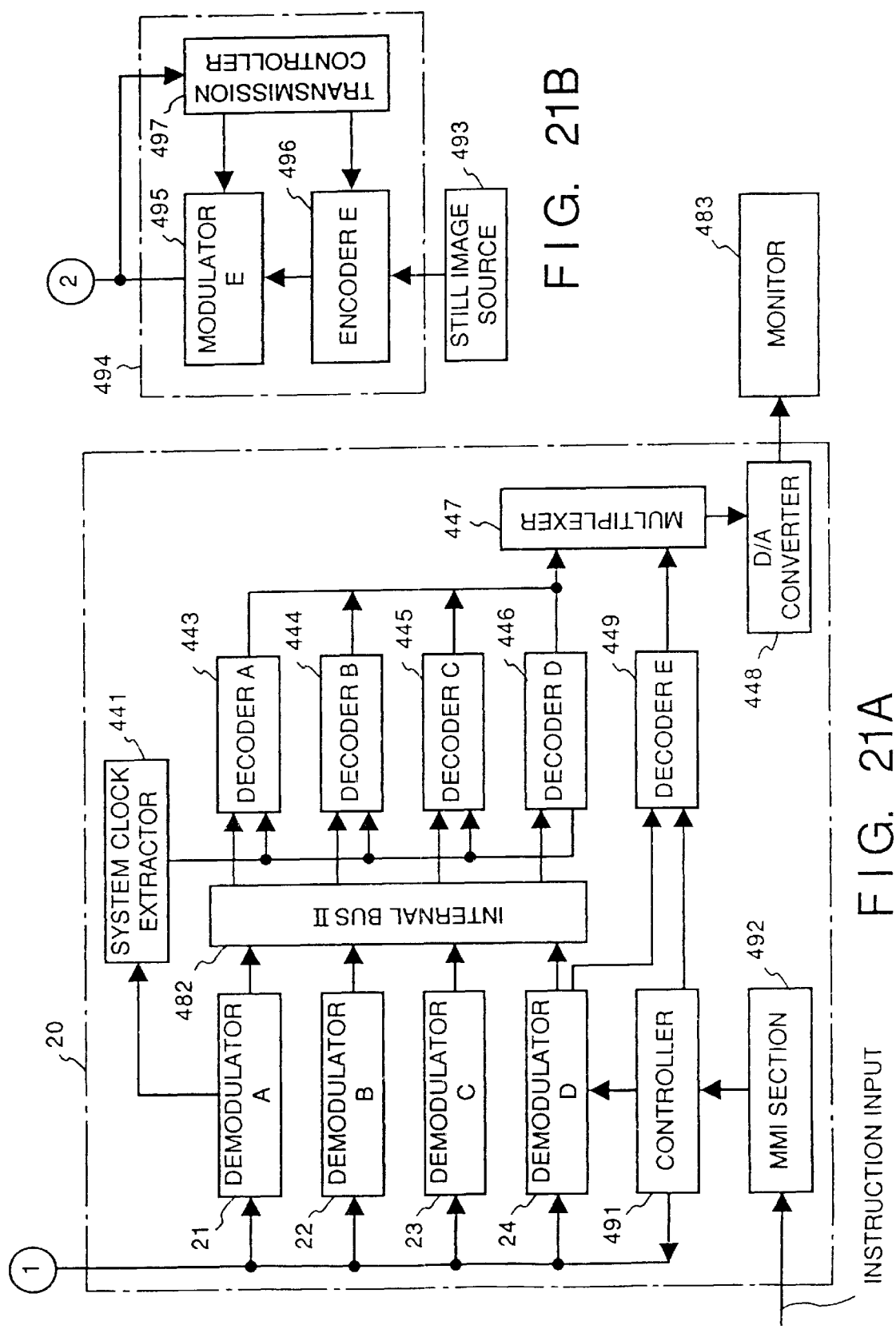

In FIG. 20, a dynamic image transmitter 11 transmits a dynamic image signal output from a dynamic image source 10, and a still image transmitter 494 (FIG. 21B) transmits a still image signal output from a still image source 493. A receiver 20 receives the dynamic image and still image signals through a coaxial cable 481, synthesizes these signals, and outputs the synthesized signal.

A controller 491 supplies control signals to the dynamic image transmitter 11 and the still image transmitter 494 according to an instruction from an MMI section 492 for controlling a user interface, and controls reception of dynamic image and still image signals at the receiver 20. A decoder E (449) decodes a still image signal encoded by an encoder E (496). A synthesizer 447 synthesizes dynamic image signals decoded by decoders A to D, and a still image signal decoded by the decoder E. The synthesized picture signal is D/A converted by a D/A converter 448, and the analog signal is output to a monitor 483.

In the transmitter 494 for transmitting a still image, a still image signal obtained from the still image source 493 is encoded by the encoder E (496), and the encoded signal is modulated by a modulator E (495) at a frequency $f_4$. The modulated signal is sent onto the coaxial cable 481. A transmission controller 2 (497) controls the operations of the modulator E and the encoder E according to a transmission control signal sent from the receiver 20.

Since the encoding conversion formulas in this modification are the same as those in the first modification, a detailed description thereof will be omitted. In addition, system clock waveforms are also the same as those in the first embodiment.

When a synthesis display request of a still image from the still image source 493 is input through the MMI section 492 while a dynamic image from the dynamic image source 10 is displayed on the monitor 483, the controller 491 supplies a bandwidth limit signal to the dynamic image transmitter 11 to cause the transmitter 11 to stop use of a transmission channel corresponding to the modulation frequency $f_4$, and to transmit dynamic image signals using only three channels. Control is made in such a manner that the demodulator D (24) outputs a signal to the decoder E (449), pseudo data is output onto an internal bus II 482 so that the value $k_{22}$ in the above-mentioned formula is 0, and the decoder E outputs a signal to the synthesizer 447. Furthermore, the controller 491 transmits a still image transmission request signal to the still image transmitter 494 using a baseband signal.

Upon reception of the bandwidth limit signal, a transmission controller 1 (417) of the dynamic image transmitter 11 stops the operation of the modulator D (15) corresponding to the modulation frequency $f_4$. Upon reception of the still image transmission request signal, the transmission controller 2 (497) of the still image transmitter 494 enables the modulator E (495) and the encoder E (496). A still image output from the still image source 493 is encoded by the encoder E, and the encoded signal is modulated at the frequency $f_4$ by the modulator E. The modulated signal is output onto the coaxial cable 481. The still image signal modulated at the frequency $f_4$ is demodulated by the demodulator D (24), and is then decoded by the decoder E (449). The decoded signal is then output to the synthesizer 447.

On the other hand, dynamic image signals encoded by the encoders A to D are respectively modulated at frequencies $f_1$, $f_2$, and $f_3$ by the modulators A to C, and the modulated signals are output onto the coaxial cable 481 through a multiplexer 470. The dynamic image signals modulated at the frequencies $f_1$, $f_2$, and $f_3$ are demodulated by the demodulators A to C in the receiver 20, and the demodulated signals are output to the decoders A to C through the internal bus II 482. The decoders A and B perform decoding in the same manner as in a case wherein the dynamic image signals are transmitted using four channels, and image signals corresponding to pixel series a and b are output to the synthesizer 447. In the decoders C and D, since the value "0" as the pseudo data output from the demodulator D is used as the value $k_{22}$ in the above-mentioned formulas (7) and (8) necessary for decoding, the output value is given by:

$$k_{01} - k_{11} = 1/2(c-d) \tag{9}$$

Then, the average value of two pixel series c and d is output to the synthesizer 447.

As a result, the synthesizer 447 synthesizes the dynamic image signals output from the decoders A to D, and the still image signal output from the decoder E, and the synthesized signal is output to the monitor 483.

As described above, according to this modification, one of a plurality of channels on the transmission path is assigned to transmission of a still image, and pseudo data is given for a dynamic image in decoding processing in the receiver. Thus, both the dynamic image and still image can be transmitted simultaneously without assigning a special-purpose channel for a still image on the transmission path, thus improving transmission efficiency.

In this modification, an ISDN transmission path may be used as the transmission path, or other transmission paths may be used.

Furthermore, other encoding methods, e.g., an ADCT method, a vector quantization method, and a dynamic image encoding method including motion compensation may be adopted. In this case, quantization parameters for compression may be controlled to control the compression ratio.

Figure 22:
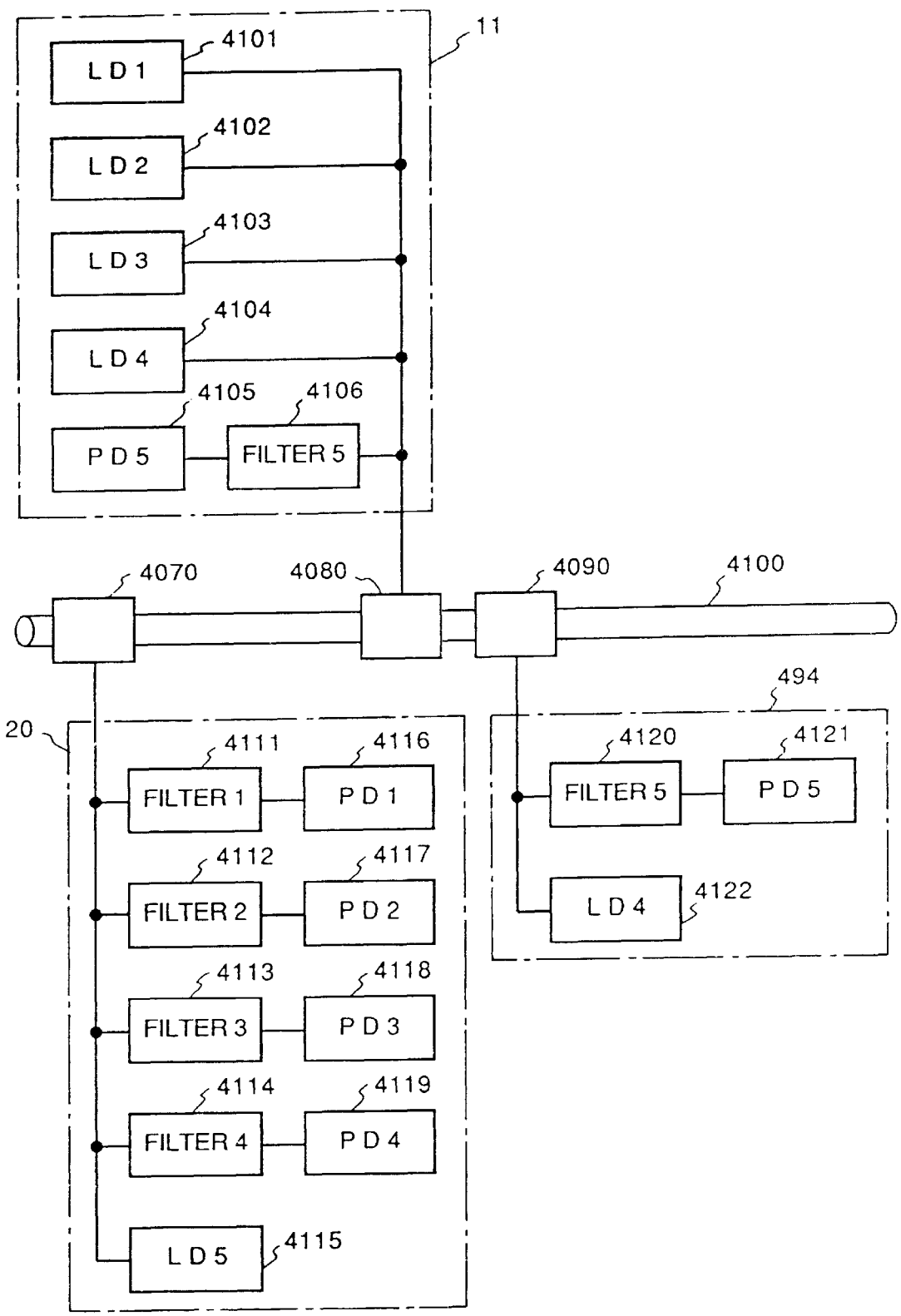
FIG. 22 is a block diagram showing a case wherein an optical transmission system is employed in the image transmission apparatus according to the second modification.

In the image transmission apparatus according to this modification, as shown in FIG. 22, an optical transmission path having a plurality of channels may be used as a signal transmission means. FIG. 22 illustrates only a transmitter, and does not illustrate the same parts as in the second modification.

In FIG. 22, semiconductor lasers (LD1 to LD4) 4101 to 4104 in the dynamic image transmitter 11 oscillate optical signals at wavelengths of 0.78 μm, 0.83 μm, 0.88 μm, and 1.3 μm upon reception of electrical signals from encoders (not shown), and serve as modulators. A semiconductor laser (LD5) 4115 oscillates an optical signal at a wavelength of 1.55 μm according to an electrical signal for transmission control as a baseband signal in the above modification.

Multiplexer/demultiplexers 4070, 4080, and 4090 serve to multiplex or demultiplex optical signals to or from signals on an optical fiber cable 4100, and optical filters 1 to 4 (4111 to 4114) selectively transmit optical signals at wavelengths of 0.78 μm, 0.83 μm, 0.88 μm, and 1.3 μm. PIN photodiodes (PD1 to PD4) convert incident optical signals into electrical signals, and serve as demodulators together with the optical filters.

An optical filter 5 (4120) selectively transmits an optical signal at a wavelength of 1.55 μm, and PIN photodiodes 4105 and 4121 convert incident optical signals into electrical signals. The LD5 (4115), filters 5 (4106 and 4120), and photodiodes PD5 (4105 and 4121) are arranged for transmitting/receiving a baseband signal as a signal for controlling the number of transmission channels.

In this case, as input signals to the LD1 to LD4 (4101 to 4104), electrical signals from encoders (not shown) are used, and as an input signal to the LD5 (4115), an output electrical signal from a controller is used. In addition, the output signals from the PD1 to PD4 (4116 to 4119) are connected to an internal bus II and decoders, and the outputs from the photodiodes PD5 (4105 and 4121) are connected to transmission controllers 1 and 2 (neither are shown), thus realizing the operation of the second modification using the optical transmission path.

[Fifth Embodiment]

The fifth embodiment of the present invention will be described in detail below with reference to the accompanying drawings.

Figure 23:
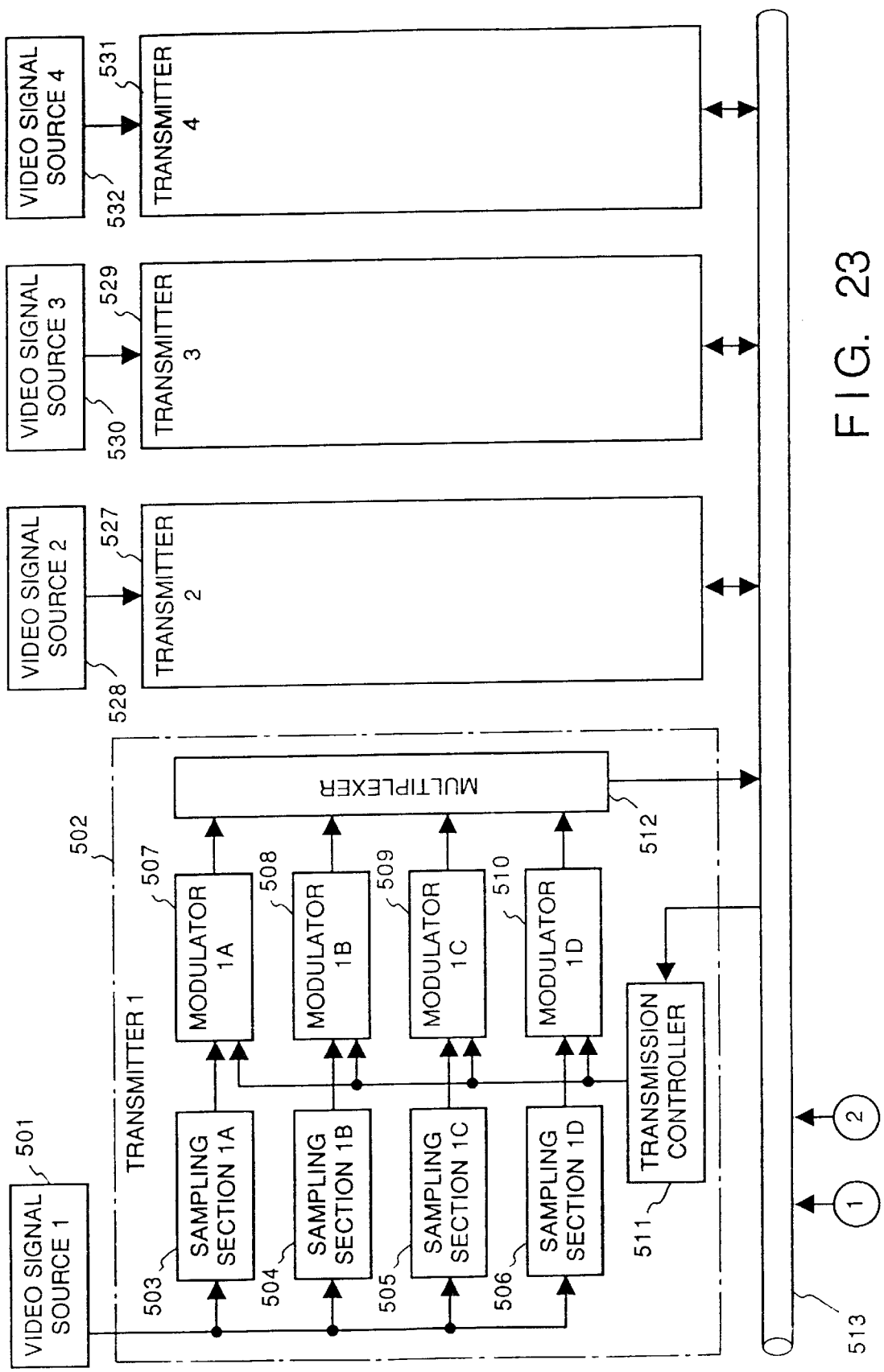

FIG. 23 is a block diagram showing the overall arrangement of a dynamic image transmission apparatus according to the fifth embodiment of the present invention. In FIG. 23, a video signal source 1 (501), a video signal source 2 (528), a video signal source 3 (530), and a video signal source 4 (532) as a plurality of dynamic image sources are connected to transmitters 1 to 4 (502, 527, 529, and 531) corresponding to these signal sources, and a receiver 514 through a coaxial cable 513 as a signal transmission path. For the sake of simplicity, a dynamic image transmission apparatus serving as a transmitter and a dynamic image transmission apparatus serving as a receiver will be described without being discriminated from each other.

The video signal source 1 (501) employs a VTR, a video camera, or the like as a dynamic image source. In the transmitter 1 (502), a video signal output from this video signal source 1 is sampled in four different sampling systems A, B, C, and D, and the sampled signals are sent onto the coaxial cable 513 at corresponding modulation frequencies (to be described later). More specifically, sampling sections 1A, 1B, 1C, and 1D (503, 504, 505, and 506) divide a dynamic image to NH/2 (horizontal direction)×NV/2 (vertical direction) pixel units each including four adjacent dynamic image pixels like in the first embodiment shown in FIG. 4, and sample the pixels of the pixel units in the four sampling systems A, B, C, and D. Modulators 1A, 1B, 1C, and 1D (507, 508, 509, and 510) respectively modulate the video signals sampled by the sampling sections 1A, 1B, 1C, and 1D at frequencies $f_A$, $f_B$, $f_C$, and $f_D$. Note that a modulation frequency falling within the range of 10 MHz to 100 MHz is used.

A transmission controller 511 receives a transmission control baseband signal sent from the receiver 514, and ON/OFF-controls the outputs from the modulators 1A, 1B, 1C, and 1D. Then, the output signals from the modulators 1A, 1B, 1C, and 1D are multiplexed by a multiplexer 512, and the multiplexed signal is output onto the coaxial cable 513.

The receiver 514 selectively receives a plurality of video signals input through the coaxial cable 513 according to an instruction of an operator input from a man-machine interface (MMI) section 525, and displays the received signals on a monitor 526 to have a predetermined arrangement.

In the receiver 514, demodulators A, B, C, and D (515, 516, 517, and 518) demodulate the video signals modulated at the frequencies $f_A$, $f_B$, $f_C$, and $f_D$ by the transmitter. Memories A, B, C, and D (519, 520, 521, and 522) store image data from the demodulators. An image output controller 523 performs read control of video signals from the memories A, B, C, and D according to an instruction from a controller 524. The controller 524 supplies a control signal to the image output controller 523 according to an instruction of an operator input through the MMI section 525, and supplies a transmission control baseband signal from the transmitter onto the coaxial cable 513.

The monitor 526 displays one or a plurality of dynamic images in a format to be described later. Note that the transmitters 2, 3, and 4 (527, 529, and 531) have the same arrangement as that of the transmitter 1, and are respectively connected to the video signal sources 2, 3, and 4 (528, 530, and 532).

A control sequence in the dynamic image transmission apparatus according to this embodiment will be described below.

Figure 25:
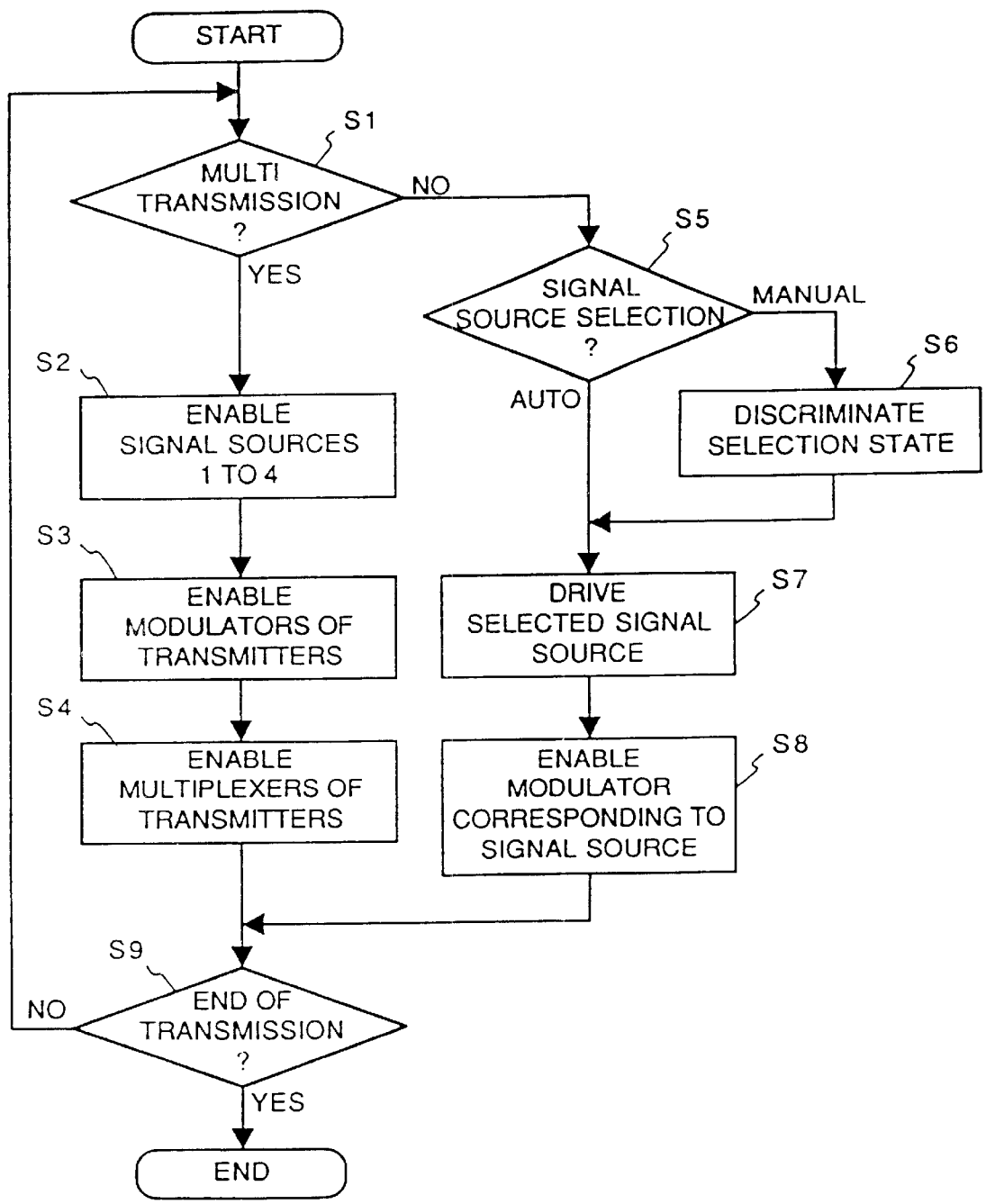
FIG. 25 is a flow chart showing a control sequence in the dynamic image transmission apparatus of the fifth embodiment.

The flowchart of FIG. 25 shows the outline of the overall control in the dynamic image transmission apparatus according to this embodiment. In this control, the sampling rate of each dynamic image is switched according to the number of dynamic images to be controlled. In step S1 in FIG. 25, it is checked if there are plurality of dynamic images to be transmitted. If YES in step S1, the video signal sources 1 to 4 are enabled in step S2, and the modulators of the transmitters 1 to 4 are enabled in step S3. In step S4, the multiplexers of the transmitters are enabled.

If NO in step S1, i.e., if it is determined that dynamic image transmission is not multi transmission, it is checked in step S5 if the video signal sources 1 to 4 are selected automatically or manually. If it is determined that a signal source is selected manually, the flow advances to step S6 to discriminate the selected signal source. In step S7, the signal source selected automatically or manually is driven, and in step S8, the modulators corresponding to the selected signal source are enabled.

In step S9, it is checked if desired transmission is completed. If NO in step S9, the flow returns to step S1.

A dynamic image display in the dynamic image transmission apparatus according to this embodiment will be described below.

Figure 26A:
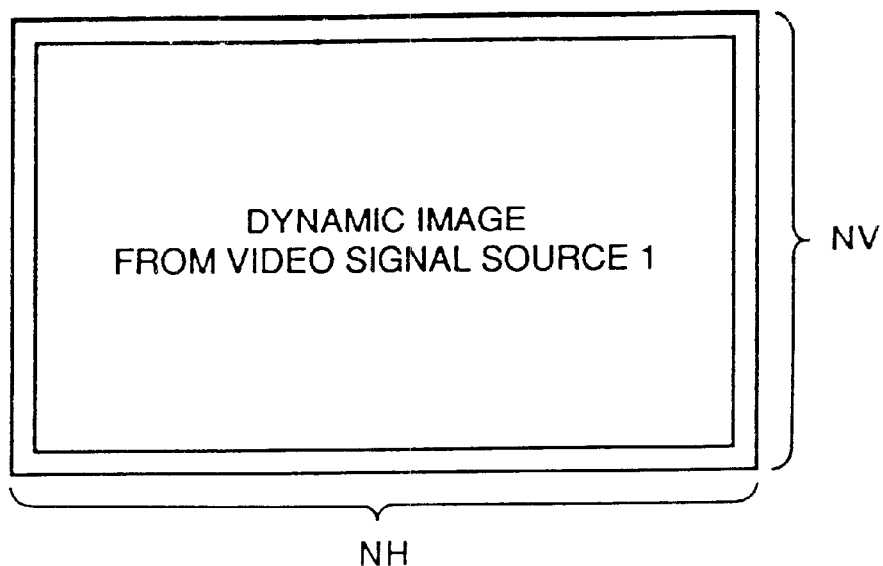
FIGS. 26A and 26B are views showing display examples on a monitor according to the fifth embodiment.
Figure 26B:
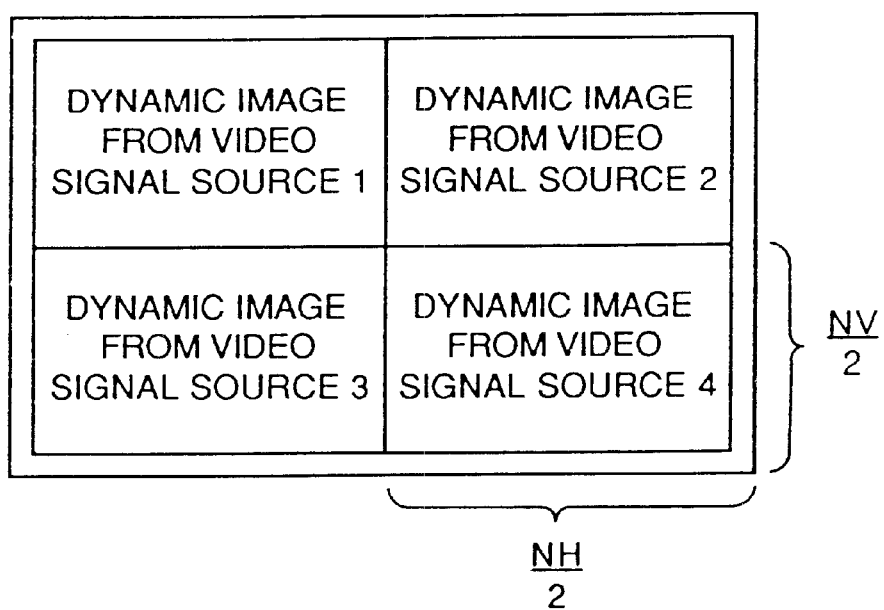

FIG. 26A shows a case wherein a dynamic image from the video signal source 1 is displayed on the entire screen of the monitor 526 to have the number NH of horizontal pixels and the number NV of vertical pixels. FIG. 26B shows a case wherein dynamic images from the video signal sources 1, 2, 3, and 4 are displayed on the screen so that each dynamic image has the number NH/2 of horizontal pixels and the number NV/2 of vertical pixels.

These display control modes will be described in detail below.

When an operator inputs an instruction for performing a display shown in FIG. 26A through the MMI section 525 (FIG. 24), the controller 524 sends transmission control baseband signals to the transmitters 2, 3, and 4 to stop all the modulators constituting each transmitter. Subsequently, the controller 524 sends a transmission control baseband signal to the transmitter 1 to enable all of its modulators.

Upon reception of the transmission control baseband signal, the transmission controller 511 of the transmitter 1 enables all the modulators 1A, 1B, 1C, and 1D. A video signal input from the video signal source 1 is sampled by the sampling sections 1A, 1B, 1C, and 1D in units of NH/2 (horizontal direction)×NV/2 (vertical direction) pixels, and the sampled signals are then modulated by the modulators 1A, 1B, 1C, and 1D at the frequencies $f_A$, $f_B$, $f_C$, and $f_D$. The modulated signals are multiplexed by the multiplexer 512, and the multiplexed signal is sent onto the coaxial cable 513.

The modulated video signal sent onto the coaxial cable 513 is demodulated by the demodulators A, B, C, and D of the receiver 514, and the demodulated signals are written in the memories A, B, C, and D. The controller 524 sets the image output controller 523 in a full pixel size mode.

Figure 7:
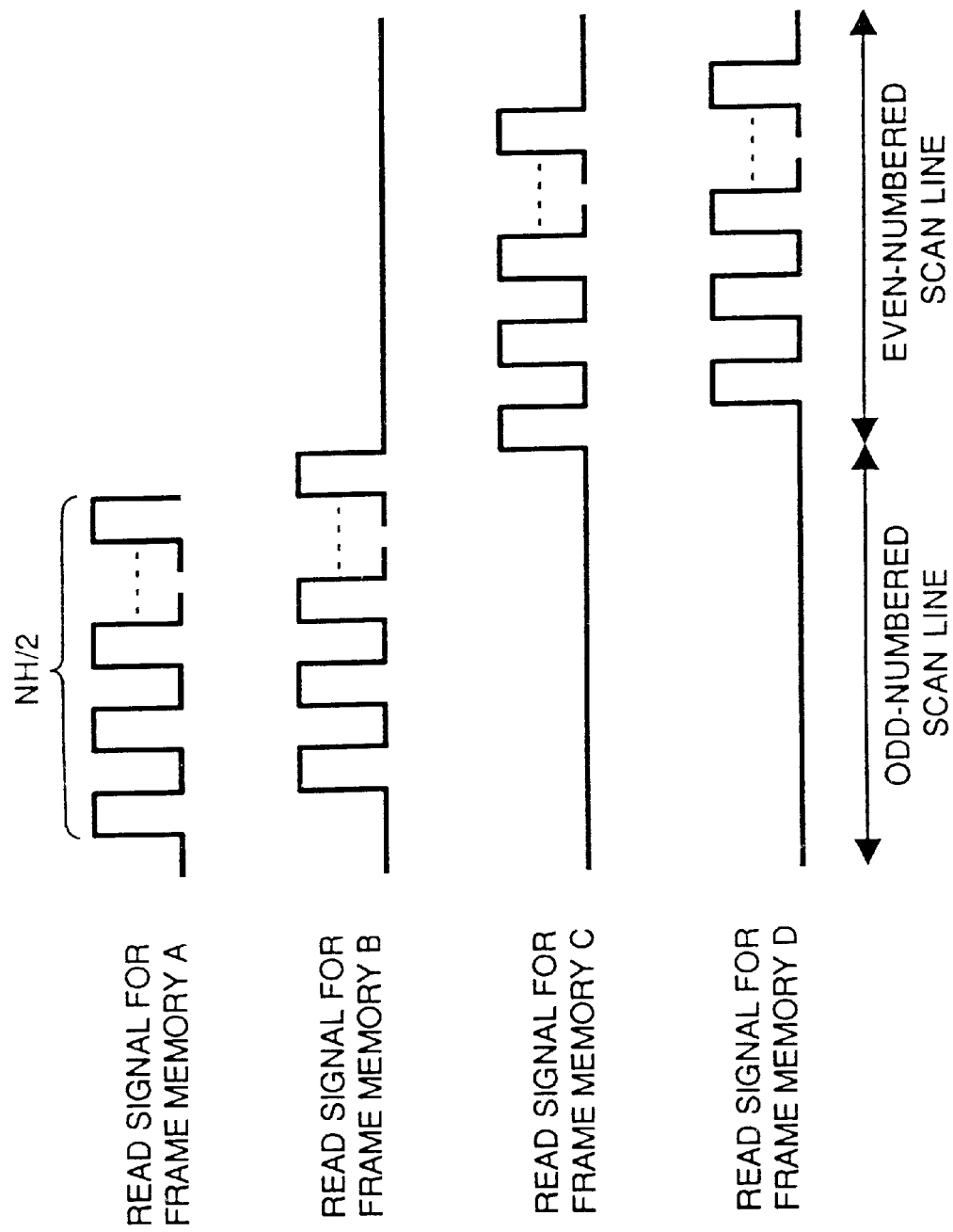

Note that the read timings of the video signals from the memories A, B, C, and D are the same as those in the apparatus according to the first embodiment shown in FIG. 7.

As a result, the dynamic image from the video signal source 1 is displayed on the entire screen of the monitor 526 to have the number NH of horizontal pixels and the number NV of vertical pixels, as shown in FIG. 26A.

When an operator inputs an instruction for performing a display shown in FIG. 26B through the MMI section 525, the following control is made.

More specifically, the controller 524 sends a transmission control baseband signal for instructing to enable only the modulator 1A to the transmitter 1. Furthermore, the controller 524 sends transmission control baseband signals for respectively instructing to enable only a corresponding one of the modulators 2B, 3C, and 4D to the transmitters 2, 3, and 4.

Upon reception of the transmission control baseband signal, the transmission controller 511 of the transmitter 1 enables the modulator 1A. A video signal input from the video signal source 1 is sampled by the sampling section 1A in units of NH/2 (horizontal direction)×NV/2 (vertical direction) pixels, and the sampled signal is modulated by the modulator 1A at the frequency $f_A$. Thereafter, the modulated signal is sent onto the coaxial cable 513 through the multiplexer 512. Similarly, in each of the transmitters 2, 3, and 4, the modulator 2B, 3C, or 4D is enabled upon reception of the transmission control baseband signal. A video signal input from the video signal source 2, 3, or 4 is sampled by the sampling section 2B, 3C, or 4D in units of NH/2 (horizontal direction)×NV/2 (vertical direction) pixels. The sampled signal is then modulated by the modulator 2B, 3C, or 4D at the frequency $f_B$, $f_B$, or $f_D$, and the modulated signal is sent onto the coaxial cable 513 through the multiplexer.

Of the video signals on the coaxial cable 513 obtained by modulating the video signals from the video signal sources 1, 2, 3, and 4 at the four modulation frequencies, the demodulator A of the receiver 514 demodulates the modulated video signal from the video signal source 1, which signal is modulated at the frequency $f_A$, and writes the demodulated signal in the memory A. Similarly, the modulated video signal from the video signal source 2, which signal is modulated at the frequency $f_B$, is demodulated by the demodulator B, and the demodulated signal is written in the memory B. Signals obtained by demodulating the modulated video signals from the video signal sources 3 and 4 are respectively written in the memories C and D.

The read timings of the memories A, B, C, and D when a plurality of dynamic images are displayed on the monitor are the same as those in the apparatus according to the first embodiment shown in FIG. 6.

Each of the video signals from the video signal sources 1, 2, 3, and 4, which are read out from the memories A, B, C, and D in this manner, is displayed on one corresponding division obtained by dividing the screen of the monitor 526 into four divisions, as shown in FIG. 26B.

As described above, according to this embodiment, the number of pixels of each displayed image is decreased according to an increase in the number of dynamic images to be displayed on the monitor in the dynamic image transmission apparatus. Thus, a plurality of monition pictures can be simultaneously displayed on a single monitor without increasing the number of channels. Even when display requests of a plurality of video signals are simultaneously issued, these display requests can be accepted without being limited by the number of transmission channels available.

[Modification]

Figure 27:
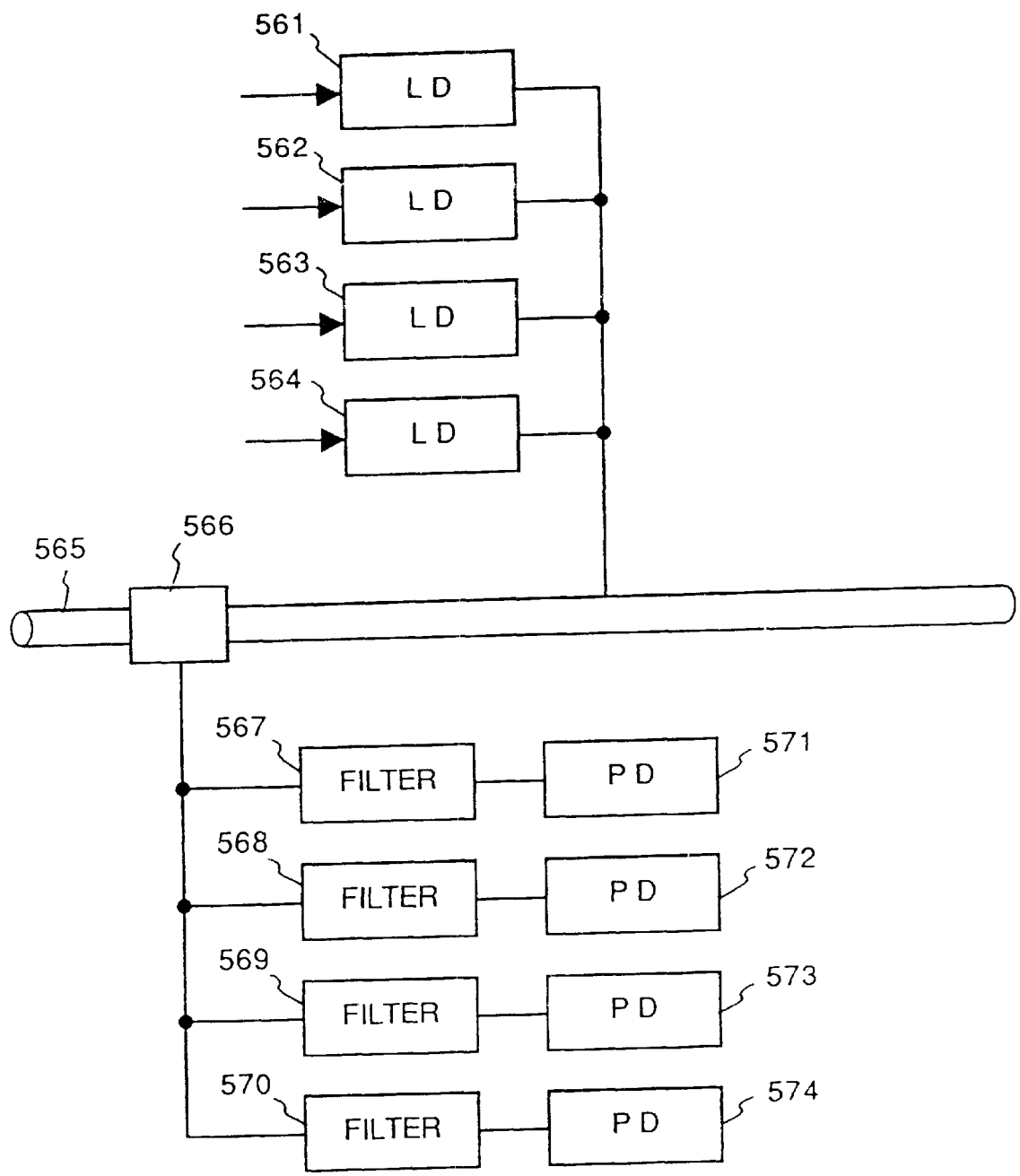
FIG. 27 is a block diagram showing a case wherein an optical transmission system is employed in the dynamic image transmission apparatus of the fifth embodiment.

FIG. 27 is a block diagram partially showing an arrangement of a dynamic image transmission apparatus according to a modification of the fifth embodiment. The dynamic image transmission apparatus shown in FIG. 27 employs an optical transmission system as a means for transmitting images in a plurality of channels. Semiconductor lasers (LDs) 561 to 564 respectively oscillate at wavelengths of 0.78 μm, 0.88 μm, 1.3 μm, and 1.55 μm according to electrical signals from sampling sections (not shown). Optical signals emitted from the semiconductor lasers 561 to 564 are transmitted through an optical fiber cable 565. A demultiplexer 566 demultiplexes optical signals transmitted through the optical fiber cable 565, and guides the demultiplexed signals to the receiver.

Optical filters 567 to 570 selectively transmit the signals from the optical fiber cable at wavelengths of 0.78 μm, 0.88 μm, 1.3 μm, and 1.55 μm, respectively, and PIN photodiodes (PDs) 571 to 574 convert incident optical signals into electrical signals.

In FIG. 27, the semiconductor lasers 561 to 564 correspond to the modulators in the fifth embodiment, and the optical filters 567 to 570 and the PIN photodiodes 571 to 574 correspond to modulators. Therefore, in the dynamic image transmission apparatus according to this modification, since other constituting elements (not shown) are the same as those in the fifth embodiment, the same effect as in the fifth embodiment can be obtained.

In the fifth embodiment, when the number of pixels of each dynamic image is decreased, i.e., when an image is compressed, the sampling section for sampling each image is selected. Alternatively, in a compression method for varying the compression ratio for each image, e.g., in an ADCP method, quantization parameters may be selected.

Furthermore, the fifth embodiment exemplifies a 4-frame transmission mode, and a 1-frame transmission mode. However, the number of frames to be transmitted is not limited to these.

[Sixth Embodiment]

Figure 28:
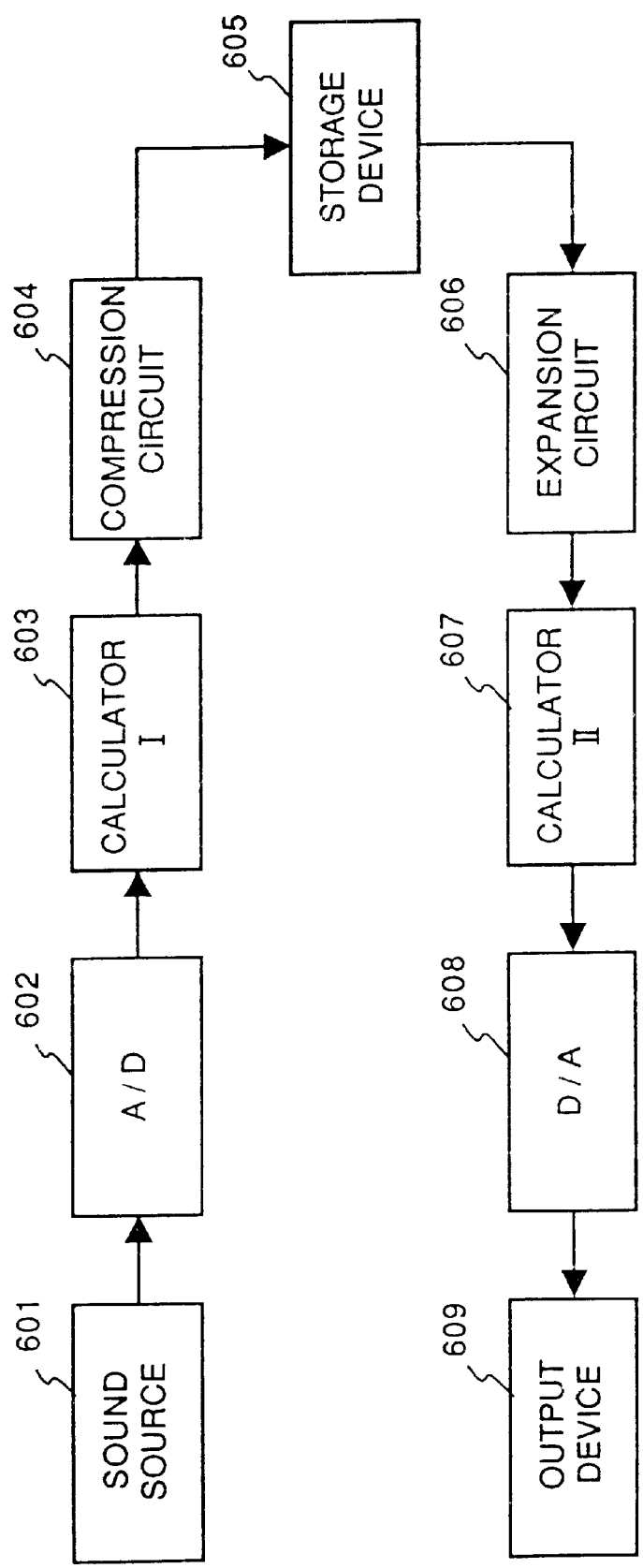
FIG. 28 is a block diagram showing an arrangement of an encoding/decoding apparatus according to the sixth embodiment of the present invention.

FIG. 28 is a block diagram showing an arrangement of an encoding/decoding apparatus according to the sixth embodiment of the present invention. In the apparatus shown in FIG. 28, an acoustic wave signal from a sound source is stored in a storage device, and a signal read out from the storage device is decoded. Thereafter, the decoded signal is reproduced by a loudspeaker.

In FIG. 28, a sound source 601 is a sound source obtained from, e.g., a cassette recorder, a microphone, or the like. An A/D converter 602 samples an analog acoustic wave signal from the sound source 601 at predetermined sampling timings, thereby converting it into a digital signal. A calculator I 603 encodes the digital acoustic wave signal output from the A/D converter 602. Note that the details of the calculator I 603 will be described later.

A compression circuit 604 controls the bit length of the digital signal according to the characteristics of an encoding coefficient output from the calculator I 603. A storage device 605 has a function of storing the compressed digital acoustic wave signal output from the compression circuit 604, and also has a function of reading out and outputting the stored digital acoustic wave signal. An expansion circuit 606 has characteristics opposite to those of the compression circuit 604, and restores the bit length of the encoding coefficient. A calculator II 607 decodes the digital acoustic wave signal encoded by the calculator I 603. Note that the details of the calculator II 607 will be described later.

A D/A converter 608 converts the digital acoustic wave signal output from the calculator II 607 into an analog signal. The analog acoustic wave signal converted by the D/A converter 608 is amplified by an output device 609 to a desired power level, and the amplified signal is reproduced by a loudspeaker (not shown).

Figure 29:
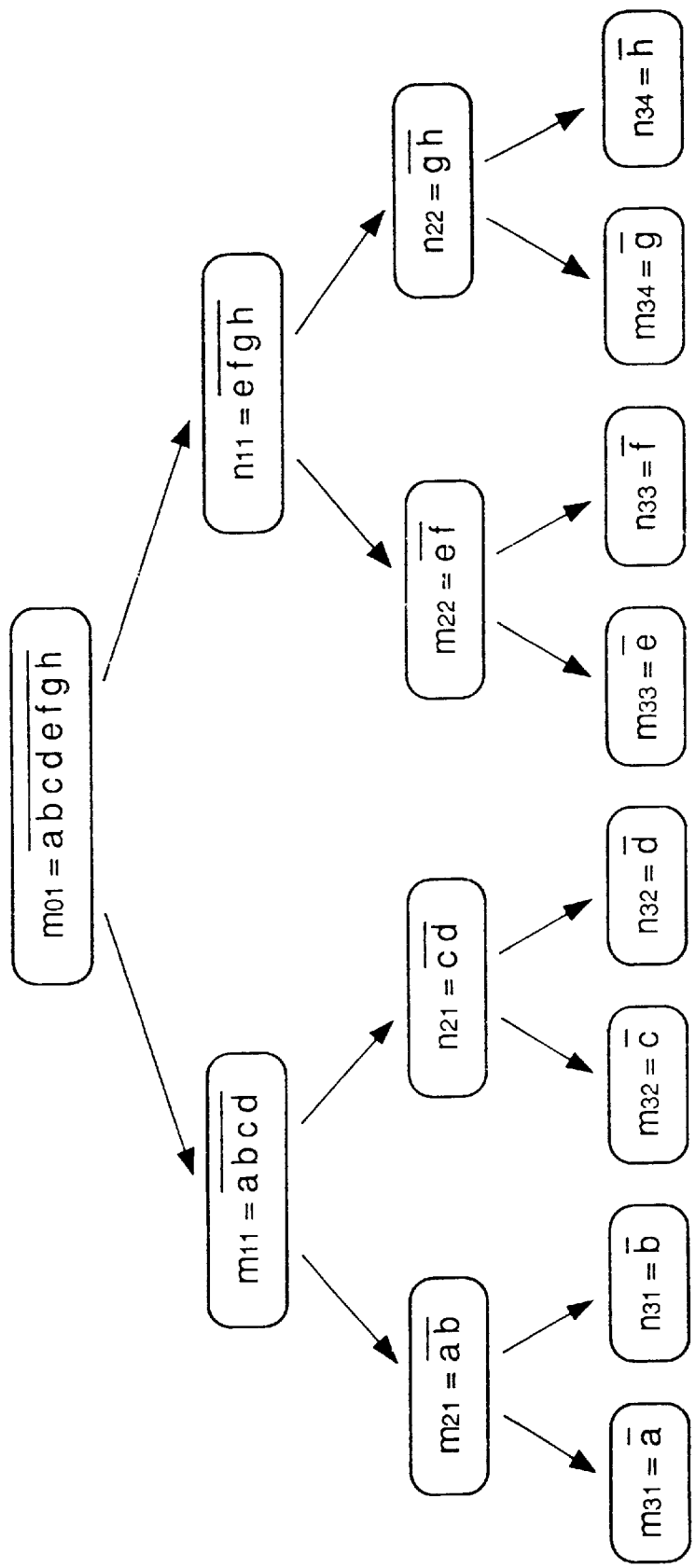
FIG. 29 is a schematic view showing partial data sets in a calculator constituting the encoding/decoding apparatus according to the sixth embodiment.

FIG. 29 is a schematic view showing partial data sets in the calculator I, constituting the encoding/decoding apparatus of this embodiment, for encoding acoustic wave data.

In the encoding/decoding apparatus of this embodiment, an acoustic wave signal having a huge number of data is divided into blocks each consisting of 1,024 continuous data, and thereafter, encoding/decoding processing is performed. However, for the sake of simplicity, FIG. 29 shows processing for eight continuous data a, b, c, d, e, f, g, and h.

In FIG. 29, $m_{01}$ represents an average of the data a, b, c, d, e, f, g, and h. These eight data are divided into two data sets each having four data. More specifically, $m_{11}$ and $n_{11}$ respectively represent average values of the data a, b, c, and d, and the data e, f, g, and h.

These two data sets are divided into four data sets each having two data. In these data sets, $m_{21}$, $n_{21}$, $m_{22}$, and $n_{22}$ respectively represent average values of data a and b, data c and d, data e and f, and data g and h. These four data sets are finally divided into eight data sets each having one data. These data sets are $m_{31}$, $n_{31}$, $m_{32}$, $n_{32}$, $m_{33}$, $n_{33}$, $m_{34}$, and $n_{34}$, and they respectively represent the average values of the data a, b, c, d, e, f, g, and h, i.e., values of the individual data. Since the number of elements in each data set becomes 1 upon the final division, the data sets are not divided any more in this case.

Using eight average values $m_{ij}$ (i=0, 1, 2; j=1, 2, 3, 4) and seven average values $n_{ij}$ (i=1, 2, 3; j=1, 2, 3, 4) determined in this manner, the following eight encoding formulas are defined:

$$k_{01} = m_{01} \tag{10}$$

$$k_{11} = m_{11} - m_{01} \tag{11}$$

$$k_{21} = m_{21} - (m_{11} - m_{01}) \tag{12}$$

$$k_{22} = m_{22} - (n_{11} - m_{01}) \tag{13}$$

$$k_{31} = m_{31} - (m_{21} - (m_{11} - m_{01})) \tag{14}$$

$$k_{32} = m_{32} - (n_{21} - (m_{11} - m_{01})) \tag{15}$$

$$k_{33} = m_{33} - (m_{22} - (n_{11} - m_{01})) \tag{16}$$

$$k_{34} = m_{34} - (n_{22} - (n_{11} - m_{01})) \tag{17}$$

where $k_{01}$ is the low-frequency component obtained by averaging all the data, and $k_{31}$, $k_{32}$, $k_{33}$, and $k_{34}$ are respectively the high-frequency components locally present near the data ab, cd, ef, and gh.

Figure 30:
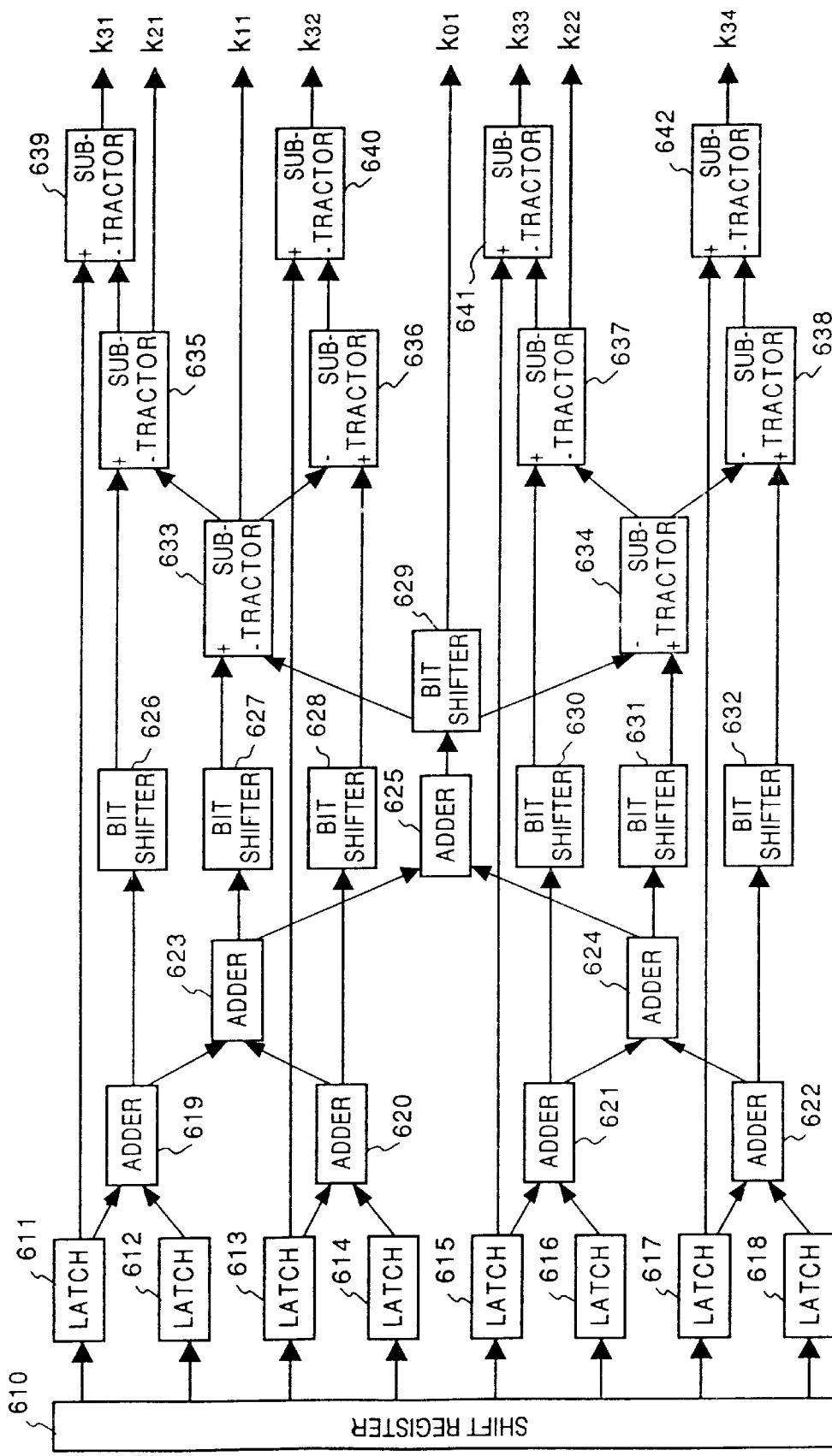
FIG. 30 is a block diagram showing the detailed arrangement of a calculator I constituting the encoding/decoding apparatus according to the sixth embodiment.

FIG. 30 is a block diagram showing the details of the calculator I 603 constituting the encoding/decoding apparatus according to this embodiment. In this calculator, values k given by the above-mentioned formulas (10) to (17) are calculated.

In FIG. 30, a shift register 610 converts serial data sequentially output from the A/D converter 602 shown in FIG. 28 into eight parallel data. Latches 611 to 618 respectively latch the eight data output from the shift register 610, and output two each of the latched data to adders 619 to 622, as shown in FIG. 30. The adders hold the sums, and output the sums to other adders 623 and 624, and bit shifters (to be described below).

Bit shifters 626 to 632 shift input data by the predetermined number of bits, and output the shifted data. Subtracters 633 to 642 each subtract two input data, and hold and output the differences.

Figure 31:
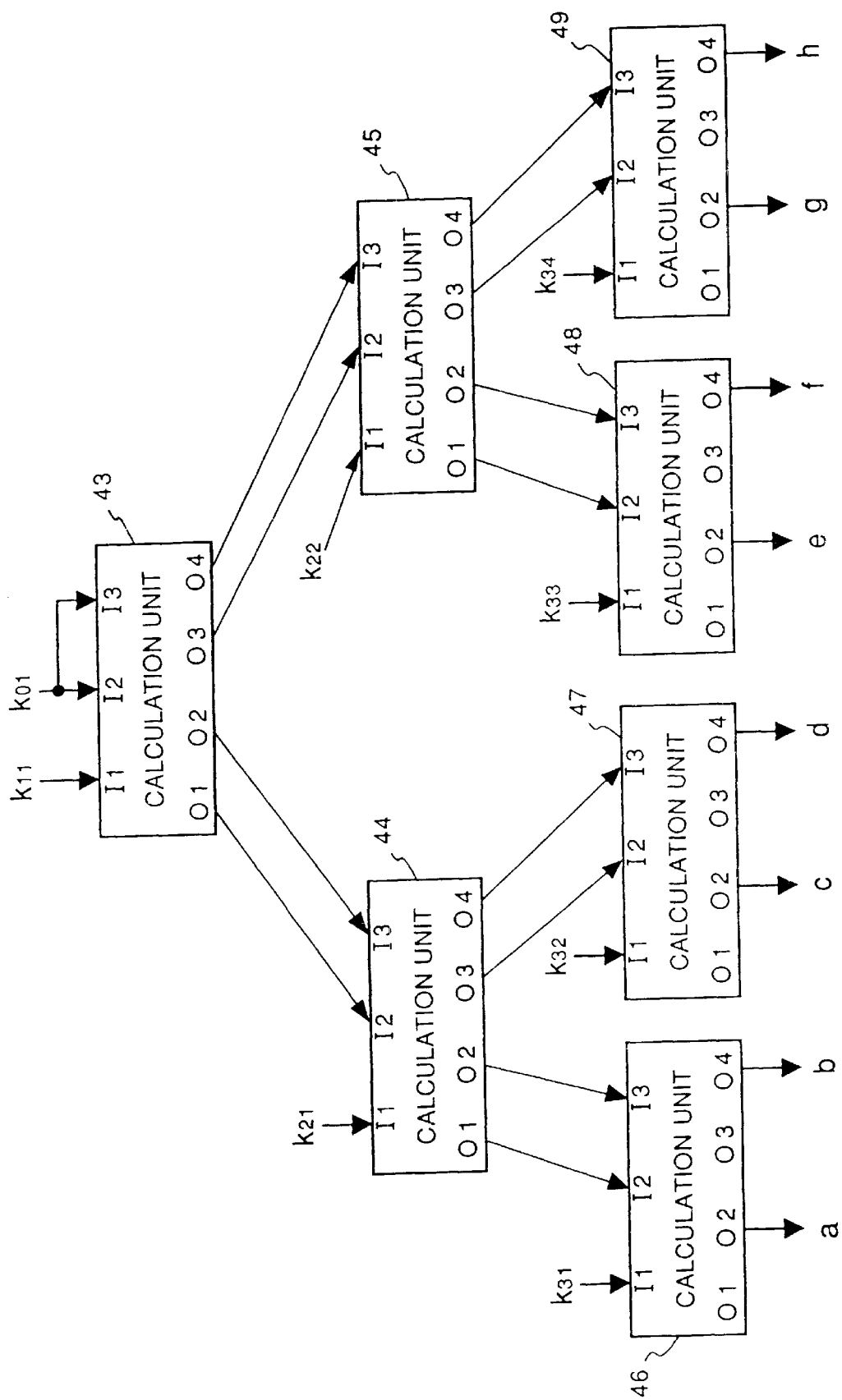
FIGS. 31 and 32 are block diagrams showing the detailed arrangement of a calculator II constituting the encoding/decoding apparatus according to the sixth embodiment.
Figure 32:
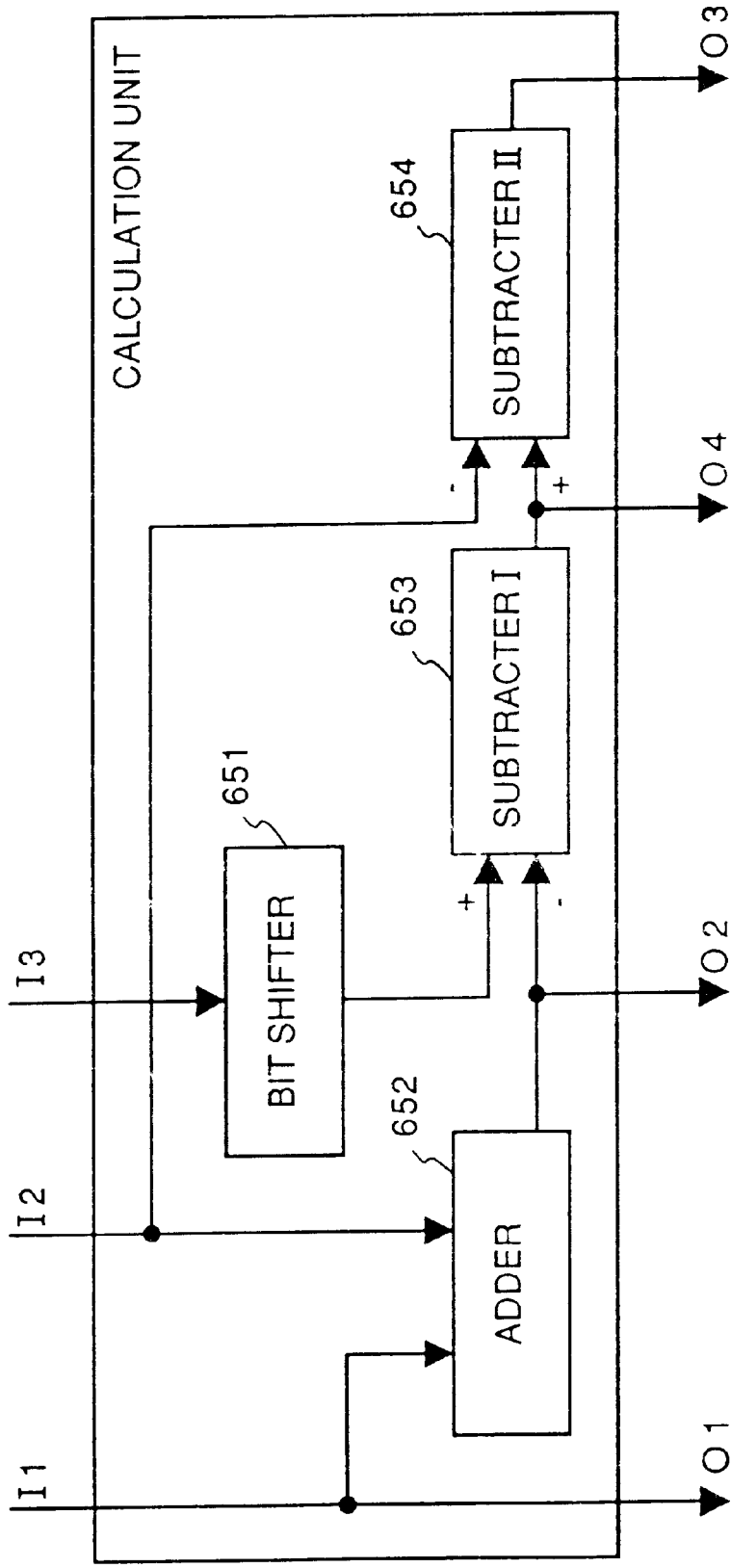

FIGS. 31 and 32 are block diagrams showing the details of the calculator II 607 constituting the encoding/decoding apparatus according to this embodiment. In this calculator, eight data a, b, c, d, e, f, g, and h are calculated using the eight values k output from the expansion circuit 606 shown in FIG. 28.

FIG. 31 is a block diagram showing the overall arrangement of the calculator II 607. The calculator II 607 is constituted by combining calculation units (FIG. 32) in a "binary tree" pattern.

FIG. 32 is a block diagram showing the details of the calculation unit constituting the calculator II 607 shown in FIG. 31. In FIG. 32, a bit shifter 651 bit-shifts input data I3 to divide it to 1/2, and holds and outputs the result. An adder 652 adds input data I1 and I2, and holds and outputs the result. A subtracter I 653 subtracts the output from the adder 652 from the output from the bit shifter 651, and holds and outputs the result. A subtracter II 654 subtracts the value of the input data I2 from the output from the subtracter I 653, holds the result, and outputs the result as data O3.

The operation of the encoding/decoding apparatus according to this embodiment will be described below.

When an acoustic wave signal is input from the sound source 601 (FIG. 28) to the A/D converter 602, the A/D converter 602 samples the input signal at predetermined sampling timings, thereby converting it into a 16-bit digital signal. At this time, as the number of bits of the digital signal, 2 or more may be used. However, as an optimal value, a value between 8 and 32 is used.

The 16-bit digital data output from the A/D converter 602 is input to the shift register 610 (FIG. 30) of the calculator I 603, as described above, and is sequentially shifted. When eight data are prepared, these data are latched by the latches 611 to 618. At this time, the eight data latched by the latches 611 to 618 respectively correspond to the eight data a, b, c, d, e, f, g, and h shown in FIG. 29.

The adders 619, 620, 621, and 622 add the outputs from two latches, and output the sums. At this time, the output from the adder 619 is a+b, the output from the adder 620 is c+d, the output from the adder 621 is e+f, and the output from the adder 622 is g+h. Subsequently, the outputs from the adders 619 and 620 are added to each other by the adder 623, and the sum a+b+c+d is output.

Similarly, the outputs from the adders 621 and 622 are input to the adder 624, and are added to each other, thus outputting the sum e+f+g+h. Furthermore, the outputs from the adders 623 and 624 are input to and added to each other by an adder 625, thus outputting a+b+c+d+e+f+g+h. The output from the adder 625 is shifted by 3 bits by the bit shifter 629 to obtain 1/8 data given by:

$$m_{01} = 1/8(a+b+c+d+e+f+g+h) \quad (18)$$

$$= \overline{abcdefgh}$$

As described above; this data is output as the encoding value $k_{01}$ to the compression circuit 604.

The output from the adder 623 is shifted by 2 bits by the bit shifter 627 to obtain 1/4 data given by:

$$m_{11} = 1/4(a+b+c+d) \quad (19)$$

$$= \overline{abcd}$$

The result is input to the subtracter 633. The subtracter 633 subtracts $m_{01}$ as the output from the bit shifter 629 from $m_{11}$ as the output from the bit shifter 627, and outputs $k_{11}=m_{11}-m_{01}$, as described in formula (11).

The output from the adder 624 is shifted by 2 bits by the bit shifter 631 to obtain 1/4 data given by:

$$n_{11} = 1/4(e+f+g+h) \quad (20)$$

$$= \overline{efgh}$$

The result is input to the subtracter 634. The subtracter 634 subtracts $m_{01}$ as the output from the bit shifter 629 from $n_{11}$ as the output from the bit shifter 631 to yield $n_{11}-m_{01}$, and outputs this result.

The subtracter 635 subtracts the output $m_{11}-m_{01}$ from the subtracter 633 from an output value obtained by shifting the output from the adder 619 by one bit by the bit shifter 626, and given by:

$$1/2(a+b) = \overline{ab} \quad (21)$$

$$= m_{21}$$

In this manner, the subtracter 635 calculates and outputs $k_{21}=m_{21}-(m_{11}-m_{01})$. Similarly, the, subtracter 636 outputs $n_{21}-(m_{11}-m_{01})$, the subtracter 637 outputs $k_{22}=m_{22}-(n_{11}-m_{01})$ like in formula (13), and the subtracter 638 outputs $n_{22}-(n_{11}-m_{01})$.

Furthermore, the subtracter 639 subtracts the output value $k_{21}=m_{22}-(m_{11}-m_{01})$ from the subtracter 635 from the output value $a=m_{31}$ from the latch 611 to calculate and output $k_{31}=m_{31}-(m_{22}-m_{11}-m_{01})$, as described in formula (14). Similarly, the subtracter 640 outputs $k_{32}=m_{32}-(n_{21}-(m_{11}-m_{01}))$ as described in formula (15), the subtracter 641 outputs $k_{33}=m_{33}-(m_{22}-(n_{11}-m_{01}))$ as described in formula (16), and the subtracter 642 outputs $k_{34}=m_{34}-(n_{22}-(n_{11}-m_{11}))$ as described in formula (17).

In this manner, when the eight encoding coefficients k are obtained for the eight input data a, b, c, d, e, f, g, and h, the following eight data input to the shift register are transferred to the latches 611 to 618, and the encoding coefficients are calculated in the same processing as described above.

The bit lengths of the eight encoding coefficients $k_{01}$, $k_{11}$, $k_{21}$, $k_{22}$, $k_{31}$, $k_{32}$, $k_{33}$, and $k_{34}$ are reduced by the compression circuit 604. More specifically, the bit length of $k_{01}$ as the low-frequency component is set to be 16 bits the same as that of the input data, the bit length of $k_{11}$ is set to be 12 bits, the bit lengths of $k_{21}$ and $k_{22}$ are set to be 10 bits, and the bit lengths of $k_{31}$, $k_{32}$, $k_{33}$, and $k_{34}$ as high-frequency components are set to be 8 bits. In this manner, the encoding coefficients are converted into nonlinear quantization signals for segmenting data more finely near the origin.

The encoding coefficients compressed in this manner are stored in the storage device 605. The stored coefficients are properly read out from the storage device 605 as a set of eight encoding coefficients $k_{01}$, $k_{11}$, $k_{21}$, $k_{22}$, $k_{31}$, $k_{32}$, $k_{33}$, and $k_{34}$. When these coefficients are subjected to conversion having characteristics opposite to those in the compression circuit 604 in the expansion circuit 606, these coefficients are re-converted to nonlinear quantization data. The converted data are output to the calculator II 607.

In the calculator II 607, $k_{11}$ is input to the input I1 of a calculation unit 643, and $k_{01}$ is input to the inputs I2 and I3 (see FIGS. 31 and 32). $k_{11}$ from the input I1 is output as an output O1, and is also input to the adder 652. $k_{01}$ from the input I2 is input to the adder 652. As a result, the adder 652 outputs:

$$k_{11} + k_{01} = m_{11} - m_{01} + m_{01} \quad (22)$$

$$= m_{11}$$

$$= \overline{abcd}$$

Note that this value is also output as an output O2.

The bit shifter 651 shifts input $k_{01}$ by one bit to double the data, and outputs the result to the subtracter I 653. The subtracter I 653 subtracts the output from the adder 652 from the out $2k_{01}$ from the bit shifter 651 to obtain:

$$2k_{01} - \overline{abcd} = 1/4(a+b+c+d+e+f+g+h) - \qquad (23)$$
$$1/4(a+b+c+d)$$
$$= 1/4(e+f+g+h)$$
$$= \overline{efgh}$$

The subtracter I 653 outputs this result to the subtracter II 654, and also outputs it as an output O4. The subtracter II 654 subtracts $k_{01}=\overline{(abcdefgh)}$ as the input I2 from the output $\overline{(efgh)}$ from the subtracter I 653 to obtain $\overline{(efgh)}-\overline{(abcdefgh)}$, and outputs it as an output O3.

$k_{21}$ is input to the input I1 of a calculation unit 644, and the outputs O1 and O2 from the calculation unit 643 are respectively connected to the inputs I2 and I3. The calculation unit 644 performs the same operation as that of the calculation unit 643, and outputs $k_{21}=m_{21}-(m_{11}-m_{01})$ from its output O1. The unit 644 outputs from its output O2:

$$k_{21} + k_{11} = m_{21} - (m_{11} - m_{01}) + m_{11} - m_{01} \qquad (24)$$
$$= m_{21}$$
$$= \overline{ab}$$

Furthermore, the unit 644 outputs from its output O3:

$$2\overline{abcd} - \overline{ab} - k_{11} = \overline{cd} - k_{11} \qquad (25)$$
$$= n_{21} - (m_{11} - m_{01})$$

The unit 644 outputs from its output O4:

$$2\overline{abcd} - \overline{ab} = \overline{cd} \qquad (26)$$
$$= n_{21}$$

Similarly, a calculation unit 645 outputs $k_{22}$ from its output O1, and outputs from its output O2:

$$k_{22} + \overline{efgh} - \overline{abcdefgh} = m_{22} - (n_{11} - m_{01}) + n_{11} - m_{01} \qquad (27)$$
$$= m_{22}$$
$$= \overline{ef}$$

The unit 645 outputs from its output O3:

$$2\overline{efgh} - \overline{ef} - (\overline{efgh} - \overline{abcdefgh}) = \overline{gh} - (\overline{efgh} - \overline{abcdefgh}) \qquad (28)$$

The unit 645 outputs from its output O4:

$$2\overline{efgh} - \overline{ef} = \overline{gh} \qquad (29)$$

With these outputs, a calculation unit 646 outputs from its output O2:

$$k_{31} + k_{21} = m_{31} \qquad (30)$$
$$= \overline{a}$$
$$= a$$

The unit 646 outputs from its output O4:

$$2\overline{ab} - (k_{31} + k_{21}) = 2\overline{ab} - a \qquad (31)$$
$$= b$$

Similarly, a calculation unit 647 outputs from its output O2:

$$k_{32} + n_{21} - (m_{11} - m_{01}) = m_{32} - (n_{21} - (m_{11} - m_{01})) \qquad (32)$$
$$+ n_{21} - (m_{11} - m_{01})$$
$$= m_{32}$$
$$= \overline{c}$$
$$= c$$

The unit 647 outputs from its output O4:

$$2\overline{cd} - (k_{32} + n_{21} - (m_{11} - m_{01})) = 2\overline{cd} - c \qquad (33)$$
$$= d$$

A calculation unit 648 outputs from its output O2:

$$k_{33} + k_{22} = m_{33} - (m_{22} - (n_{11} - m_{01})) + m_{22} - (n_{11} - m_{01}) \qquad (34)$$
$$= m_{33}$$
$$= e$$

The unit 648 outputs from its output O4:

$$2\overline{ef} + e = f \qquad (35)$$

Furthermore, a calculation unit 649 outputs from its output O2:

$$k_{34} + \overline{gh} - (\overline{efgh} - \overline{abcdefgh}) = g \qquad (36)$$

The unit 649 outputs from its output O4:

$$2\overline{gh} - g = h \qquad (37)$$

In this manner, the calculator II 607 decodes the eight acoustic wave data a, b, c, d, e, f, g, and h from the eight encoding coefficients $k_{01}$, $k_{11}$, $k_{21}$, $k_{22}$, $k_{31}$, $k_{32}$, $k_{33}$, and $k_{34}$, and sequentially outputs them to the D/A converter 608 to convert them into analog signals. The analog signals are amplified by the output device 609, and are reproduced as acoustic wave signals by the loudspeaker (not shown).

As described above, according to this embodiment, encoding/decoding processing can be realized by simple processing such as additions, subtractions, bit shift operations, and the like, thus attaining high-speed processing and a compact apparatus.

Since the encoding coefficients (encoded data) obtained by encoding are separated according to the frequency levels and data arrangement positions band compression can be performed by a band compression method according to the characteristics of input data.

In this embodiment, eight input data are processed as a set for the sake of simplicity. Processing using data sets each including 1,024 data can be realized by extending the processing circuit described in the above embodiment.

[Seventh Embodiment]

The seventh embodiment according to the present invention will be described below.

Figure 33:
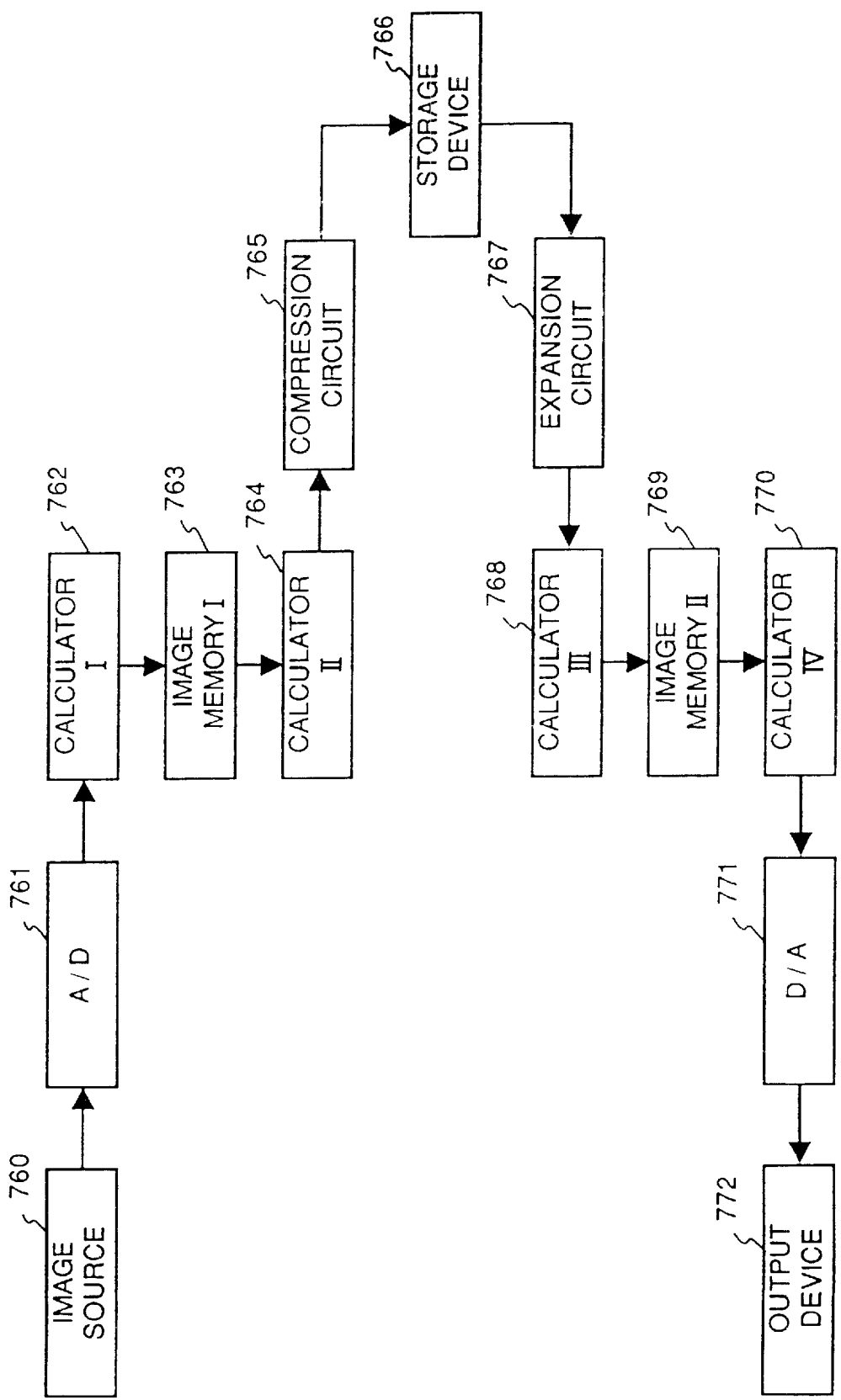
FIG. 33 is a block diagram showing an arrangement of an encoding/decoding apparatus according to the seventh embodiment of the present invention.
Figure 34:
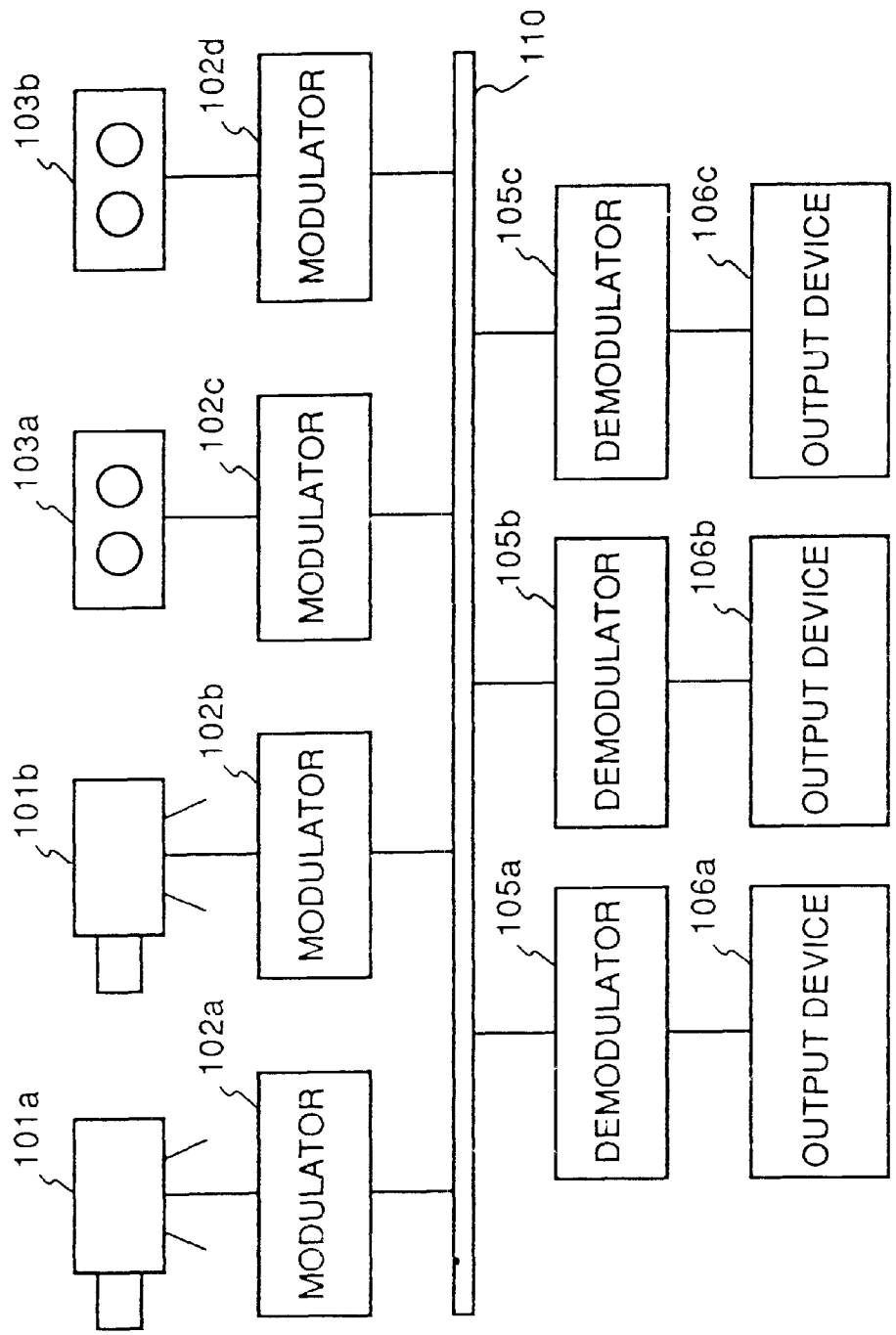
Figure 35:
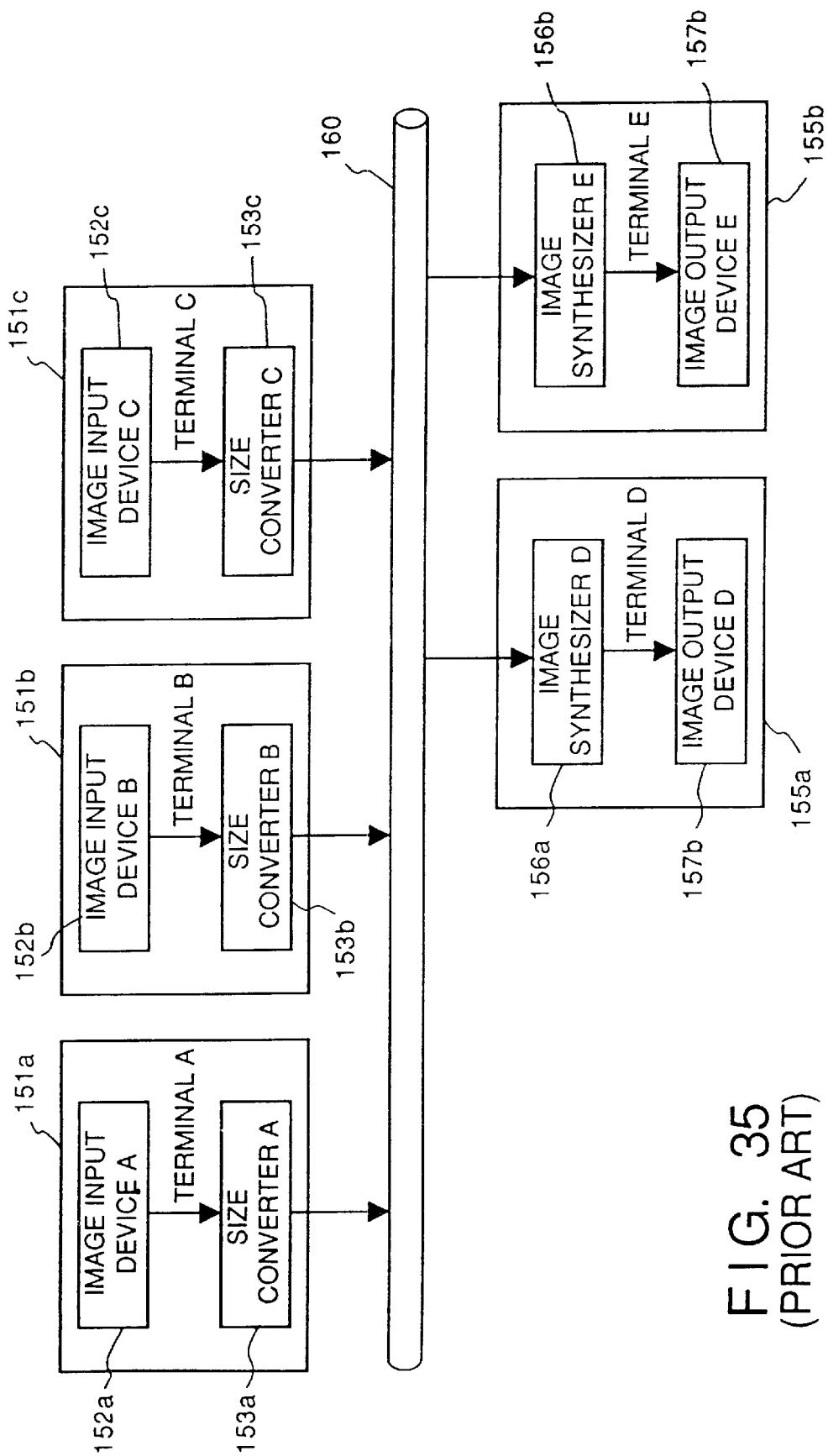
Figure 36:
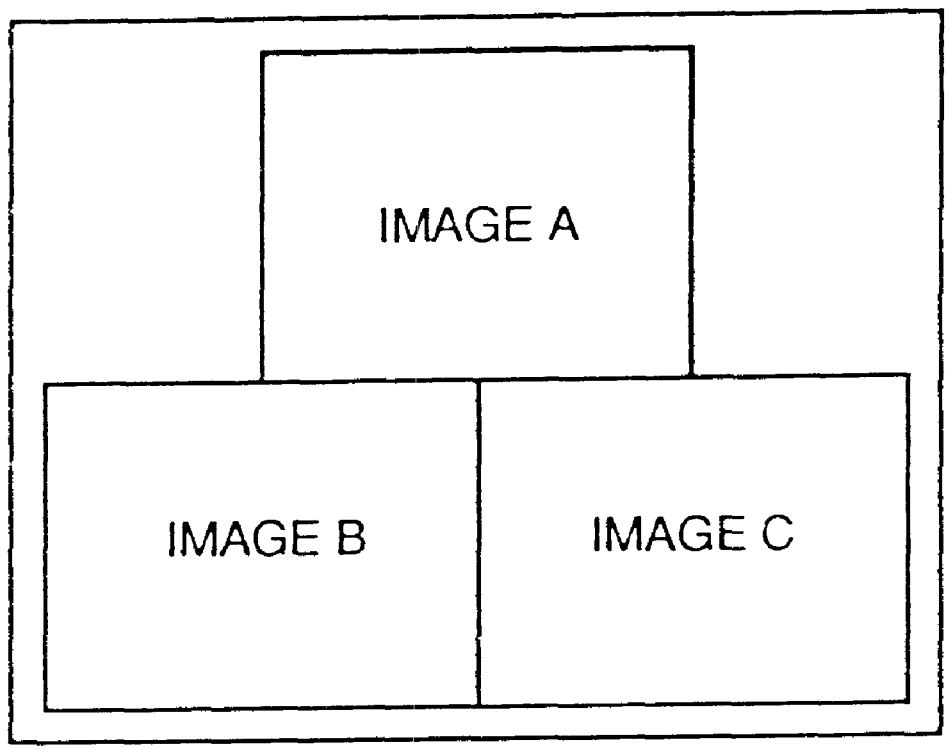
Figure 37:
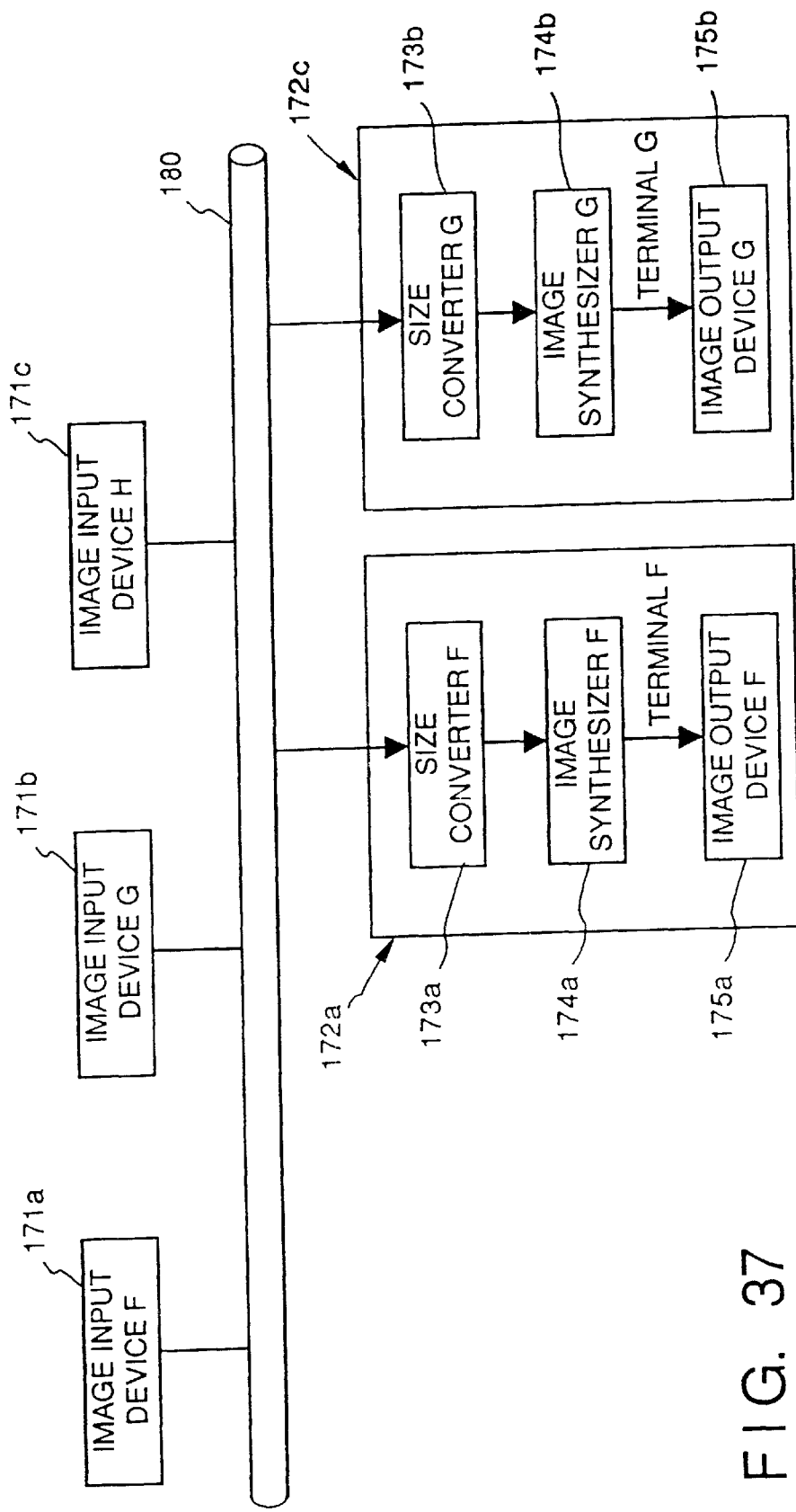
Figure 38:
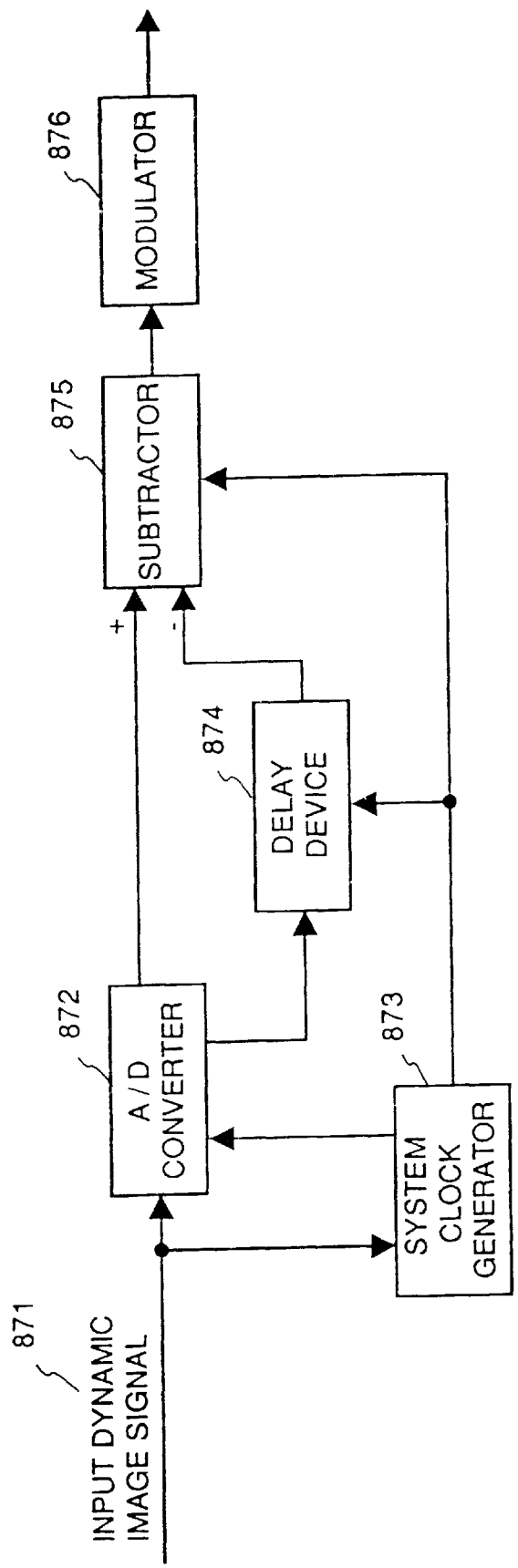
Figure 39:
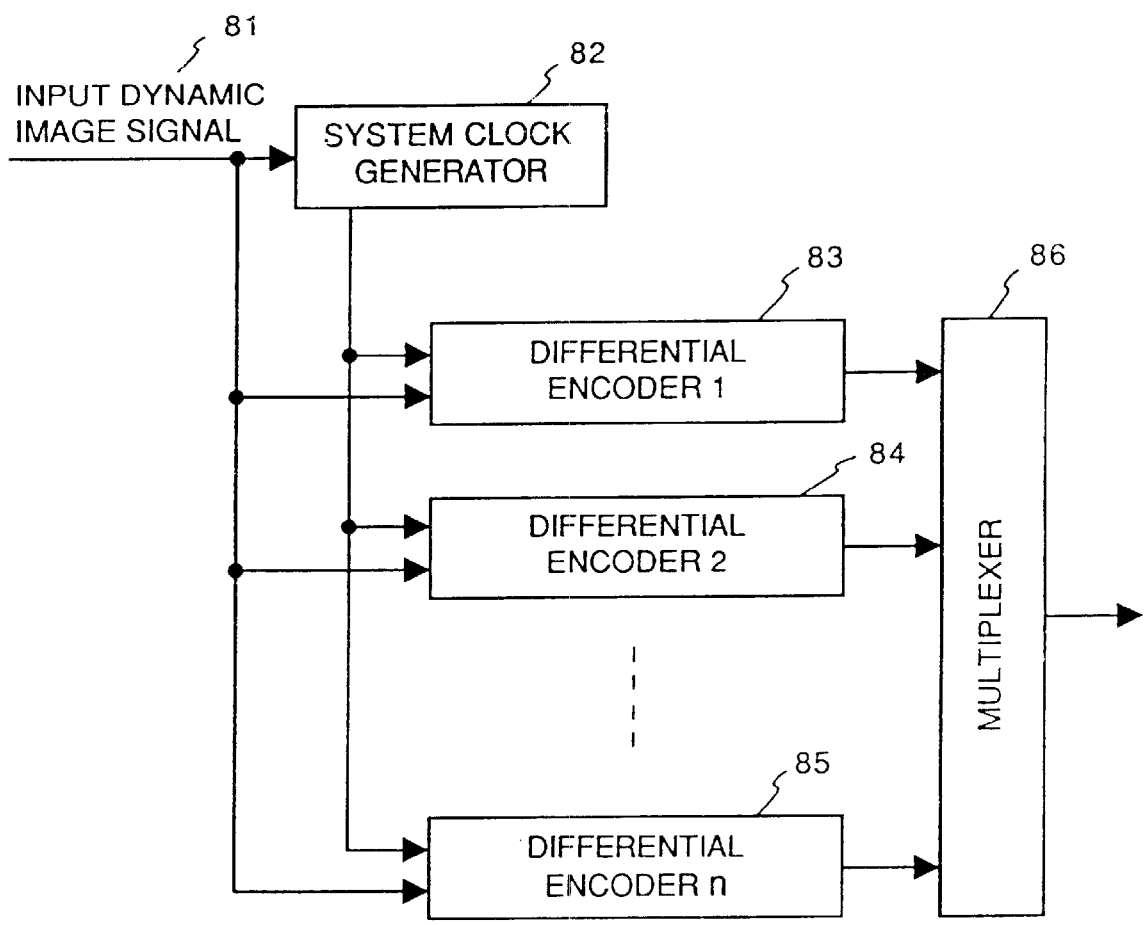

FIG. 33 is a block diagram showing an arrangement of an encoding/decoding apparatus according to the seventh embodiment of the present invention. The apparatus shown in FIG. 33 performs processing for image data as two-dimensional data.

In FIG. 33, an image source 760 comprises, e.g., a scanner, an image file, or the like. A D/A converter 761 converts image data output from this image source into digital data. A calculator I 762 encodes the image signal output from the A/D converter 761 in units of data sets each including data for one vertical or horizontal line. An image memory I 763 temporarily stores data encoded by the calculator I 762. The image memory I 763 has a memory capacity exceeding the size of image data to be encoded. A calculator II 764 encodes the encoded data stored in the image memory 763 in units of data sets each including data for one line in a direction perpendicular to that in the calculator I 762.

The data output from the calculator II 764 are input to a storage device 766 through a compression circuit 765, and are stored as image data. The image data are input to a calculator III 768 for decoding the encoded image data through an expansion circuit 767. The calculator III 768 decodes the encoded data in the direction of the data sets encoded in the calculator II 764. An image memory II 769 temporarily stores image data output from the calculator III 768.

A calculator IV 770 decodes the encoded data in the direction of the data sets encoded in the calculator II 762. A D/A converter 771 converts the data decoded by the calculator IV 770 into analog data. The analog data are output to an image data output device 772 such as a display, a printer, or the like.

The operation of the encoding/decoding apparatus according to this embodiment will be described below.

When an image output from the image source 760 is Nx columns (horizontal direction)×Ny rows (vertical direction) image data, the A/D converter 761 A/D-converts Nx image data in the first row, and outputs the converted data to the calculators I 762. The calculator I 762 has an arrangement obtained by extending the arrangement for eight data in the calculator I 603 (FIG. 30) in the sixth embodiment to that for Nx data, and outputs Nx encoding coefficients k by the same operation as in the calculator I 603 according to the sixth embodiment.

The Nx encoding coefficients k output in this manner are sequentially written from the beginning of the first row of the image memory I 763 in the horizontal direction in the order of $k_{01}, k_{11}, k_{21}, k_{22}, \ldots$ Subsequently, Nx data in the second row of the output data from the image source are A/D-converted by the A/D converter 761, and the digital data are similarly encoded by the calculator I 762. Then, the encoded data are sequentially written from the beginning of the second row of the image memory I 763 in turn.

In this manner, when data in all the Ny columns are encoded and written in the image memory I 763, the calculator II 764 reads Ny encoding coefficients for the first column of the image memory I 763. The calculator II 764 has an arrangement obtained by extending the arrangement for eight data in the calculator I 603 (FIG. 30) in the sixth embodiment to that for Ny data, and outputs Ny encoding coefficients k by the same operation as in the calculator I 603 of the sixth embodiment.

At this time, the data input to the calculator II 764 have already been encoded in the horizontal direction, and data for the first column represent the average values in the horizontal direction. These encoded data are further encoded by the calculator II 764 in the vertical direction. Therefore, an output $k_{01}$ from the calculator II 764 corresponding to data for the first column indicates an average value of the overall image, and data $k_{11}, k_{21}, k_{22}$ substantially correspond to high-frequency components in the vertical direction in the order named.

Ny encoding coefficients output from the calculator II 764 are compressed by the compression circuit 765, and the compression results are stored in the storage device 766. Subsequently, Ny encoding coefficients for the second column are read out from the image memory I 763. The readout coefficients are encoded by the calculator II 764, and the encoded data are compressed by the compression circuit 765. Thereafter, the compressed data are stored in the storage device 766. In this manner, encoding and compression are performed for all the data for Nx columns, and the processing results are stored in the storage device 766.

As for the encoded image data stored in the storage device 766, Ny data for the first column are read out, and are expanded by the expansion circuit 767. Thereafter, the expanded data are decoded by the calculator III 768. The calculator III 768 has an arrangement obtained by extending the arrangement for eight data in the calculator II 607. (FIG. 31) in the sixth embodiment to that for Ny data, and outputs Ny, decoded data by the same operation as in the calculator II according to the sixth embodiment.

The output data are written from the beginning of the first column of the image memory II 769 in the vertical direction in the order of a, b, c, d, . . . Subsequently, Ny data for the second column are read out from the storage device 766, and are expanded by the expansion circuit 767. Thereafter, the expanded data are decoded by the calculator III 768, and the decoded data are written in the second column of the image memory II 769. In this manner, when all the data for the Nx columns are processed, and are written in the image memory II 769, the calculator IV 770 reads Nx data for the first row of the image memory II 769.

The calculator IV 770 has an arrangement obtained by extending the arrangement for eight data in the calculator II in the sixth embodiment to that for Nx data, and outputs Ny decoded image data by the same operation as in the calculator II. The output data are D/A-converted by the D/A converter 771, and the converted data are output as an image signal from the output device 772. Subsequently, Nx data for the second row of the image memory II 769 are read and decoded by the calculator IV 770. Thereafter, the decoded data are D/A-converted by the D/A converter 771, and the converted data are output as an image signal from the output device 772. In this manner, data for Ny rows are decoded and D/A-converted, and are output from the output device 772.

As described above, according to this embodiment, since the calculators I, II, III, and IV can perform high-speed operations, real-time processing can be performed even when dynamic image data is used as an image source.

In each of the sixth and seventh embodiments, the storage device may be replaced with a transmission apparatus. In each of the sixth and seventh embodiments, a section for writing encoded data in the storage device, and a section for reading out and decoding data from the storage device may be arranged as independent devices.

As many apparently widely different embodiments of the present invention can be made without departing from the spirit and scope thereof, it is to be understood that the invention is not limited to the specific embodiments thereof except as defined in the appended claims.

What is claimed is:

1. An image transmission apparatus, comprising:

an image data input unit adapted and configured to input image data;

a transmission unit having a plurality of encoders, adapted and configured to encode the image data input by said image data input unit and to transmit the encoded image data to an external device; and a control unit adapted and configured to receive a request, issued by the external device, to control transmission of image data encoded by the plurality of encoders in accordance with the request, wherein a first encoder of the plurality of encoders (i) encodes first image data degrading the spatial resolution of the image data and (ii) generates the encoded first image data, a second encoder of the plurality of encoders (i) encodes second image data enhancing the spatial resolution of the first image data and (ii) generates the encoded second image data, said transmission unit transmits at least the encoded first image data, and said control unit controls said transmission unit to transmit the encoded second image data together with the encoded first image data in response to the request.

2. An apparatus according to claim 1, wherein said transmission unit transmits the encoded image data on a common transmission line to which a plurality of external devices are connected.

3. An apparatus according to claim 1, wherein said transmission unit divides the image data into a plurality of blocks, each of the blocks having a plurality of pixels, and encodes the image data of each block.

4. An apparatus according to claim 1, wherein said transmission unit transmits the encoded image data by an optical transmission method.

5. An apparatus according to claim 1, wherein said first image data is image data, input by said image data input unit, which has been reduced.

6. An apparatus according to claim 1, wherein the image data is moving image data.

7. An image transmission method, comprising the steps of:

inputting image data;

encoding the image data by a plurality of encoding processes;

transmitting image data encoded by the plurality of encoding processes to an external device; and controlling the transmission of the encoded image data in said transmitting step by receiving a request, issued by the external device, and transmitting the encoded image data in accordance with the request, wherein, in said encoding step, first image data degrading a spatial resolution of the image data is encoded by a first encoding process of the plurality of encoding processes and second image data enhancing the spatial resolution of the image data is encoded by a second encoding process of the plurality of encoding processes, in said transmitting step, at least the encoded first image data is transmitted, and, in said controlling step, the encoded second image data is transmitted together with the encoded first image data in response to the request.

8. A method according to claim 7, wherein the image data is moving image data.

* * * * *

UNITED STATES PATENT AND TRADEMARK OFFICE
CERTIFICATE OF CORRECTION

PATENT NO. : 6,498,625 B1
DATED : December 24, 2002
INVENTOR(S) : Mitsuru Yamamoto et al.

It is certified that error appears in the above-identified patent and that said Letters Patent is hereby corrected as shown below:

Title page,
Item [75], Inventors, "Mitsuro Yamamoto" should read -- Mitsuru Yamamoto --.

Item [56], References Cited, FOREIGN PATENT DOCUMENTS,
"02/101884" should read -- 02-101884 --.
"JP 62-183288  8/1997" should be deleted, insert -- JP 02-005691  1/1990 --.

Column 4,
Line 48, "orthogonal;" should read -- orthogonal --.
Line 58, "transmitting the divided dynamic" should be deleted.
Lines 59-62, should be deleted.

Column 5,
Lines 3-14, should be deleted.
Line 43,

"for having" should read --for transmitting the divided dynamic image signals to the dynamic image output devices through a plurality of transmission channels, selection means for selecting a desired number of divided dynamic image signals from the dynamic image signals transmitted by the transmission control means, means for controlling to vary an output size of a dynamic image to be output from the dynamic image output devices according to the number of divided dynamic image signals selected by the selection means, and means for reconstructing a dynamic image signal corresponding to the output size in accordance with the output size.
    It is another object of the present invention to provide an image transmission apparatus, which can improve utilization efficiency of a multi-channel transmission path.
    In order to achieve the above object, according to the present invention, there is provided an image transmission apparatus comprising means for dividing an image to be transmitted into pixel units each including a predetermined number of pixels, encoding means for dividing pixels constituting the pixel unit into predetermined pixel sets, and encoding an image on the basis of average values of image signals of pixels constituting the pixel sets, and transmission means having--.

Column 9,
Line 41, "$b=k_{01}+k_{11}=k_{21}$" should read -- $b=k_{01}+k_{11}-k_{21}$ --.

Column 18,
Line 25, 'series at" should read -- series a at --.

Column 21,
Line 11, "$k_{10}$" should read -- $k_{01}$ --.

UNITED STATES PATENT AND TRADEMARK OFFICE
CERTIFICATE OF CORRECTION

PATENT NO. : 6,498,625 B1
DATED : December 24, 2002
INVENTOR(S) : Mitsuru Yamamoto et al.

It is certified that error appears in the above-identified patent and that said Letters Patent is hereby corrected as shown below:

Column 28,
Line 13, "$f_B$, $f_B$" should read -- $f_B$, $f_C$ --.

Column 31,
Line 39, "above;" should read -- above, --.

Column 32,
Line 10, "the," should read -- the --.
Line 23, "$m_{11}$))" should read -- $m_{01}$)) --.

Column 35,
Line 1, "positions" should read -- positions, --.

Column 36,
Line 33, "607." should read -- 607 --.
Line 35, "Ny," should read -- Ny --.

Signed and Sealed this

Thirtieth Day of March, 2004

JON W. DUDAS
*Acting Director of the United States Patent and Trademark Office*